United States Patent
Dimou et al.

(10) Patent No.: US 12,512,895 B2
(45) Date of Patent: Dec. 30, 2025

(54) ERROR REASON INDICATION FOR RECEPTION FAILURE

(71) Applicant: QUALCOMM Incorporated, San Diego, CA (US)

(72) Inventors: Konstantinos Dimou, New York, NY (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 17/996,133

(22) PCT Filed: Jun. 3, 2021

(86) PCT No.: PCT/US2021/035734
§ 371 (c)(1),
(2) Date: Oct. 13, 2022

(87) PCT Pub. No.: WO2021/247888
PCT Pub. Date: Dec. 9, 2021

(65) Prior Publication Data
US 2023/0199535 A1    Jun. 22, 2023

(30) Foreign Application Priority Data

Jun. 5, 2020 (GR) .............................. 20200100317
Nov. 2, 2020 (GR) .............................. 20200100662

(51) Int. Cl.
*H04B 7/06* (2006.01)
*H04B 17/318* (2015.01)
*H04W 24/08* (2009.01)

(52) U.S. Cl.
CPC ....... *H04B 7/06964* (2023.05); *H04B 17/318* (2015.01); *H04W 24/08* (2013.01)

(58) Field of Classification Search
CPC ..... H04W 24/04; H04W 24/08; H04W 24/10; H04W 76/18; H04B 17/318
See application file for complete search history.

(56) References Cited

U.S. PATENT DOCUMENTS

2018/0227887 A1* 8/2018 Hakola ................ H04B 7/0695
2019/0215756 A1* 7/2019 Park .................... H04W 36/305
(Continued)

FOREIGN PATENT DOCUMENTS

WO    WO-2019138288 A1    7/2019

OTHER PUBLICATIONS

Huawei., et al., "Discussion on RLF Reporting for Son", 3GPP TSG-RAN WG2 Meeting#107, 3GPP Draft, R2-1909738 Discussion on RLF Reporting for SON, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26-Aug. 30, 2019, Aug. 16, 2019 (Aug. 16, 2019), pp. 1-6, XP051767533, The whole document.
(Continued)

*Primary Examiner* — Charles C Jiang
*Assistant Examiner* — Ryan C Kavleski
(74) *Attorney, Agent, or Firm* — Holland & Hart LLP

(57) ABSTRACT

Methods, systems, and devices for wireless communications are described. In some systems, a user equipment (UE) may fail to successfully receive (e.g., fail to receive, or decode) a downlink transmission. In order to suggest a solution for the reception issue to a base station, the UE may detect a reason for the failed reception. The UE may transmit, to the base station, an indication that the UE failed to decode the transmission and may receive, in response, a grant for transmission of a channel state information (CSI) report including resources allocated for an indication of the error reason. The UE may use these resources to indicate the error
(Continued)

reason to the base station, and the base station may perform a radio link adaptation action to mitigate the error based on the error reason. In some examples, the UE may suggest the radio link adaptation action to the base station.

30 Claims, 22 Drawing Sheets

(56) References Cited

U.S. PATENT DOCUMENTS

| | | | |
|---|---|---|---|
| 2019/0253949 A1 | 8/2019 | Park et al. | |
| 2020/0383155 A1* | 12/2020 | Pati | H04B 17/336 |
| 2021/0385669 A1* | 12/2021 | Jung | H04B 17/24 |
| 2022/0131793 A1* | 4/2022 | Ramachandra | H04L 45/44 |

OTHER PUBLICATIONS

International Search Report and Written Opinion—PCT/US2021/035734—ISA/EPO—Sep. 29, 2021 (204972WO).

* cited by examiner

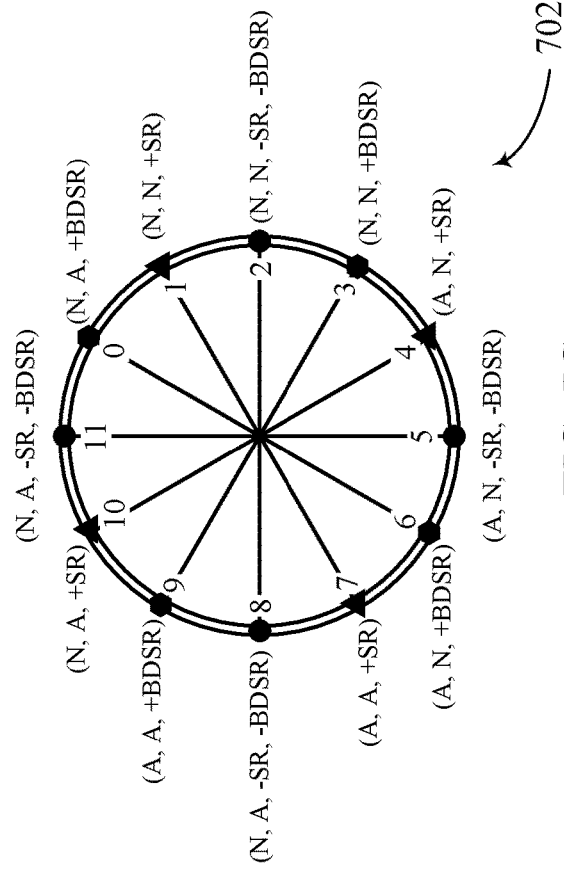
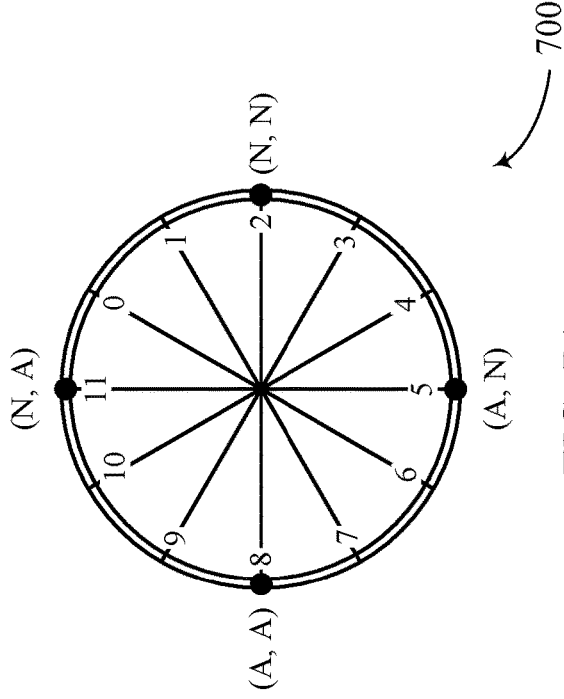
FIG. 7A
FIG. 7B
FIG. 7C

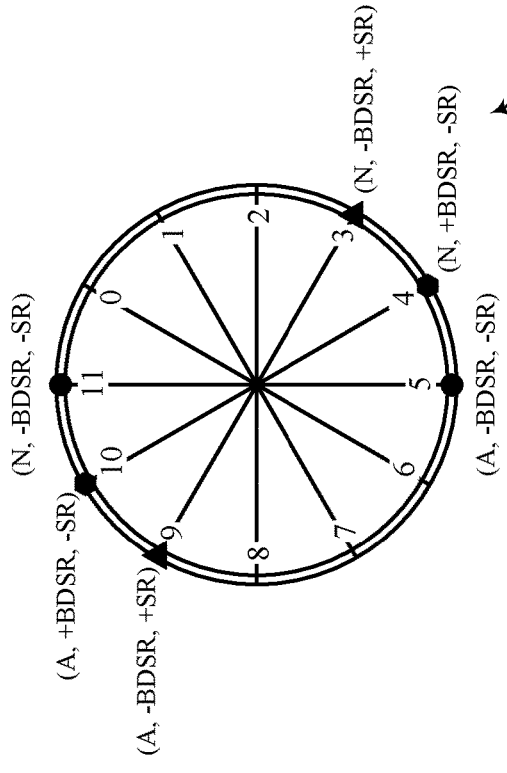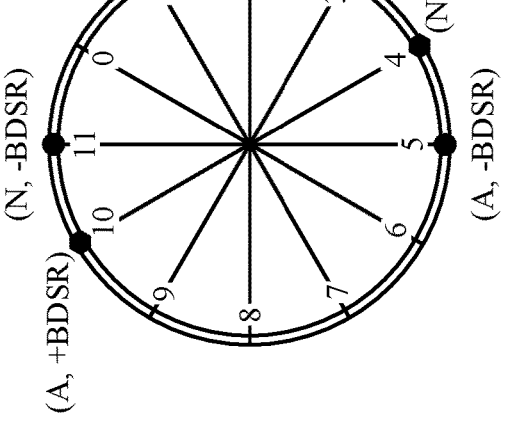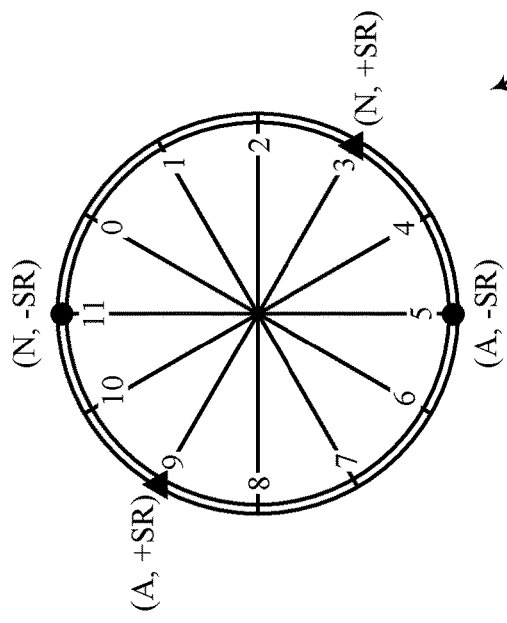
FIG. 8A
FIG. 8B
FIG. 8C

ERROR REASON INDICATION FOR RECEPTION FAILURE

CROSS REFERENCE

The present Application is a 371 national stage filing of International PCT Application No. PCT/US2021/035734 by DIMOU et al. entitled "ERROR REASON INDICATION FOR RECEPTION FAILURE," filed Jun. 3, 2021; and claims priority to Greece Patent Application No. 20200100317 by DIMOU et al., entitled "ERROR REASON INDICATION FOR RECEPTION FAILURE," filed Jun. 5, 2020, and to Greece Patent Application No. 20200100662 by DIMOU et al., entitled "ERROR REASON INDICATION FOR RECEPTION FAILURE," filed Nov. 2, 2020, each of which is assigned to the assignee hereof.

TECHNICAL FIELD

The following relates generally to wireless communications and more specifically to error reason indication by a user equipment (UE) for reception failure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may report feedback to a base station based on a decoding outcome of a communication at the UE. For example, the UE may transmit a positive acknowledgment (ACK) when the decoding is successful, or the UE may transmit a negative acknowledgment (NACK) when the decoding is unsuccessful. In some examples, a base station may clear a retransmission buffer based on receiving an ACK. Alternatively, a base station may determine to retransmit the communication associated with the feedback based on receiving a NACK. The base station may use different parameters for the retransmission than those used for the initial transmission. In some cases, the base station may not have sufficient information to determine parameters for efficient retransmission.

SUMMARY

The described techniques relate to improved methods, systems, devices, and apparatuses that support error reason indication for reception failure. Generally, the described techniques provide for efficient link adaptation upon downlink transmission failure. To improve the likelihood of successful downlink retransmission upon a decoding failure at a user equipment (UE) of one or more downlink transmissions, the UE may be configured to identify that the UE failed to decode the one or more scheduled downlink transmissions. The UE may detect the reason for the failure (e.g., a coverage hole, full beam blocking, partial beam blocking, interference, fast frequency fading, or the like) and may indicate the failure to the base station (e.g., using a negative acknowledgment (NACK) feedback transmission). The UE may be configured to determine the reason for failure by performing a measurement of one or more scheduled signals. For example, the UE may be configured to measure a set of layer 3 (L3) signal strength parameters (e.g., reference signal received power (RSRP)), or a set of layer 1 (L1) signal strength parameters (e.g., RSRP). The UE may be configured with a set of thresholds, where each signal strength parameter may be associated with a different threshold. The UE may compare the measured L3 or L1 signal strength parameters to the appropriate thresholds and determine, based on the comparison, if partial beam blocking or full beam blocking was the cause of failure.

The base station may allocate resources for the UE to transmit a channel state information (CSI) report that includes an indication of the detected reason for the failure. The UE may transmit an error reason indication to the base station using the allocated resources. Additionally or alternatively, the base station may allocate resources for the UE to indicate (e.g., in the CSI report) a suggested radio link adaptation action, for example, based on the detected reason for the failure. In some cases, the UE may transmit a request for the resource allocation(s). The base station may utilize the failure detection information included in the CSI report to adjust one or more communication parameters to retransmit the one or more scheduled downlink transmissions to the UE. By adjusting the parameters (e.g., in a radio link adaptation action) based on the indicated error reason, the base station may effectively mitigate an issue causing the reception failure at the UE.

A method of wireless communications at a UE is described. The method may include receiving, from a base station, a configuration message that includes information to be used by the UE in determining a cause of a failure by the UE to decode scheduled downlink transmissions, identifying that the UE failed to decode one or more scheduled downlink transmissions directed to the UE on at least a first downlink beam of a set of downlink beams, determining the cause of the failure to decode the one or more scheduled downlink transmissions based on the information included in the configuration message, and transmitting, to the base station and based on the determining, an indication that the UE failed to decode the one or more scheduled downlink transmissions.

An apparatus for wireless communications at a UE is described. The apparatus may include at least one processor, memory coupled (e.g., operatively, communicatively, functionally, electronically, or electrically, etc.) to the at least one processor, and instructions stored in the memory. The instructions may be executable by the at least one processor to cause the apparatus to receive, from a base station, a configuration message that includes information to be used by the UE in determining a cause of a failure by the UE to decode scheduled downlink transmissions, identify that the UE failed to decode one or more scheduled downlink transmissions directed to the UE on at least a first downlink beam of a set of downlink beams, determine the cause of the failure to decode the one or more scheduled downlink transmissions based on the information included in the configuration message, and transmit, to the base station and based on the determining, an indication that the UE failed to decode the one or more scheduled downlink transmissions.

Another apparatus for wireless communications at a UE is described. The apparatus may include means for receiving, from a base station, a configuration message that includes information to be used by the UE in determining a cause of a failure by the UE to decode scheduled downlink transmissions, identifying that the UE failed to decode one or more scheduled downlink transmissions directed to the UE on at least a first downlink beam of a set of downlink beams, determining the cause of the failure to decode the one or more scheduled downlink transmissions based on the information included in the configuration message, and transmitting, to the base station and based on the determining, an indication that the UE failed to decode the one or more scheduled downlink transmissions.

A non-transitory computer-readable medium storing code for wireless communications at a UE is described. The code may include instructions executable by at least one processor to receive, from a base station, a configuration message that includes information to be used by the UE in determining a cause of a failure by the UE to decode scheduled downlink transmissions, identify that the UE failed to decode one or more scheduled downlink transmissions directed to the UE on at least a first downlink beam of a set of downlink beams, determine the cause of the failure to decode the one or more scheduled downlink transmissions based on the information included in the configuration message, and transmit, to the base station and based on the determining, an indication that the UE failed to decode the one or more scheduled downlink transmissions.

In some examples of the method, apparatuses, and non-transitory computer-readable medium described herein, determining the cause of the failure further may include operations, features, means, or instructions for determining that the failure may be due to the first downlink beam being fully beam blocked.

Some examples of the method, apparatuses, and non-transitory computer-readable medium described herein may further include operations, features, means, or instructions for measuring a signal strength parameter for each of the one or more scheduled downlink transmissions received over each downlink beam of the set of downlink beams, and performing one or more comparisons of the measured signal strengths to a set of thresholds, the set of thresholds including one or more layer 3 (L3) thresholds and one or more layer 1 (L1) thresholds.

In some examples of the method, apparatuses, and non-transitory computer-readable medium described herein, measuring the signal strength parameter further may include operations, features, means, or instructions for measuring the signal strength parameter averaged over a beam blocking duration for each of the one or more scheduled downlink transmissions received over each downlink beam of the set of downlink beams.

In some examples of the method, apparatuses, and non-transitory computer-readable medium described herein, performing the one or more comparisons further may include operations, features, means, or instructions for determining that the measured signal strength averaged over a system bandwidth for the first downlink beam may be less than a first L3 threshold of the one or more L3 thresholds.

In some examples of the method, apparatuses, and non-transitory computer-readable medium described herein, performing the one or more comparisons further may include operations, features, means, or instructions for determining a maximum signal strength of the measured signal strengths of each resource block for the first downlink beam, and determining that the maximum measured signal strength may be less than a first L3 threshold of the one or more L3 thresholds.

In some examples of the method, apparatuses, and non-transitory computer-readable medium described herein, performing the one or more comparisons further may include operations, features, means, or instructions for determining that the measured signal strength of at least a preconfigured number of physical resource blocks for the first downlink beam, averaged over the beam blocking duration, may be less than a first L3 threshold of the one or more L3 thresholds.

In some examples of the method, apparatuses, and non-transitory computer-readable medium described herein, measuring the signal strength parameter further may include operations, features, means, or instructions for measuring an instantaneous signal strength parameter for each of the one or more scheduled downlink transmissions received over each downlink beam of the set of downlink beams.

In some examples of the method, apparatuses, and non-transitory computer-readable medium described herein, performing the one or more comparisons further may include operations, features, means, or instructions for determining that the measured instantaneous received signal strength averaged over a system bandwidth for the first downlink beam may be less than a first L1 threshold of the one or more L1 thresholds.

In some examples of the method, apparatuses, and non-transitory computer-readable medium described herein, performing the one or more comparisons further may include operations, features, means, or instructions for determining a maximum instantaneous measured signal strength of the measured instantaneous signal strengths for the first downlink beam, and determining that the maximum instantaneous measured signal strength may be less than a first L1 threshold of the one or more L1 thresholds.

In some examples of the method, apparatuses, and non-transitory computer-readable medium described herein, determining that the measured instantaneous signal strength parameter may be less than an L1 threshold further may include operations, features, means, or instructions for determining that a difference between the instantaneous measured signal strength for the first downlink beam averaged over a system bandwidth from a first time to a second time may be less than a first L1 threshold of the one or more L1 thresholds.

In some examples of the method, apparatuses, and non-transitory computer-readable medium described herein, the measured signal strength parameter may be a reference signal received power.

In some examples of the method, apparatuses, and non-transitory computer-readable medium described herein, transmitting the indication further may include operations, features, means, or instructions for transmitting the indication that the UE failed to decode the one or more scheduled downlink transmissions via a downlink beam that may be different than the first downlink beam.

In some examples of the method, apparatuses, and non-transitory computer-readable medium described herein, determining the cause of the failure further may include operations, features, means, or instructions for determining that the failure may be due to the first downlink beam being partially beam blocked.

Some examples of the method, apparatuses, and non-transitory computer-readable medium described herein may further include operations, features, means, or instructions for performing one or more comparisons of a measured signal strength parameter to a set of thresholds, the set of thresholds including one or more (L1) thresholds and one or more layer 3 (L3) thresholds.

Some examples of the method, apparatuses, and non-transitory computer-readable medium described herein may further include operations, features, means, or instructions for receiving, based on the UE failing to decode the one or more scheduled downlink transmissions, a grant for transmission of a channel state information report, where the grant includes resources for an indication of the cause of the failure and transmitting the channel state information report including at least the indication of the cause of the failure based on the grant.

In some examples of the method, apparatuses, and non-transitory computer-readable medium described herein, the grant further includes resources for an indication of a suggested radio link adaptation action and the method, apparatuses, and non-transitory computer-readable medium may include further operations, features, means, or instructions for transmitting the indication of the suggested radio link adaptation action in the channel state information report.

In some examples of the method, apparatuses, and non-transitory computer-readable medium described herein, the resources for the indication of the suggested radio link adaptation action include resources for indicating a lowering of a modulation and coding scheme, a beam change, a resource block group change, a multi slot transmission, a back off period for delaying a retransmission, or a combination thereof.

In some examples of the method, apparatuses, and non-transitory computer-readable medium described herein, the resources for the indication of the cause of the failure include resources for indicating a coverage hole, a beam blocking, a partial beam blocking, an interference, a frequency selective fading, a collision, or a combination thereof.

Some examples of the method, apparatuses, and non-transitory computer-readable medium described herein may further include operations, features, means, or instructions for receiving, from the base station, a retransmission of the one or more scheduled downlink transmissions on a second downlink beam based on the channel state information report including at least the indication of the cause of the failure.

In some examples of the method, apparatuses, and non-transitory computer-readable medium described herein, transmitting the indication that the UE failed to decode the one or more scheduled downlink transmissions may include operations, features, means, or instructions for transmitting a scheduling request that indicates that the UE may have determined the cause of the failure.

Some examples of the method, apparatuses, and non-transitory computer-readable medium described herein may further include operations, features, means, or instructions for transmitting a request for uplink resources for transmitting the channel state information report including at least the indication of the cause of the failure, where receiving the grant may be based on transmitting the request for uplink resources.

Some examples of the method, apparatuses, and non-transitory computer-readable medium described herein may further include operations, features, means, or instructions for receiving an indication of a timer that prohibits transmission of the scheduling request that indicates that the UE may have determined the cause of the failure until expiration of the timer.

In some examples of the method, apparatuses, and non-transitory computer-readable medium described herein, transmitting the scheduling request that indicates that the UE may have determined the cause of the failure may include operations, features, means, or instructions for transmitting the scheduling request that indicates that the UE may have determined the cause of the failure on a set of multiple uplink beams.

Some examples of the method, apparatuses, and non-transitory computer-readable medium described herein may further include operations, features, means, or instructions for receiving a request to transmit an indication of a suggested radio link adaptation action.

In some examples of the method, apparatuses, and non-transitory computer-readable medium described herein, performing the one or more comparisons further may include operations, features, means, or instructions for measuring an instantaneous signal strength parameter for each of the one or more scheduled downlink transmissions received over each downlink beam of the set of downlink beams, where the measured instantaneous signal strength parameter may be a reference signal received power, and determining that the measured instantaneous signal strength parameter averaged over a system bandwidth for the first downlink beam may be greater than a first L1 threshold of the one or more L1 thresholds and less than a second L1 threshold of the one or more L1 thresholds.

In some examples of the method, apparatuses, and non-transitory computer-readable medium described herein, performing the one or more comparisons further may include operations, features, means, or instructions for measuring an instantaneous signal strength parameter for each of the one or more scheduled downlink transmissions received over each downlink beam of the set of downlink beams, where the measured instantaneous signal strength parameter may be a reference signal received power, determining a maximum instantaneous measured signal strength of the measured instantaneous signal strengths for the first downlink beam, and determining that the maximum instantaneous measured signal strength may be greater than a first L1 threshold of the one or more L1 thresholds and less than a second L1 threshold of the one or more L1 thresholds.

In some examples of the method, apparatuses, and non-transitory computer-readable medium described herein, performing the one or more comparisons further may include operations, features, means, or instructions for measuring a signal strength parameter averaged over a beam blocking duration for each of the one or more scheduled downlink transmissions received over each downlink beam of the set of downlink beams, where the measured instantaneous signal strength parameter may be a reference signal received power, and determining that the measured signal strength parameter averaged over a system bandwidth for the first downlink beam may be greater than a first L3 threshold of the one or more L3 thresholds and less than a second L3 threshold of the one or more L3 thresholds.

In some examples of the method, apparatuses, and non-transitory computer-readable medium described herein, performing the one or more comparisons further may include operations, features, means, or instructions for measuring a signal strength parameter averaged over a beam blocking duration for each of the one or more scheduled downlink transmissions received over each downlink beam of the set of downlink beams, where the measured instantaneous signal strength parameter may be a reference signal received power, determining a maximum signal strength of the measured signal strengths of each resource block for the first downlink beam, and determining that the maximum measured signal strength may be greater than a first L3 threshold of the one or more L3 thresholds and less than a second L3 threshold of the one or more L3 thresholds.

In some examples of the method, apparatuses, and non-transitory computer-readable medium described herein, performing the one or more comparisons further may include operations, features, means, or instructions for measuring an instantaneous signal strength parameter for each of the one or more scheduled downlink transmissions received over each downlink beam of the set of downlink beams, where the measured instantaneous signal strength parameter may be a reference signal received power, and determining that a difference between the instantaneous measured signal strength averaged over a system bandwidth for the first downlink beam from a first time to a second time may be greater than a first L1 threshold of the one or more L1 thresholds and less than a second L1 threshold of the one or more L1 thresholds.

In some examples of the method, apparatuses, and non-transitory computer-readable medium described herein, transmitting the indication further may include operations, features, means, or instructions for transmitting the indication that the UE failed to decode the one or more scheduled downlink transmissions via the first downlink beam.

In some examples of the method, apparatuses, and non-transitory computer-readable medium described herein, receiving the configuration message further may include operations, features, means, or instructions for receiving an activation message for the UE determine the cause of the failure by the UE to decode scheduled downlink transmissions based on preconfigured thresholds.

In some examples of the method, apparatuses, and non-transitory computer-readable medium described herein, receiving the configuration message further may include operations, features, means, or instructions for receiving a set of thresholds for the UE to use to determine the cause of the failure by the UE to decode scheduled downlink transmissions.

A method of wireless communications at a base station is described. The method may include transmitting, to a UE, a configuration message that includes information to be used by the UE in determining a cause of a failure by the UE to decode scheduled downlink transmissions, the information including a set of thresholds for the UE to use to determine the cause of the failure, transmitting, to the UE, one or more scheduled downlink transmissions on at least a first downlink beam of a set of downlink beams, and receiving, from the UE, an indication that the UE failed to decode the one or more scheduled downlink transmissions.

An apparatus for wireless communications at a base station is described. The apparatus may include at least one processor, memory coupled (e.g., operatively, communicatively, functionally, electronically, or electrically, etc.) to the at least one processor, and instructions stored in the memory. The instructions may be executable by the at least one processor to cause the apparatus to transmit, to a UE, a configuration message that includes information to be used by the UE in determining a cause of a failure by the UE to decode scheduled downlink transmissions, the information including a set of thresholds for the UE to use to determine the cause of the failure, transmit, to the UE, one or more scheduled downlink transmissions on at least a first downlink beam of a set of downlink beams, and receive, from the UE, an indication that the UE failed to decode the one or more scheduled downlink transmissions.

Another apparatus for wireless communications at a base station is described. The apparatus may include means for transmitting, to a UE, a configuration message that includes information to be used by the UE in determining a cause of a failure by the UE to decode scheduled downlink transmissions, the information including a set of thresholds for the UE to use to determine the cause of the failure, transmitting, to the UE, one or more scheduled downlink transmissions on at least a first downlink beam of a set of downlink beams, and receiving, from the UE, an indication that the UE failed to decode the one or more scheduled downlink transmissions.

A non-transitory computer-readable medium storing code for wireless communications at a base station is described. The code may include instructions executable by at least one processor to transmit, to a UE, a configuration message that includes information to be used by the UE in determining a cause of a failure by the UE to decode scheduled downlink transmissions, the information including a set of thresholds for the UE to use to determine the cause of the failure, transmit, to the UE, one or more scheduled downlink transmissions on at least a first downlink beam of a set of downlink beams, and receive, from the UE, an indication that the UE failed to decode the one or more scheduled downlink transmissions.

In some examples of the method, apparatuses, and non-transitory computer-readable medium described herein, the set of thresholds includes one or more layer 3 (L3) thresholds and one or more layer 1 (L1) thresholds.

In some examples of the method, apparatuses, and non-transitory computer-readable medium described herein, transmitting the configuration message further may include operations, features, means, or instructions for transmitting an L3 threshold of the one or more L3 thresholds to be compared to a signal strength parameter of the first downlink beam averaged over a system bandwidth.

In some examples of the method, apparatuses, and non-transitory computer-readable medium described herein, transmitting the configuration message further may include operations, features, means, or instructions for transmitting an L3 threshold of the one or more L3 thresholds to be compared to a maximum signal strength parameter of the first downlink beam averaged over a system bandwidth.

In some examples of the method, apparatuses, and non-transitory computer-readable medium described herein, transmitting the configuration message further may include operations, features, means, or instructions for transmitting an L3 threshold of the one or more L3 thresholds to be compared to a signal strength parameter of the first downlink beam on one or more physical resource blocks.

In some examples of the method, apparatuses, and non-transitory computer-readable medium described herein, transmitting the configuration message further may include operations, features, means, or instructions for transmitting an L1 threshold of the one or more L1 thresholds to be compared to an instantaneous signal strength parameter of the first downlink beam averaged over a system bandwidth.

In some examples of the method, apparatuses, and non-transitory computer-readable medium described herein, transmitting the configuration message further may include operations, features, means, or instructions for transmitting an L1 threshold of the one or more L1 thresholds to be compared to a maximum instantaneous signal strength parameter of the first downlink beam averaged over a system bandwidth.

In some examples of the method, apparatuses, and non-transitory computer-readable medium described herein, transmitting the configuration message further may include operations, features, means, or instructions for transmitting an L1 threshold of the one or more L1 thresholds to be compared to a difference between an instantaneous signal strength parameter of the first downlink beam averaged over a system bandwidth from a first time to a second time.

In some examples of the method, apparatuses, and non-transitory computer-readable medium described herein, transmitting the configuration message further may include operations, features, means, or instructions for transmitting a first L1 threshold of the one or more L1 thresholds and a second L1 threshold of the one or more L1 thresholds to be compared to an instantaneous signal strength parameter of the first downlink beam averaged over a system bandwidth.

In some examples of the method, apparatuses, and non-transitory computer-readable medium described herein, transmitting the configuration message further may include operations, features, means, or instructions for transmitting a first L1 threshold of the one or more L1 thresholds and a second L1 threshold of the one or more L1 thresholds to be compared to a maximum instantaneous signal strength parameter of the first downlink beam averaged over a system bandwidth.

In some examples of the method, apparatuses, and non-transitory computer-readable medium described herein, transmitting the configuration message further may include operations, features, means, or instructions for transmitting a first L3 threshold of the one or more L3 thresholds and a second L3 threshold of the one or more L3 thresholds to be compared to a signal strength parameter of the first downlink beam averaged over a system bandwidth.

In some examples of the method, apparatuses, and non-transitory computer-readable medium described herein, transmitting the configuration message further may include operations, features, means, or instructions for transmitting a first L3 threshold of the one or more L3 thresholds and a second L3 threshold of the one or more L3 thresholds to be compared to a maximum signal strength parameter of the first downlink beam averaged over a system bandwidth.

In some examples of the method, apparatuses, and non-transitory computer-readable medium described herein, transmitting the configuration message further may include operations, features, means, or instructions for transmitting a first L1 threshold of the one or more L1 thresholds and a second L1 threshold of the one or more L1 thresholds to be compared to a difference between an instantaneous signal strength parameter of the first downlink beam averaged over a system bandwidth from a first time to a second time.

In some examples of the method, apparatuses, and non-transitory computer-readable medium described herein, receiving the indication further may include operations, features, means, or instructions for receiving the indication that the UE failed to decode the one or more scheduled downlink transmissions via a downlink beam that may be different than the first downlink beam.

In some examples of the method, apparatuses, and non-transitory computer-readable medium described herein, receiving the indication further may include operations, features, means, or instructions for receiving the indication that the UE failed to decode the one or more scheduled downlink transmissions via the first downlink beam.

In some examples of the method, apparatuses, and non-transitory computer-readable medium described herein, transmitting the configuration message further may include operations, features, means, or instructions for transmitting an activation message for the UE determine the cause of the failure by the UE to decode scheduled downlink transmissions based on preconfigured thresholds.

A method of wireless communications at a UE is described. The method may include identifying that the UE failed to decode one or more scheduled downlink transmissions directed to the UE on a first downlink beam, determining an error reason associated with the UE failing to decode the one or more scheduled downlink transmissions, transmitting, to a base station and based on the determining, an indication that the UE failed to decode the one or more scheduled downlink transmissions, receiving, based on the UE failing to decode the one or more scheduled downlink transmissions, a grant for transmission of a channel state information report, where the grant includes resources for an indication of the error reason, and transmitting the channel state information report including at least the indication of the error reason based on the grant.

An apparatus for wireless communications at a UE is described. The apparatus may include at least one processor, memory coupled (e.g., operatively, communicatively, functionally, electronically, or electrically, etc.) to the at least one processor, and instructions stored in the memory. The instructions may be executable by the at least one processor to cause the apparatus to identify that the UE failed to decode one or more scheduled downlink transmissions directed to the UE on a first downlink beam, determine an error reason associated with the UE failing to decode the one or more scheduled downlink transmissions, transmit, to a base station and based on the determining, an indication that the UE failed to decode the one or more scheduled downlink transmissions, receive, based on the UE failing to decode the one or more scheduled downlink transmissions, a grant for transmission of a CSI report, where the grant includes resources for an indication of the error reason, and transmit the CSI report including at least the indication of the error reason based on the grant.

Another apparatus for wireless communications at a UE is described. The apparatus may include means for identifying that the UE failed to decode one or more scheduled downlink transmissions directed to the UE on a first downlink beam, determining an error reason associated with the UE failing to decode the one or more scheduled downlink transmissions, transmitting, to a base station and based on the determining, an indication that the UE failed to decode the one or more scheduled downlink transmissions, receiving, based on the UE failing to decode the one or more scheduled downlink transmissions, a grant for transmission of a CSI report, where the grant includes resources for an indication of the error reason, and transmitting the CSI report including at least the indication of the error reason based on the grant.

A non-transitory computer-readable medium storing code for wireless communications at a UE is described. The code may include instructions executable by at least one processor to identify that the UE failed to decode one or more scheduled downlink transmissions directed to the UE on a first downlink beam, determine an error reason associated with the UE failing to decode the one or more scheduled downlink transmissions, transmit, to a base station and based on the determining, an indication that the UE failed to decode the one or more scheduled downlink transmissions, receive, based on the UE failing to decode the one or more scheduled downlink transmissions, a grant for transmission of a CSI report, where the grant includes resources for an indication of the error reason, and transmit the CSI report including at least the indication of the error reason based on the grant.

In some examples of the method, apparatuses, and non-transitory computer-readable medium described herein, the grant further may include operations, features, means, or instructions for transmitting the indication of the suggested radio link adaptation action in the CSI report.

In some examples of the method, apparatuses, and non-transitory computer-readable medium described herein, the resources for the indication of the suggested radio link adaptation action include resources for indicating a lowering of a modulation and coding scheme, a beam change, a resource block group (RBG) change, a multi slot transmission, a back off period for delaying a retransmission, or a combination thereof.

In some examples of the method, apparatuses, and non-transitory computer-readable medium described herein, the resources for the indication of the error reason include resources for indicating a coverage hole, a beam blocking, a partial beam blocking, an interference, a frequency selective fading, a collision, or a combination thereof.

Some examples of the method, apparatuses, and non-transitory computer-readable medium described herein may further include operations, features, means, or instructions for receiving, from the base station, a retransmission of the one or more scheduled downlink transmissions on a second downlink beam based on the CSI report including at least the indication of the error reason.

In some examples of the method, apparatuses, and non-transitory computer-readable medium described herein, transmitting the indication that the UE failed to decode the one or more scheduled downlink transmissions may include operations, features, means, or instructions for transmitting a scheduling request that indicates that the UE may have determined the error reason.

Some examples of the method, apparatuses, and non-transitory computer-readable medium described herein may further include operations, features, means, or instructions for transmitting a request for uplink resources for transmitting the CSI report including at least the indication of the error reason, where receiving the grant may be based on transmitting the request for uplink resources.

Some examples of the method, apparatuses, and non-transitory computer-readable medium described herein may further include operations, features, means, or instructions for receiving an indication of a timer that prohibits transmission of the scheduling request that indicates that the UE may have determined the error reason until expiration of the timer.

In some examples of the method, apparatuses, and non-transitory computer-readable medium described herein, transmitting the scheduling request that indicates that the UE may have determined the error reason further may include operations, features, means, or instructions for transmitting the scheduling request that indicates that the UE may have determined the error reason on a set of uplink beams.

Some examples of the method, apparatuses, and non-transitory computer-readable medium described herein may further include operations, features, means, or instructions for receiving a request to transmit the indication of the error reason.

Some examples of the method, apparatuses, and non-transitory computer-readable medium described herein may further include operations, features, means, or instructions for receiving a request to transmit an indication of a suggested radio link adaptation action.

Some examples of the method, apparatuses, and non-transitory computer-readable medium described herein may further include operations, features, means, or instructions for receiving an activation of a set of measurements for determining the error reason.

In some examples of the method, apparatuses, and non-transitory computer-readable medium described herein, determining the error reason associated with the UE failing to decode the one or more scheduled downlink transmissions may include operations, features, means, or instructions for determining that the failure may be due to a first downlink beam being blocked.

A method of wireless communications at a base station is described. The method may include transmitting, to a UE, one or more scheduled downlink transmissions on a first downlink beam, determining that the UE failed to decode the one or more scheduled downlink transmissions, transmitting, based on the determining that the UE failed to decode the one or more scheduled downlink transmissions, a grant for transmission of a CSI report, where the grant includes resources for an indication of an error reason associated with the UE failing to decode the one or more scheduled downlink transmissions, and receiving the CSI report including at least the indication of the error reason based on the grant.

An apparatus for wireless communications at a base station is described. The apparatus may include at least one processor, memory coupled (e.g., operatively, communicatively, functionally, electronically, or electrically, etc.) to the at least one processor, and instructions stored in the memory. The instructions may be executable by the at least one processor to cause the apparatus to transmit, to a UE, one or more scheduled downlink transmissions on a first downlink beam, determine that the UE failed to decode the one or more scheduled downlink transmissions, transmit, based on the determining that the UE failed to decode the one or more scheduled downlink transmissions, a grant for transmission of a CSI report, where the grant includes resources for an indication of an error reason associated with the UE failing to decode the one or more scheduled downlink transmissions, and receive the CSI report including at least the indication of the error reason based on the grant.

Another apparatus for wireless communications at a base station is described. The apparatus may include means for transmitting, to a UE, one or more scheduled downlink transmissions on a first downlink beam, determining that the UE failed to decode the one or more scheduled downlink transmissions, transmitting, based on the determining that the UE failed to decode the one or more scheduled downlink transmissions, a grant for transmission of a CSI report, where the grant includes resources for an indication of an error reason associated with the UE failing to decode the one or more scheduled downlink transmissions, and receiving the CSI report including at least the indication of the error reason based on the grant.

A non-transitory computer-readable medium storing code for wireless communications at a base station is described. The code may include instructions executable by at least one processor to transmit, to a UE, one or more scheduled downlink transmissions on a first downlink beam, determine that the UE failed to decode the one or more scheduled downlink transmissions, transmit, based on the determining that the UE failed to decode the one or more scheduled downlink transmissions, a grant for transmission of a CSI report, where the grant includes resources for an indication of an error reason associated with the UE failing to decode the one or more scheduled downlink transmissions, and receive the CSI report including at least the indication of the error reason based on the grant.

In some examples of the method, apparatuses, and non-transitory computer-readable medium described herein, the grant further may include operations, features, means, or instructions for receiving the indication of the suggested radio link adaptation action in the CSI report.

In some examples of the method, apparatuses, and non-transitory computer-readable medium described herein, the resources for the indication of the suggested radio link adaptation action include resources for indicating a lowering of a modulation and coding scheme, a beam change, a RBG change, a multi slot transmission, a back off period for delaying a retransmission, or a combination thereof.

In some examples of the method, apparatuses, and non-transitory computer-readable medium described herein, the resources for the indication of the error reason include resources for indicating a coverage hole, a beam blocking, a partial beam blocking, an interference, a frequency selective fading, a collision, or a combination thereof.

Some examples of the method, apparatuses, and non-transitory computer-readable medium described herein may further include operations, features, means, or instructions for transmitting a retransmission of the one or more scheduled downlink transmissions on a second downlink beam based on the CSI report including at least the indication of the error reason.

In some examples of the method, apparatuses, and non-transitory computer-readable medium described herein, determining that the UE failed to decode the one or more scheduled downlink transmissions may include operations, features, means, or instructions for receiving a scheduling request that indicates that the UE may have determined the error reason.

Some examples of the method, apparatuses, and non-transitory computer-readable medium described herein may further include operations, features, means, or instructions for receiving a request for uplink resources for transmitting the CSI report including at least the indication of the error reason, where transmitting the grant may be based on receiving the request for uplink resources.

Some examples of the method, apparatuses, and non-transitory computer-readable medium described herein may further include operations, features, means, or instructions for transmitting an indication of a timer that prohibits transmission of the scheduling request that indicates that the UE may have determined the error reason until expiration of the timer.

In some examples of the method, apparatuses, and non-transitory computer-readable medium described herein, receiving the scheduling request that indicates that the UE may have determined the error reason further may include operations, features, means, or instructions for receiving the scheduling request that indicates that the UE may have determined the error reason on a set of uplink beams.

Some examples of the method, apparatuses, and non-transitory computer-readable medium described herein may further include operations, features, means, or instructions for transmitting a request to transmit the indication of the error reason.

Some examples of the method, apparatuses, and non-transitory computer-readable medium described herein may further include operations, features, means, or instructions for transmitting a request to transmit an indication of a suggested radio link adaptation action. Some examples of the method, apparatuses, and non-transitory computer-readable medium described herein may further include operations, features, means, or instructions for activating a set of measurements for the UE to determine the error reason.

DESCRIPTION OF THE DRAWINGS

FIGS. 7A through 7C and 8A through 8C illustrate examples of phase rotation diagrams that support error detection and reporting procedures in accordance with aspects of the present disclosure.

DETAILED DESCRIPTION

Figure 1:
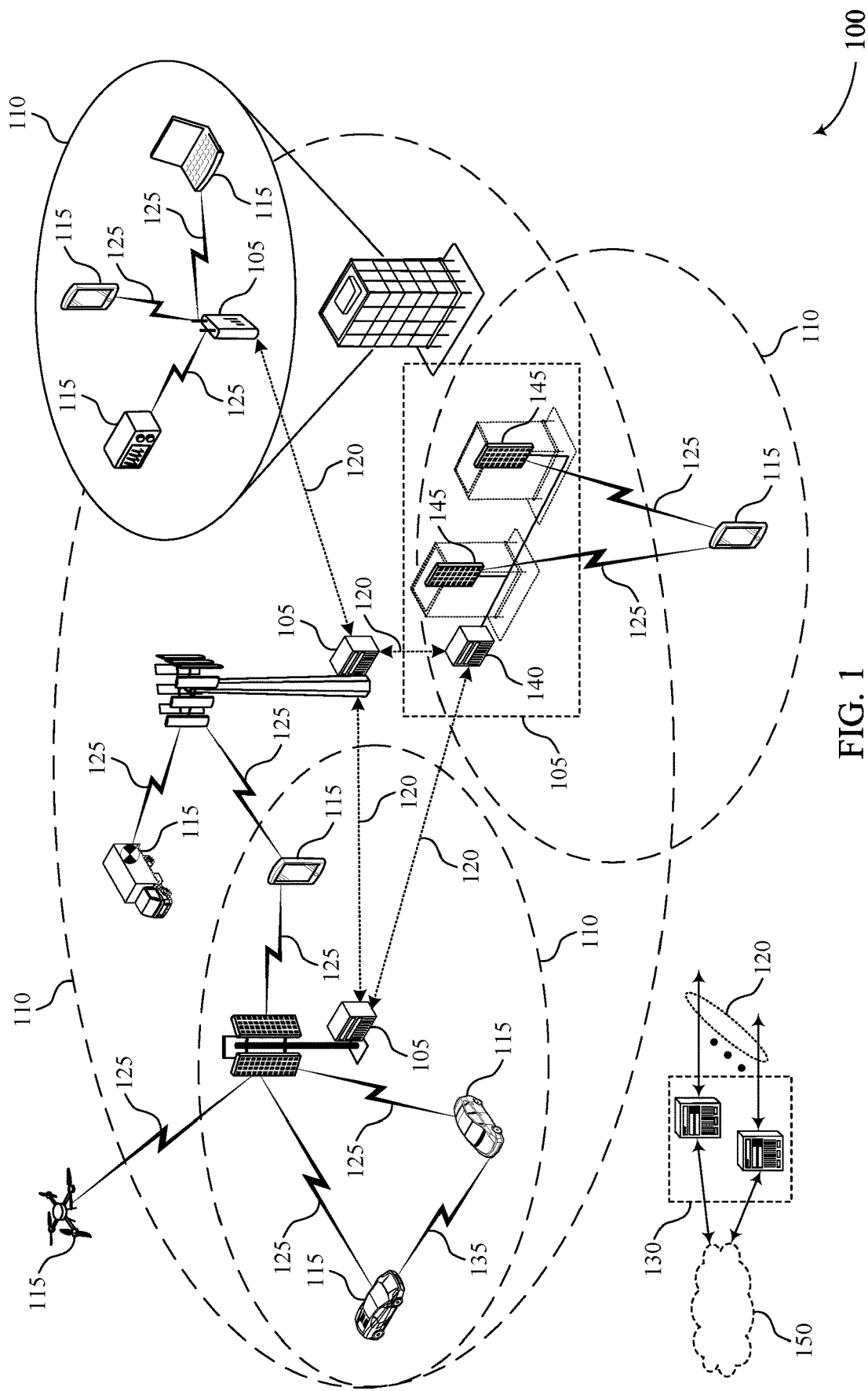
FIGS. 1 and 2 illustrate examples of wireless communications systems that support error reason indication for reception failure in accordance with aspects of the present disclosure.

In some wireless communications systems, a user equipment (UE) may report feedback to a base station based on a decoding outcome of a communication at the UE. For example, the UE may transmit a positive acknowledgment (ACK) when decoding of a downlink transmission is successful and may transmit a negative acknowledgment (NACK) when the decoding is unsuccessful. If a base station receives a NACK, the base station may be capable of performing a radio link adaptation to attempt a successful retransmission. Radio link adaptation actions may include modifying a modulation and coding scheme (MCS), modifying a resource block group (RBG), and modifying a transmission configuration indicator (TCI) state (e.g., beam) for the retransmission. The base station, however, may not be able to determine why the transmission was not received successfully by the UE. As a result, the base station may determine a link adaptation without sufficient information about the failure from the UE. In some cases, such a link adaptation may be excessive or fail to improve the link between the base station and the UE. An excessive link adaptation for a retransmission may change other cell interference in a system (e.g., which may require an additional inter-cell interference coordination procedure), incur significant processing overhead, or both without a significant improvement in the reliability of the retransmission.

As described herein, a wireless communications system may support dynamic radio link adaptation at a base station based on error detection information received from a UE. A UE may be configured to perform error detection upon failure to decode a downlink message to determine an error reason for the reception failure. The UE may include additional information in a feedback message to support improved link adaptation based on the error detection. In some examples, the UE may further be configured to indicate a suggestion for a link adaptation action to be performed by the base station. The base station may use the error detection information, the link adaptation action suggestion, or both to determine an appropriate link adaptation for the retransmission. By selecting the link adaptation action based on the detected error causing decoding failure at the UE, the base station may mitigate the error and improve the likelihood of a successful retransmission to the UE. As such, the base station may avoid performing link adaptation actions that incur significant processing overhead without significant improvement in the reliability of retransmission, and instead the base station may perform specific link adaptation actions corresponding to specific issues detected in the system.

For example, after failing to decode a transmission from the base station, a UE may detect that the failure was a result of beam blocking or partial beam blocking, interference, frequency selective fading, a collision, a coverage hole, or some combination thereof. In some cases, the UE may be configured to compare one or more signal strength measurements to a threshold associated with each signal strength measurement to determine whether the failure was due to beam blocking (e.g., full beam blocking) or partial beam blocking. The UE may transmit an indication of the failure to the base station. In some examples, the UE may include (e.g., with the failure indication) a scheduling request for a scheduling grant. The base station may transmit a scheduling grant for the UE to transmit an indication of the reason for the failure and, in some cases, an indication of a suggested link adaptation action (e.g., a beam change, a lowering of an MCS value, an RBG change, a multi-slot transmission, or a back-off period for delaying a retransmission). In some cases, the UE may be configured with a link indication timer, which may prohibit the UE from transmitting a scheduling request until expiration of the timer (e.g., such that the UE refrains from transmitting scheduling requests more frequently than a specific threshold).

To indicate the error detection information to the base station, the UE may transmit an error detection scheduling request message along with a NACK to the base station, such as in a physical uplink control channel (PUCCH). In some implementations, the UE may be configured to determine a cyclic shift to apply to the NACK feedback in order to indicate that the UE has detected a specific error reason for failing to decode the transmission. In some cases, the UE may transmit the error detection scheduling request using one or more uplink beams via beam sweeping. The error detection scheduling request message may request a grant for the UE to transmit a channel state information (CSI) report to the base station that includes the error detection information. The UE may receive the grant from the base station and may transmit the error detection CSI report (e.g., a wideband CSI report and related CSI statistics) to the base station based on the received grant. The base station may adapt one or more communication parameters for communications with the UE based on the error detection CSI report.

Aspects of the disclosure are initially described in the context of wireless communications systems. Aspects are then described with respect to process flows, a communications procedure, and phase rotation diagrams. Aspects of the disclosure are further illustrated by and described with reference to apparatus diagrams, system diagrams, and flowcharts that relate to error reason indication for reception failure.

FIG. 1 illustrates an example of a wireless communications system 100 that supports error reason indication for reception failure in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies. Components within a wireless communications system may be coupled (for example, operatively, communicatively, functionally, electronically, and/or electrically) to each other.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, an MP3 player, or a video device), a camera, a gaming device, a navigation/positioning device (e.g., global navigation satellite system (GNSS) devices based on, for example, global positioning system (GPS), Beidou, global navigation satellite system (GLONASS), or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, or a water meter), a monitor, a gas pump, an appliance (e.g., kitchen appliance, washing machine, or dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine to Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include further eMTC (FeMTC), enhanced further eMTC (eFeMTC), or massive MTC (mMTC), and NB-IoT may include enhanced NB-IoT (eNB-IoT), or further enhanced NB-IoT (FeNB-IoT).

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

To support efficient feedback and communication adaptation techniques, as described herein, a UE 115 may be configured to transmit error detection information to a base station 105 in addition to NACK feedback upon a failure by the UE 115 to decode one or more scheduled downlink transmissions. For example, the error detection information may be based on a beam blocking detection procedure (e.g., partial beam blocking detection procedure, full beam blocking detection procedure), a coverage hole detection procedure, an interference detection procedure, a frequency selective fading detection procedure, or any other error detection procedure. A UE 115 may attempt to decode one or more scheduled physical downlink shared channel (PDSCH) messages (e.g., a semi-persistent scheduled (SPS) PDSCH message or some other PDSCH message). If the UE 115 successfully receives and decodes the one or more scheduled PDSCH messages, the UE 115 may transmit an ACK to the base station 105. If the UE 115 fails to receive or decode the one or more scheduled PDSCH messages successfully, the UE 115 may perform a measurement analysis to determine a reason for the failed reception or decoding. In one specific example, the UE 115 may perform a beam blocking evaluation such that the UE 115 may determine whether signal strength parameters associated with the one or more scheduled PDSCH messages are each below specific thresholds (e.g., preconfigured or dynamic thresholds), where each signal strength parameter may be associated with a corresponding threshold. If the UE 115 determines that one or more of the signal strength parameters are below the thresholds, the UE 115 may determine that the UE 115 failed to decode the one or more scheduled PDSCH messages due to beam blocking (e.g., partial beam blocking or full beam blocking).

To indicate the error detection information to the base station 105, the UE 115 may transmit a scheduling request message multiplexed with a NACK to the base station, such as in a PUCCH. The scheduling request message may indicate that the UE 115 has detected an error reason for the decoding failure. In some implementations, the UE 115 may be configured to determine a cyclic shift to apply to the PUCCH feedback message based on the determination of the error reason (e.g., based on a specific error reason determined by the UE 115 or based on detecting any error reason). In some cases, the UE 115 may transmit the scheduling request over one or more uplink beams via beam sweeping (e.g., to avoid transmitting solely on a beam that may be blocked). The scheduling request message may request a grant for the UE 115 to transmit a CSI report to the base station 105 that includes the error detection information, where the error detection information may indicate an error reason, a suggested radio link adaptation action, or both. The UE 115 may receive the grant from the base station 105 and transmit the error detection CSI report (e.g., a wideband CSI report) to the base station 105 based on the received grant. The base station 105 may adapt one or more communication parameters for retransmission based on the error detection CSI report.

Figure 2:
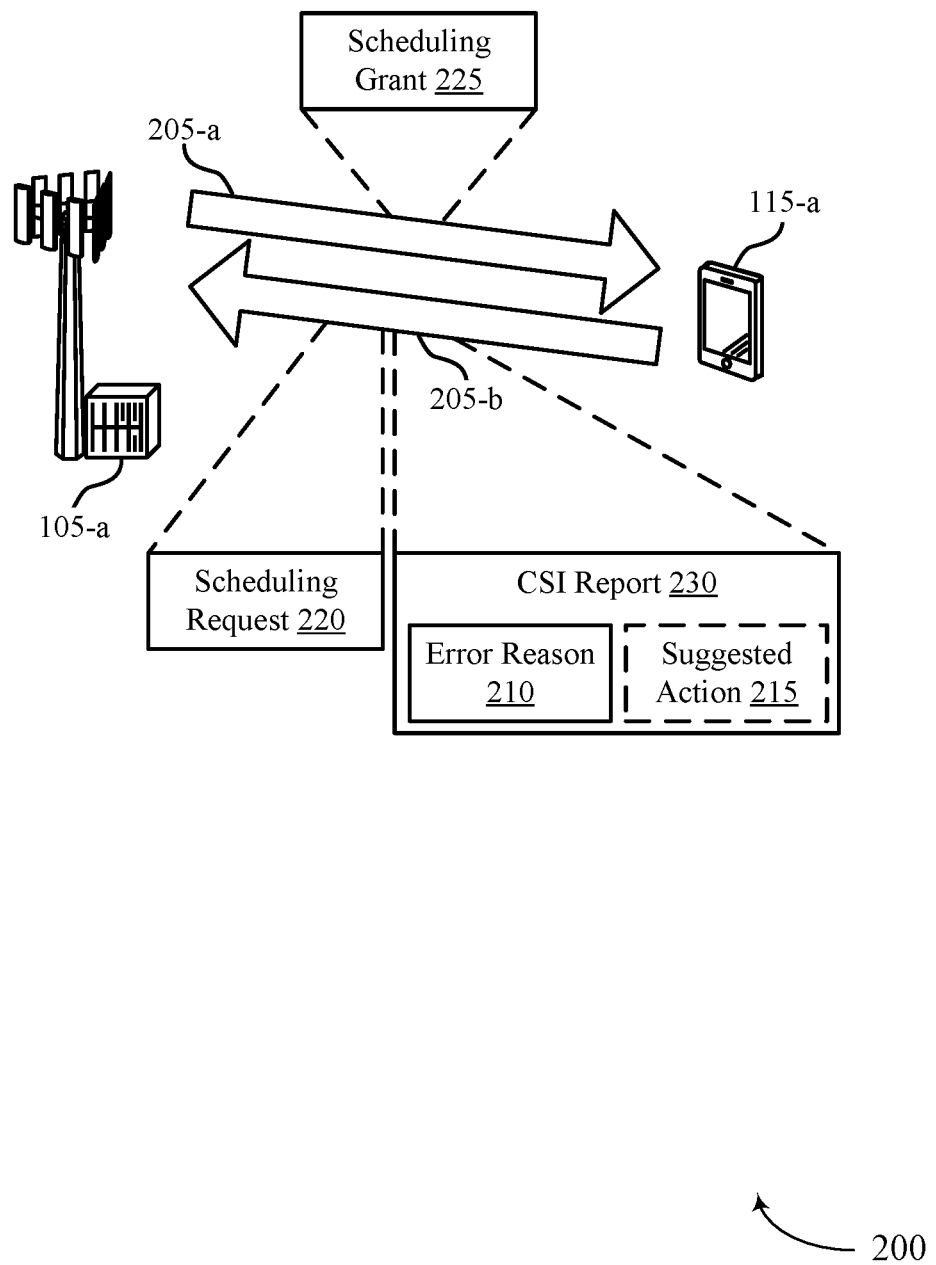

FIG. 2 illustrates an example of a wireless communications system 200 that supports error reason indication for reception failure in accordance with aspects of the present disclosure. In some examples, wireless communications system 200 may implement aspects of wireless communications system 100. Wireless communications system 200 may include UE 115-a and base station 105-a, which may be respective examples of a UE 115 and a base station 105, as described with reference to FIG. 1. In some cases, UE 115-a may implement an error detection procedure and indicate error detection information to base station 105-a. Additionally or alternatively, other wireless devices, such as base station 105-a, may implement an error reason detection procedure.

Base station 105-a and UE 115-a may be in communication with one another. For example, base station 105-a may transmit information to UE 115-a on a downlink channel 205-a, and UE 115-a may transmit information to base station 105-a on an uplink channel 205-b. Base station 105-a may transmit a downlink transmission to UE 115-a via the downlink channel 205-a, for example, using a beam (e.g., a downlink transmit beam). The downlink transmission may be an example of a PDSCH message (e.g., an SPS PDSCH message) which UE 115-a may attempt to decode. If UE 115-a fails to receive and/or decode the downlink transmission, UE 115-a may transmit, via the uplink channel 205-b, a failure indication to inform base station 105-a of the decoding failure (e.g., a HARQ message indicating a NACK).

In some cases, UE 115-a may determine an error reason for the failure and, in addition to transmitting the failure indication, may transmit (e.g., in a PUCCH) a scheduling request 220 to the base station 105-a indicating that the UE 115-a has determined an error reason. The scheduling request 220 may include a request for uplink resources (e.g., for the UE 115-a to transmit a CSI report 230). In some examples, the UE 115-a may transmit the scheduling request 220 to trigger resource allocation for a CSI report 230 transmission (e.g., instead of waiting for a preconfigured periodic CSI reporting occasion or for base station 105-a to trigger a CSI reporting occasion). In some cases, the scheduling request 220 may be transmitted on multiple uplink beams (e.g., if UE 115-a fails to decode the downlink message due to beam blocking, an uplink beam may be similarly blocked and as such, transmitting scheduling request 220 on multiple uplink beams may avoid failure due to beam blocking). In some cases, base station 105-a may configure UE 115-a with a timer, where UE 115-a may refrain from transmitting a scheduling request 220 while the timer is active. The timer may thus prevent UE 115-a from transmitting multiple scheduling requests 220 within a short time period (e.g., below a threshold frequency).

The CSI report 230 may include an indication of the error reason 210, an indication of a suggested radio link adaptation action 215, or both. Base station 105-a may provide a scheduling grant 225 to UE 115-a (e.g., in response to receiving a scheduling request 220), which may include resources (e.g., time resources, frequency resources) for UE 115-a to transmit the CSI report 230. For example, the scheduling grant 225 may include resources for UE 115-a to indicate a reason for the error in receiving and/or decoding the downlink transmission. In some examples, the scheduling grant 225 may further include resources for UE 115-a to indicate a suggested radio link adaptation action 215 that base station 105-a may perform when retransmitting the downlink message.

In some cases, the scheduling grant 225 may be transmitted as part of downlink control information (DCI). For example, a DCI message including the scheduling grant 225 may allocate, via additional or appended fields, resources for UE 115-a to transmit an error reason 210 indication and a suggested radio link adaptation action 215. In some cases, the error reason 210 may be indicated with a bit field. For example, the error reason 210 may be indicated with three bits. A bit value of 0 for the bit field (e.g., {000}) may indicate a coverage hole, a bit value of 1 may indicate beam blocking, a bit value of 2 may indicate partial beam blocking, a bit value of 3 may indicate interference, and a bit value of 4 may indicate frequency selective fading. In some cases, one bit value (e.g., a bit value of 5) may indicate that UE 115-a failed to detect the error cause for the reception and/or decoding failure. It is to be understood that any mapping of error reasons 210 to bit values may be supported, as well as any number of error reasons 210. The suggested radio link adaptation action 215 may be communicated via a bitmap, where each bit index in the bitmap corresponds to a suggested action. As an example, in a four-bit bitmap, a first bit index may be associated with a lowering of an MCS, a second bit index may be associated with a beam change, a third bit index may be associated with an RBG change, and a fourth bit index may be associated with a multi-slot transmission. As such, UE 115-a may indicate {1010} in the bitmap in order to suggest that the base station 105-a lowers the MCS and changes the RBG (e.g., based on the 1 values in the first and third bit indices). It is to be understood that any mapping of suggested radio link adaptation actions 215 to bit indices may be supported, as well as any number of suggested radio link adaptation actions 215 (e.g., supported by base station 105-a). UE 115-a may transmit the indication of the error reason 210, the indication of the suggested radio link adaptation action 215, or both as part of the CSI report 230 (or in another message).

The error reason 210 indicated in the CSI report 230 may be, for example, a gap in a coverage area, a blocking (e.g., fully or partially) of the beam on which the downlink message was transmitted, interference (e.g., bursty interference, persistent interference), fading (e.g., frequency selective fading), collision (e.g., in an unlicensed spectrum), or any combination thereof. UE 115-a may determine the error reason 210 by performing one or more measurements (e.g., a received signal strength measurement, a reference signal received power (RSRP) measurement, a reference signal received quality (RSRQ) measurement, a received signal strength indicator (RSSI), a signal-to-noise ratio (SNR), a signal-to-interference-plus-noise ratio (SINR), or any other measurement). In some cases, UE 115-a may perform the measurements upon activation by base station 105-a. For example, base station 105-a may configure UE 115-a (e.g., using RRC signaling or another activation technique) to perform one or more specific measurements in order to support detecting an error reason 210 upon reception failure by the UE 115-a.

The suggested radio link adaptation action 215 (e.g., explicitly or implicitly indicated by the CSI report 230) may be based on the error reason 210. In some examples, base station 105-a may receive the indication of the error reason 210 and may determine a radio link adaptation action based on the error reason 210. In some other examples, UE 115-a may determine a radio link adaptation action based on the error reason 210 and may suggest the determined radio link adaptation action 215 to base station 105-a (e.g., in the CSI report 230). In some cases, UE 115-a may suggest a combination of actions. As an example, UE 115-a may determine that it failed to receive and/or decode a downlink transmission as a result of beam blocking and may indicate that changing the beam used for a retransmission of the downlink message may potentially mitigate a similar beam blocking failure for the retransmission. Similarly, UE 115-a may indicate that the base station 105-a should change an RBG, retransmit the downlink message on a multi-slot transmission, delay the retransmission for a period of time (e.g., a back-off period), lower an MCS, or some combination thereof based on the detected error reason 210. As an additional example, if UE 115-a fails to receive and/or decode a message based on a collision of signals (e.g., due to operating in an unlicensed spectrum, due to a hidden node in a V2X or other D2D system), base station 105-a may implement a back-off period (e.g., as a radio link adaptation action) prior to retransmission to attempt to avoid further collisions (e.g., in a same contention window).

In some examples, base station 105-a may request for UE 115-a to transmit the CSI report 230 including the error reason 210 indication and/or the suggested radio link adaptation action 215 indication. Base station 105-a may transmit a request for CSI report 230, for instance, upon receiving a NACK, failing to receive an expected ACK or NACK, or failing to receive an expected (e.g., scheduled) uplink transmission from UE 115-a. As an example, base station 105-a may transmit a downlink message and may expect a feedback response, an uplink message, or both from UE 115-a. The downlink message, however, may not have been decoded correctly by UE 115-a, and, accordingly, base station 105-a may not receive the expected feedback response or uplink message. In response, base station 105-a may transmit a request for UE 115-a to transmit a CSI report 230 including an error reason 210 indication, a suggested radio link adaptation action 215, or both. In some cases, base station 105-a may also activate a set of measurements for UE 115-a to perform to determine the error reason 210.

Based on the error reason 210, the suggested radio link adaptation action 215, or both, base station 105-a may change one or more parameters and may transmit a retransmission of the downlink message to UE 115-a using the adapted radio link. For example, if the CSI report 230 indicates that the downlink message (e.g., transmitted on a first downlink beam) failed due to beam blocking and that base station 105-a should perform a beam change, base station 105-a may transmit a retransmission of the downlink message on a downlink beam different from the first downlink beam. In some cases, base station 105-a may transmit the downlink retransmission upon reception of the CSI report 230. For example, base station 105-a may operate according to two-stage HARQ feedback. Base station 105-a may receive a NACK message (e.g., a first stage of HARQ feedback) from UE 115-a for one or more downlink transmissions and may refrain from retransmitting the one or more downlink transmissions until a CSI report 230 is received (e.g., a second stage of HARQ feedback). In this way, base station 105-a may adapt the radio link for the retransmission according to the additional error information included in the CSI report 230, improving the reception reliability of the retransmission (e.g., as compared to the one or more failed downlink transmissions).

Figure 3:
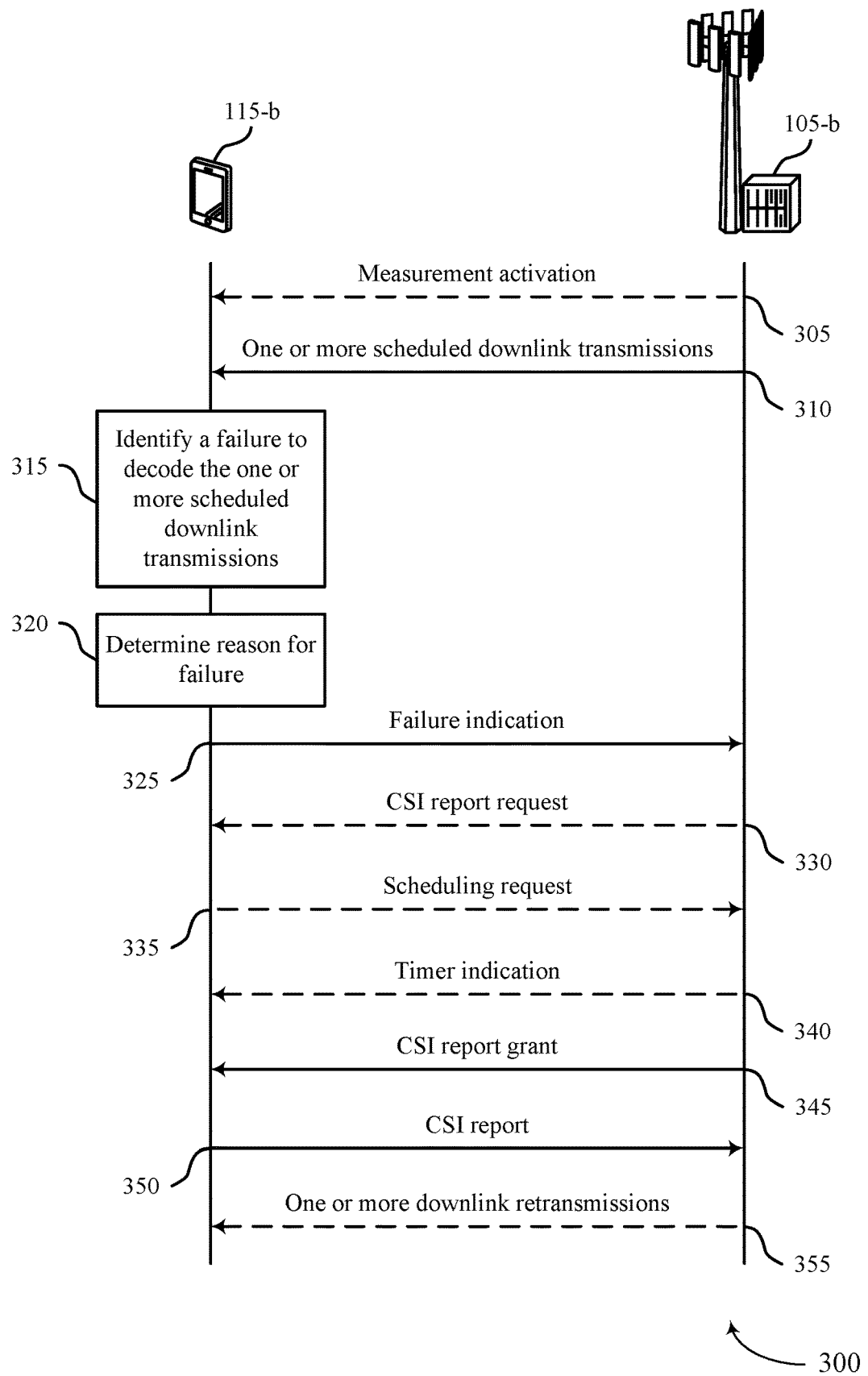
FIG. 3 illustrates a process flow that supports error reason indication for reception failure in accordance with aspects of the present disclosure.

FIG. 3 illustrates an example of a process flow 300 that supports error reason indication for reception failure in accordance with aspects of the present disclosure. In some examples, process flow 300 may implement aspects of wireless communications systems 100 and 200. The process flow 300 may illustrate an example error detection and reporting procedure. For example, UE 115-b may perform an error detection procedure and may transmit an error reason indication to base station 105-b. Base station 105-b and UE 115-b may be examples of the corresponding wireless devices described with reference to FIGS. 1 and 2. In some cases, instead of UE 115-b implementing the error detection and reporting procedure, a different type of wireless device (e.g., a base station 105) may perform an error detection procedure. Alternative examples of the following may be implemented, where some steps are performed in a different order than described or are not performed at all. In some cases, steps may include additional features not mentioned below, or further steps may be added.

In some cases, at 305, UE 115-b may receive an activation of a set of measurements for determining an error reason for decoding failures. In some cases, the activation may be included in a configuration message. The configuration message may include information to be used by UE 115-b in determining a cause of failure by UE 115-b to decode scheduled downlink transmission. The configuration message may include a set of thresholds for UE 115-b to use to determine the cause of failure.

At 310, base station 105-b may transmit, to UE 115-b, one or more scheduled downlink transmissions on a first downlink beam. In some cases, the one or more scheduled downlink transmissions are examples of SPS PDSCH transmissions.

At 315, UE 115-b may identify that UE 115-b failed to decode one or more scheduled downlink transmissions directed to UE 115-b on the first downlink beam. In some cases, the failure to decode the one or more scheduled downlink transmissions may be due to beam blocking, interference, fading, coverage holes, collisions, or the like.

At 320, UE 115-b may determine (e.g., based on measurements activated at 305) an error reason associated with the failure. For example, UE 115-b may determine that the failure is due to the first downlink beam being fully or partially blocked. To determine that the failure is due to beam blocking, UE 115-b may perform a beam blocking detection procedure. For example, UE 115-b may compare one or more signal strength parameters to an associated threshold. If each signal strength parameter is below the threshold, then UE 115-b may determine that complete beam blocking (e.g., full beam blocking) is occurring. If each signal strength parameter is in between two thresholds, then UE 115-b may determine that partial beam blocking is occurring. In other examples, UE 115-b may determine that the failure is due to a coverage hole, a collision, interference, or fading, among other examples (e.g., based on one or more measurements performed by UE 115-b).

In some implementations, to determine the error reason, UE 115-b may measure a signal strength parameter for each of the one or more scheduled downlink transmissions received over each downlink beam, and UE 115-b may perform one or more comparisons of the measured signal strengths (e.g., RSRP) to a set of thresholds. The set of thresholds may include one or more L3 thresholds and/or one or more L1 thresholds.

In some implementations, UE 115-*b* may determine, based on the error reason associated with the failure, a suggested radio link adaptation action for base station 105-*b* to perform. For example, UE 115-*b* may determine that the failure is due to the first downlink beam being blocked. In such an example, UE 115-*b* may determine a beam change that base station 105-*b* may implement to increase the likelihood of success for a retransmission of the one or more downlink transmissions. Other suggested radio link adaptation actions may include, but are not limited to, lowering an MCS value, performing an RBG change, implementing a multi-slot transmission, implementing a back-off period for delaying a retransmission, or a combination thereof.

At 325, UE 115-*b* may transmit, to base station 105-*b*, an indication of the failure identified at 315. UE 115-*b* may indicate which downlink transmissions failed, the number of failed downlink transmissions, or both. For example, UE 115-*b* may transmit a NACK indication for each failed downlink transmission. Additionally or alternatively, UE 115-*b* may indicate that UE 115-*b* has determined the error reason. In the case that partial beam blocking occurred, UE 115-*b* may transmit, to base station 105-*b*, the indication of failure on the partially blocked beam, but at a lower data rate (e.g., lower MCS). In the case that complete beam blocking occurred, UE 115-*b* may transmit, to base station 105-*b*, the indication of the failure on a new beam (e.g., a non-blocked beam), or a set of new beams (in a beam sweeping manner).

At 330, base station 105-*b* may optionally transmit a request for UE 115-*b* to indicate the error reason determined at 320, a suggested radio link adaptation action, or both. The request may indicate that the UE 115-*b* should transmit the error reason indication and the suggested radio link adaptation action indication as part of a CSI report.

At 335, UE 115-*b* may transmit, to base station 105-*b* and based on the error reason determination, a scheduling request. In some implementations, UE 115-*b* may transmit the scheduling request with the failure indication (e.g., appended with the ACK/NACK information at 325). In some cases, UE 115-*b* may transmit the scheduling request on a set of uplink beams. In some cases, to transmit to the scheduling request, UE 115-*b* may select a cyclic shift to apply to a PUCCH message (e.g., a HARQ feedback message) to indicate the scheduling request. UE 115-*b* may transmit the PUCCH message in accordance with the cyclic shift. In some cases, UE 115-*b* may transmit the scheduling request multiplexed with a HARQ feedback message, a different scheduling request, or a combination thereof. In some cases, the scheduling request may have a higher priority than the different scheduling request. In some implementations, UE 115-*b* may transmit the scheduling request multiplexed with other information included in the PUCCH message. In some examples, UE 115-*b* may transmit the scheduling request instead of transmitting a beam failure scheduling request. In some implementations, transmitting the scheduling request may include transmitting a PUCCH message that includes the scheduling request, where a format of the PUCCH message is one of format 0, format 1, format 2, format 3, or format 4. The PUCCH message may include an information bit to indicate the scheduling request.

At 340, UE 115-*b* may receive an indication of a timer prohibiting transmission of a further scheduling request until the timer expires. In some other cases, UE 115-*b* may implement the timer independent of base station 105-*b*. For example, UE 115-*b* may automatically activate the timer upon transmitting a scheduling request and may refrain from transmitting another scheduling request until the timer expires. The timer may be an example of a "RadioLinkIndicationProhibitTimer."

At 345, base station 105-*b* may transmit a scheduling grant to UE 115-*b*. The scheduling grant may include a grant for transmission of a CSI report. The grant may include resources for an indication of the error reason determined at 320. In some cases, the grant may also include resources for an indication of a suggested radio link adaptation action by UE 115-*b*. Base station 105-*b* may grant resources in the uplink for the fields supporting the error reason indication, the suggested radio link adaptation action indication, or both using a DCI format (e.g., DCI format 0_1). In some examples, UE 115-*b* may receive the grant via an SPS PDSCH message on a second downlink beam. In some such examples, UE 115-*b* may select an uplink beam for transmission of the CSI report that has reciprocity with the second downlink beam.

At 350, UE 115-*b* may transmit the CSI report to the base station 105-*b* in accordance with the grant received at 345. The CSI report may include an indication of the error reason determined at 320. In some implementations, the CSI report may additionally or alternatively include an indication of the suggested radio link adaptation action. The CSI report may be an example of a wideband CSI report supporting error reason indication. In some cases, such a CSI report may be referred to as an error detection wideband CSI report. Additionally or alternatively, UE 115-*b* may transmit a MAC control element (CE) transmission including the error detection information upon allocation of physical uplink shared channel (PUSCH) resources (e.g., by the scheduling grant at 345).

At 355, UE 115-*b* may receive, from base station 105-*b*, a retransmission of the one or more scheduled downlink transmissions (e.g., the transmissions that UE 115-*b* previously failed to receive and/or decode) based on the CSI report transmitted to base station 105-*b*. Base station 105-*b* may adapt a radio link for the retransmission based on a radio link adaptation action. In some examples, base station 105-*b* may select the radio link adaptation action to perform based on the error reason indicated in the CSI report by UE 115-*b*. In some other examples, base station 105-*b* may determine the radio link adaptation action based on a suggested radio link adaptation action included in the CSI report by UE 115-*b*. In some cases, base station 105-*b* may perform a combination of radio link adaptation actions based on the error reason indication. The radio link adaptation actions may include an MCS value change, a beam change (e.g., an update to an active TCI state), an RBG change, a multi-slot transmission change, use of a back-off period for delaying a retransmission, or a combination thereof.

Figure 4:
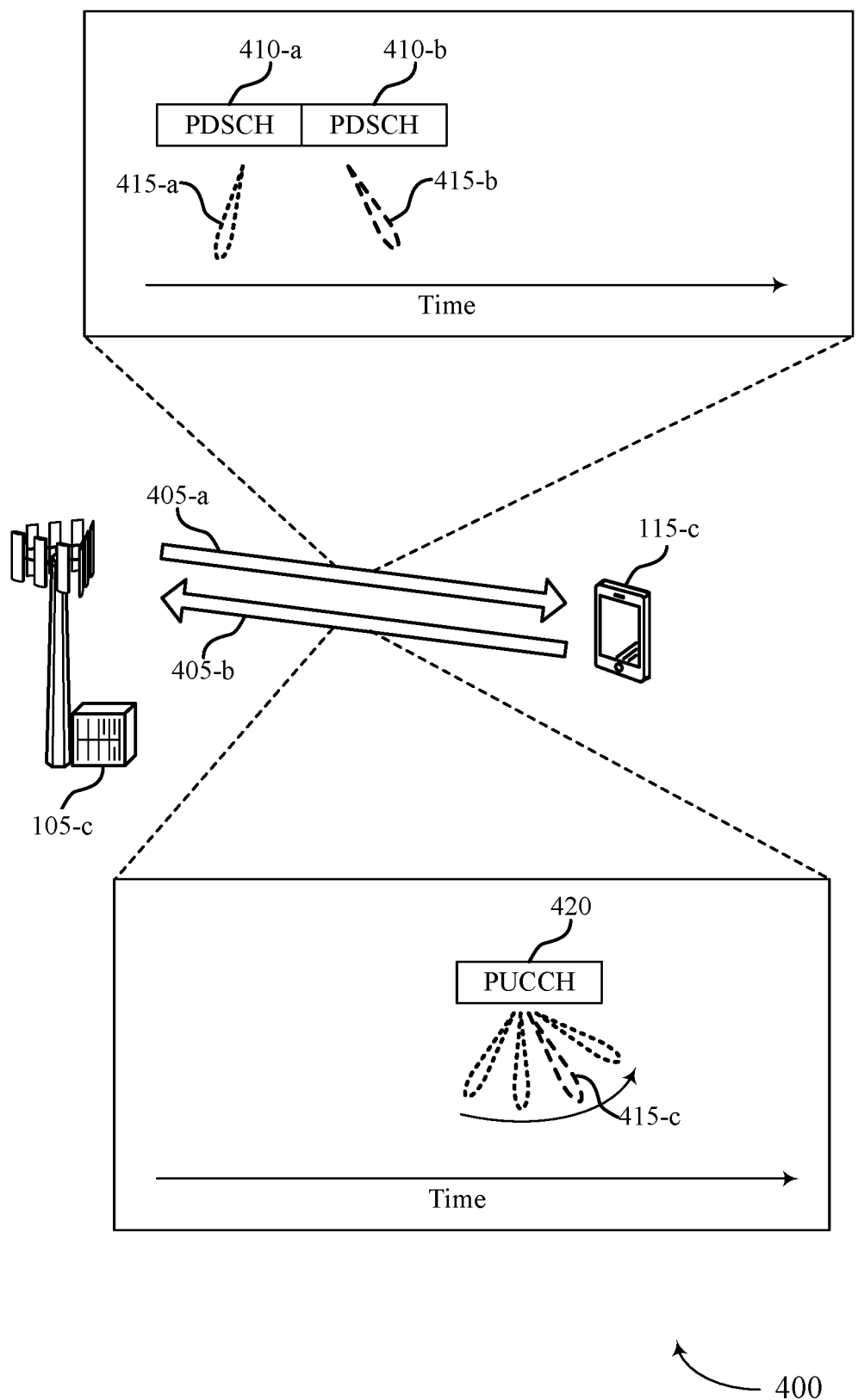
FIGS. 4 and 5 illustrate examples of wireless communications systems that support error reason indication for reception failure in accordance with aspects of the present disclosure.

FIG. 4 illustrates an example of a wireless communications system 400 that supports error reason indication for reception failure in accordance with aspects of the present disclosure. In some examples, wireless communications system 400 may implement aspects of wireless communication systems 100 and 200. Wireless communications system 400 may include UE 115-*c* and base station 105-*c*, which may be respective examples of a UE 115 and a base station 105, as described with reference to FIGS. 1 through 3. In some cases, UE 115-*c* may implement an error detection procedure and indicate error detection to base station 105-*c*. Additionally or alternatively, other wireless devices, such as base station 105-*c*, may implement an error detection procedure.

In wireless communications system 400, base station 105-c and UE 115-c may be in communication with one another. For example, base station 105-c may transmit information to UE 115-c on downlink 405-a, and UE 115-c may transmit information to base station 105-c on uplink 405-b. Base station 105-c may configure UE 115-c (e.g., via an RRC message) to perform error detection and report the findings of the detection back to base station 105-c with feedback (e.g., ACK and NACK). For example, an information element (IE) may be included in an RRC message, such as a CSI measurement configuration RRC message or a different configuration message. The configuration may include parameters to use for error detection, such as one or more power thresholds or an indication of when to transmit NACK via uplink beam sweeping. In some examples, downlink 405-a and uplink 405-b may be configured for URLLC.

Base station 105-c may transmit PDSCH 410 using multiple TRPs, TCI states, codebooks, or a combination thereof. Specifically, a first transmission of PDSCH 410-a may be transmitted at a first time via beam 415-a, and a second transmission of PDSCH 410-b may be transmitted at a second time via beam 415-b. The transmissions of PDSCH 410-a and 410-b may include the same data packet and may both be assigned a same sequence number. In some examples, PDSCH 410 may be semi-persistently scheduled by base station 105-c, and wireless communications system 400 may be an IoT system that communicates semi-persistently using a small packet size periodically (e.g., every N milliseconds (ms)). In some cases, the traffic may not change in the IoT system.

UE 115-c may attempt to decode PDSCH 410. For example, UE 115-c may attempt a joint decoding of PDSCH 410-a and 410-b. In some cases, UE 115-c may not be able to successfully decode one or both PDSCH 410. Unsuccessful decoding may be a result of beam blocking, downlink interference, cross link interference, or fading, among other examples. Accordingly, UE 115-c may evaluate the reason for the decoding failure. In a specific example, UE 115-c may determine if the decoding failure was due to beam blocking of downlink 405-a. The UE 115-c may determine if complete beam blocking occurred during the transmission of PDSCH 410 based on comparing one or more signal parameters to one or more power thresholds (e.g., layer 1 or layer 3 RSRP). If beam blocking occurred (e.g., complete beam blocking or partial beam blocking), UE 115-c may report the blocking (e.g., in a CSI-RS report) and request a new downlink beam from base station 105-c for retransmission along with a NACK in PUCCH 420 via an uplink beam sweep 415-c.

To report the occurrence of beam blocking in the CSI report, UE 115-c may request a grant to transmit the CSI report rather than waiting for a preconfigured periodic CSI reporting occasion or waiting for base station 105-c to trigger a CSI reporting occasion. As such, UE 115-c may transmit an error detection scheduling request (e.g., a beam blocking detection scheduling request) in a PUCCH along with the NACK. In some cases, UE 115-c may be configured to determine a cyclic shift to apply to the PUCCH based on the PUCCH including the error detection scheduling request. Base station 105-c may receive the PUCCH including the error detection scheduling request and may transmit a grant to UE 115-c. Based on receiving the grant, UE 115-c may transmit a CSI report including the error detection information (e.g., including an indication of whether the decoding failure was due to beam blocking), or a request for a new downlink beam.

Additionally or alternatively, if UE 115-c determines beam blocking occurred, UE 115-c may request either a lower MCS relative to the MCS used for PDSCH 410 and a same downlink beam, or the same or different MCS for retransmission on a new beam different from beams 415-a and 415-b. In another example, if UE 115-c determines that complete or partial beam blocking did not occur, UE 115-c may report this information in the NACK of PUCCH 420 or a CSI-RS report to base station 105-c. This determination may indicate that the decoding failure was a result of slow fading or downlink interference from another cell, which may benefit from a lower MCS but, in some cases, may not benefit from a new beam.

Base station 105-c may receive the NACK, error detection scheduling request, and error detection information via one or more PUCCH messages 420. Consequently, base station 105-c may perform a retransmission using adjusted communication parameters, such as MCS or TCI state, based on the beam detection information. Thus, base station 105-c may make an informed decision about what communication adaptation actions to take to efficiently retransmit to UE 115-c and to transmit other transmissions to UE 115-c.

Figure 5:
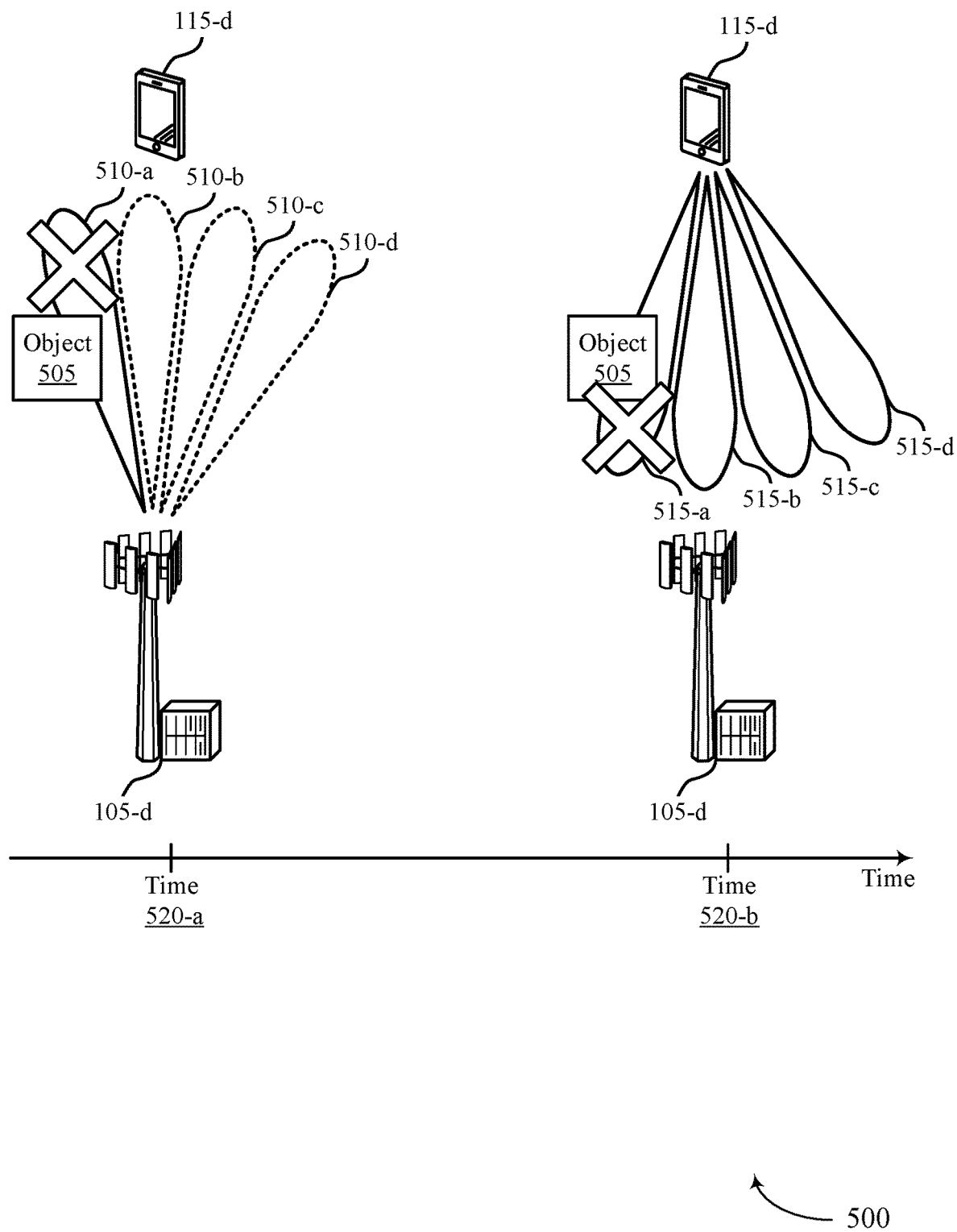

FIG. 5 illustrates an example of a wireless communications system 500 that supports error reason indication for reception failure in accordance with aspects of the present disclosure. In some examples, wireless communications system 500 may implement aspects of wireless communications systems 100, 200, and 400. Wireless communications system 500 may include UE 115-d and base station 105-d, which may be respective examples of a UE 115 and a base station 105, as described with reference to FIGS. 1 through 4. In some cases, UE 115-d may implement an error detection procedure (e.g., a beam blocking detection procedure) and indicate error detection information to base station 105-d. Additionally or alternatively, other wireless devices, such as base stations 105-d, may implement an error detection and/or reporting procedure.

UE 115-d may be configured to communicate with base station 105-d. Base station 105-d may be capable of transmitting one or more downlink messages via downlink beams 510-a, 510-b, 510-c, and 510-d. Downlink beams 510-a, 510-b, 510-c, and 510-d may be reciprocal with (or otherwise correspond to) uplink beams 515-a, 515-b, 515-c, and 515-d, respectively. UE 115-d may be configured to receive downlink messages from base station 105-d via downlink beam 510-a. As described herein, base station 105-d may attempt a multi-TRP transmission of one or more PDSCH messages. For example, base station 105-d may transmit a PDSCH message to UE 115-d via at least beam 510-a. In some cases, an object 505 (e.g., machine, robot, robotic device, person, equipment) may move to a location that is in the way of downlink beam 510-a and results in downlink beam 510-a being partially or completely blocked. In some other cases, UE 115-d or base station 105-d may move such that object 505 partially or completely blocks downlink beam 510-a.

In some cases, base station 105-d and UE 115-d may be in an industrial environment (e.g., factory, warehouse) or some other mobile environment in which objects frequently move. A beam may be blocked if there is a fast decrease in useful signal strength received (e.g., $S_{beamID}$) from a number (e.g., #N) of adjacent beams to the currently used beam, M, (e.g., beamID∈Set:{M,M+N}). A beam may be blocked if there is degradation across the whole system bandwidth, W for a given duration, T. A beam may be blocked if the useful signal strength from a potentially blocked beam (e.g., with beamID $S_{beamID}$∈Set:{M,M+N}) is below a noise floor, $Rx_{SensitiyLevel}$. A beam may be blocked if erroneous reception occurs (e.g., SINR<$SINR_{Threshold}$). A beam may be blocked if the received signal strength from non-blocked beams (e.g., $S_{beamID}$ with beamID∈Set:{M,M+N}) is above a noise floor, $Rx_{SensitiyLevel}$. In some cases, beam switching may provide a viable link. In some cases, detecting and adapting communications to account for beam blocking may be a higher priority than detecting and adapting communications to account for interference. For example, if beam blocking occurs, interference may have little to no additional impact on the system. If erroneous reception occurs (e.g., SINR<$SINR_{Threshold}$) with low interference (e.g., I<$SINR_{Threshold}$), then the erroneous reception may likely be due to beam blocking.

UE 115-$d$ may perform a decoding procedure for the PDSCH message, but the decoding may be unsuccessful (e.g., decoding failure). UE 115-$d$ may perform an error detection procedure to determine the cause of the decoding failure (e.g., beam blocking, interference, fading), because not all causes may be solved by changing downlink beams or TCI states. For example, if the cause of the decoding failure is due to interference or fading, the PDSCH may be successfully retransmitted and decoded if the PDSCH is transmitted at a lower MCS without changing beams. Changing downlink beams in the cases of interference and fading may result in an inefficient use of resources. Accordingly, UE 115-$d$ may perform a beam blocking detection procedure to determine whether the cause of the decoding failure was due to beam blocking.

The beam blocking detection procedure may include UE 115-$d$ comparing a set of signal strength parameters to a set of thresholds (e.g., power thresholds) defined for each signal strength parameter. For example, UE 115-$d$ may perform comparison 1, comparison 2, comparison 3, or a combination thereof (as described below). In some cases, comparisons 1 through 3 may be associated with layer 3 (L3) signal measurements. If the signal strength parameter for one or more of the comparisons is below the defined threshold, UE 115-$a$ may determine that unsuccessful decoding is due to beam blocking (e.g., full beam blocking). For comparison 1, UE 115-$d$ may determine whether the received signal strength associated with downlink beam 510-$a$ that is averaged over the bandwidth of the system or a BWP and is averaged over a beam blocking duration (e.g., beam block coherence time) is below a threshold. Comparison 1 is as follows:

$$L3\_RSRP_{averageSystemBandwidth} < L3\_RSRP_{Threshold3} \quad (1)$$

For comparison 2, UE 115-$d$ may determine whether the maximum received signal strength associated with downlink beams 510, among the resource blocks, that is averaged over a beam blocking duration (e.g., beam blocking coherence time) is below a threshold. Comparison 2 is as follows:

$$\max(L3\_RSRP_{ResourceBlock}) < L3\_RSRP_{Threshold4} \quad (2)$$

For comparison 3, UE 115-$d$ may determine whether the received signal strength associated with downlink beam 510-$a$, on at least a preconfigured number of physical resource blocks (PRBs), X, or a preconfigured percentage (e.g., Y %) of PRBs within a BWP, that are averaged over a beam blocking duration (e.g., beam blocking coherence time) is below a threshold. Comparison 3 is as follows:

$$L3\_RSRP_{ResourceBlock} < L3\_RSRP_{Threshold5}, \text{ for } X \text{ PRBs} \quad (3)$$

In some cases, upon performing comparisons 1 through 3 (or alternatively to performing comparisons 1 through 3) where each signal strength parameter is determined to be below the configured threshold, UE 115-$d$ may be configured to perform one or more additional comparisons. For example, UE 115-$d$ may perform comparison 4, comparison 5, comparison 6, or a combination thereof (as described below) to strengthen the determination that unsuccessful decoding was due to beam blocking. In some cases, comparisons 4 through 6 may be associated with layer 1 (L1) signal measurements. For comparison 4, UE 115-$d$ may determine whether an instantaneous received signal strength associated with downlink beam 510-$a$ that is averaged over a system bandwidth is below a threshold. Comparison 4 is as follows:

$$L1\_RSRP_{averageSystemBandwidth} < L1\_RSRP_{Threshold1} \quad (4)$$

For comparison 5, UE 115-$d$ may determine whether an instantaneous maximum received signal strength that is associated with downlink beams 510 among the resource blocks is below a threshold. Comparison 5 is as follows:

$$\max(L1\_RSRP_{ResourceBlock}) < L1\_RSRP_{Threshold2} \quad (5)$$

For comparison 6, UE 115-$d$ may determine whether a significant decrease in received signal strength associated with downlink beams 510 that is averaged over a system bandwidth is below a threshold. Comparison 6 is as follows:

$$L1\_RSRP_{t1} - L1\_RSRP_{t0} < L1\_RSRP\_Drop_{Threshold5} \quad (6)$$

For example, UE 115-$d$ and base station 105-$d$ may communicate via downlink beam 510-$a$ and a reciprocal uplink beam, such as uplink beam 515-$a$. Sometime before time 520-$a$, an object 505 may move to a location such that object 505 partially or completely blocks downlink beam 510-$a$ and due to reciprocity, object 505 may block the corresponding uplink beam 515-$a$. At time 520-$a$, base station 105-$d$ may transmit a scheduled downlink transmission to UE 115-$d$ via downlink beam 510-$a$. UE 115-$d$ may attempt to receive the scheduled downlink transmission (e.g., PDSCH, SPS PDSCH) on downlink beam 510-$a$ and UE 115-$d$ may fail to successfully decode the downlink transmission. UE 115-$d$ may perform the beam blocking detection procedure and determine that UE 115-$d$ could not successfully decode the downlink transmission due to beam blocking (e.g., full beam blocking). Based on the determination that downlink beam 510-$a$ is being blocked at time 520-$a$, UE 115-$d$ may determine that reciprocal uplink beam 515-$a$ may also be blocked (e.g., fully blocked). As such, at time 520-$b$, UE 115-$d$ may transmit a beam blocking detection scheduling request to base station 105-$d$ over multiple uplink beams 515 in a beam sweeping manner to improve the likelihood that the beam blocking detection scheduling request is received by base station 105-$d$.

Base station 105-$d$ may receive the beam blocking scheduling request over one or more of the uplink beams 515 and select a downlink beam 510 that is reciprocal to an uplink beam 515 that base station 105-$d$ received the beam blocking detection scheduling request on. In some cases, base station 105-$d$ may select the downlink beam 510 based on one or more measurements of the received uplink beams 515, such as beam strength measurements, or beam quality measurements. The selection may be based on the strongest beam. Upon the selection of a downlink beam 510, base station 105-$d$ may transmit a grant over the selected downlink beam 510, where the grant may provide UE 115-$d$ with a set of resources to transmit a beam blocking detection CSI report to base station 105-$d$ to indicate that the failure to successfully decode the scheduled downlink transmission was due to beam blocking. In some cases, the grant may also provide UE 115-*d* with a set of resources for the CSI report to include a suggested radio link adaptation action (e.g., a beam change, an RBG change, an MCS lowering, a multi-slot transmission, a back-off period to delay a retransmission, or the like).

In some implementations, UE 115-*d* may be configured to perform one time beam blocking detection (e.g., aperiodic beam blocking detection). For example, UE 115-*d* may be configured to receive a downlink transmission from base station 105-*d*, such as an SPS transmission (e.g., SPS PDSCH). UE 115-*d* may be configured with a number of, N, downlink beams for downlink transmission and a number of, K, downlink and uplink beams prepared for reference signal transmission (e.g., phase tracking reference signal (PTRS) transmission). In some cases, the uplink beams and the downlink beams have reciprocity. As UE 115-*d* is configured to perform one time beam blocking detection, upon a reception of a single erroneous transmission, UE 115-*d* may perform a beam blocking detection procedure. In one time beam blocking detection, UE 115-*d* may be able to quickly determine that beam blocking is occurring to mitigate the number of erroneous signals UE 115-*d* may receive. In some implementations, UE 115-*d* may be configured to perform periodic beam blocking detection. For example, rather than performing beam blocking detection procedures after a single erroneous reception, UE 115-*d* may be configured to perform beam blocking detection procedures after receiving a preconfigured number of, L (e.g., more than 1), erroneous receptions. In some cases, UE 115-*d* may transmit a NACK after each erroneous reception, then, upon determination that L erroneous receptions have occurred, UE 115-*d* may perform the beam blocking detection procedure.

In some implementations, UE 115-*d* may be configured to perform partial beam blocking detection. In some cases, partial beam blocking may occur when an object 505 partially blocks a beam 510 or 515. In some cases, the partially blocked beam may reflect off the object 505 and result in a weaker path to the receiving device (e.g., UE 115-*d* or base station 105-*d*) than the original path associated with the original un-blocked beam. UE 115-*d* may perform partial beam blocking procedures upon receiving a single erroneous transmission (e.g., one time blocking detection) or upon receiving a preconfigured number of L (e.g., greater than 1) erroneous transmissions (e.g., periodic blocking detection). UE 115-*d* may be configured to distinguish between partial beam blocking and fading.

The partial beam blocking detection procedure may include UE 115-*d* comparing a set of signal strength parameters to a set of thresholds (e.g., power thresholds) defined for each signal strength parameter. For example, UE 115-*d* may perform any combination of comparisons 7 through 16 (as described below). In some cases, comparisons 7 through 16 may be associated with L3 signal measurements and L1 measurements. In some cases, a signal strength parameter may be associated with an upper threshold and a lower threshold. If the signal strength parameter for one or more of the comparisons is in between the upper and lower thresholds, UE 115-*a* may determine that unsuccessful decoding is due to partial beam blocking. For comparison 7, UE 115-*d* may determine whether an instantaneous received signal strength associated with downlink beam 510-*a* that is averaged over a system bandwidth is greater than a threshold. For comparison 8, UE 115-*d* may determine whether an instantaneous received signal strength associated with downlink beam 510-*a* that is averaged over a system bandwidth is below a threshold. Comparison 7 may be the lower threshold and comparison 8 may be the upper threshold associated the signal strength parameter. In some cases, threshold 1 and/or 1A of Comparison 7 and Comparison 8 may each be the same or similar to threshold 1 of comparison 4. Comparison 7 and 8 are as follows:

$$L1\_RSRP_{averageSystemBandwidth} > L1\_RSRP_{Threshold1} \quad (7)$$

$$L1\_RSRP_{averageSystemBandwidth} < L1\_RSRP_{Threshold1A} \quad (8)$$

For comparison 9, UE 115-*d* may determine whether an instantaneous maximum received signal strength associated with downlink beams 510 among the resource blocks is greater than a threshold. For comparison 10, UE 115-*d* may determine whether an instantaneous maximum received signal strength associated with downlink beams 510 among the resource blocks is less than a threshold. Comparison 9 may be the lower threshold and comparison 10 may be the upper threshold associated the signal strength parameter. In some cases, threshold 2 and/or 2A of Comparison 9 and Comparison 10 may each be the same or similar to threshold 2 of comparison 5. Comparison 9 and 10 are as follows:

$$\max(L1\_RSRP_{ResourceBlock}) > L1\_RSRP_{Threshold2} \quad (9)$$

$$\max(L1\_RSRP_{ResourceBlock}) < L1\_RSRP_{Threshold2A} \quad (10)$$

For comparison 11, UE 115-*d* may determine whether the received signal strength associated with downlink beam 510-*a* that is averaged over the bandwidth of the system or a BWP and is averaged over a beam blocking duration (e.g., beam block coherence time) is greater than a threshold. For comparison 12, UE 115-*d* may determine whether the received signal strength associated with downlink beam 510-*a* that is averaged over the bandwidth of the system or a BWP and is averaged over a beam blocking duration (e.g., beam block coherence time) is below a threshold. Comparison 11 may be the lower threshold and comparison 12 may be the upper threshold associated the signal strength parameter. In some cases, threshold 3 and/or 3A of Comparison 11 and Comparison 12 may each be the same or similar to threshold 3 of comparison 1. Comparison 11 and 12 are as follows:

$$L3\_RSRP_{averageSystemBandwidth} > L3\_RSRP_{Threshold3} \quad (11)$$

$$L3\_RSRP_{averageSystemBandwidth} < L3\_RSRP_{Threshold3A} \quad (12)$$

For comparison 13, UE 115-*d* may determine whether the maximum received signal strength associated with downlink beams 510, among the resource blocks, that is averaged over a beam blocking duration (e.g., beam blocking coherence time) is greater than a threshold. For comparison 14, UE 115-*d* may determine whether the maximum received signal strength associated with downlink beams 510, among the resource blocks, that is averaged over a beam blocking duration (e.g., beam blocking coherence time) is less than a threshold. Comparison 13 may be the lower threshold and comparison 14 may be the upper threshold associated the signal strength parameter. In some cases, threshold 4 and/or 4A of Comparison 13 and Comparison 14 may each be the same or similar to threshold 4 of comparison 2. Comparison 13 and 14 are as follows:

$$\max(L3\_RSRP_{ResourceBlock}) > L3\_RSRP_{Threshold4} \quad (13)$$

$$\max(L3\_RSRP_{ResourceBlock}) < L3\_RSRP_{Threshold4A} \quad (14)$$

For comparison 15, UE 115-*d* may determine whether a significant decrease (between t0 and t1) in received signal strength associated with downlink beams 510 that is averaged over a system bandwidth is greater than a threshold. For comparison 14, UE 115-*d* may determine whether a significant decrease (between t0 and t1) in received signal strength associated with downlink beams 510 that is averaged over a system bandwidth is less than a threshold. Comparison 15 may be the lower threshold and comparison 16 may be the upper threshold associated the signal strength parameter. In some cases, threshold 5 and/or 5A of Comparison 15 and Comparison 16 may each be the same or similar to threshold 5 of comparison 6. Comparison 15 and 16 are as follows:

$$L1\_RSRP_{t1} - L1\_RSRP_{t0} > L1\_RSRP\_Drop_{Threshold5} \quad (15)$$

$$L1\_RSRP_{t1} - L1\_RSRP_{t0} < L1\_RSRP\_Drop_{Threshold5A} \quad (16)$$

UE 115-*d* may be configured to perform any number of comparisons 7 through 16. In some implementations, UE 115-*d* may perform comparisons 7 through 10 to determine if partial beam blocking is occurring. In some implementations, UE 115-*d* may perform comparisons 7 through 14 to determine if partial beam blocking is occurring. In some implementations, UE 115-*d* may perform comparisons 7 through 16 to determine if partial beam blocking is occurring. In some cases, a UE 115 may be configured to determine whether partial beam blocking is the cause of the reception failure. If the UE 115 determines that the partial beam blocking is the cause, the UE 115 may be configured to determine if full beam blocking is occurring.

Upon the determination that the one or more erroneous transmissions are due to partial beam blocking, UE 115-*d* may apply or request a lower MCS or apply or request a new beam allocation, with the same or a different MCS. For example, UE 115-*d* and base station 105-*d* may communicate via downlink beam 510-*a* and a reciprocal uplink beam, such as uplink beam 515-*a*. Sometime before time 520-*a*, an object 505 may move to a location such that object 505 partially or completely blocks downlink beam 510-*a* and due to reciprocity, object 505 may block the corresponding uplink beam 515-*a*. At time 520-*a*, base station 105-*d* may transmit a scheduled downlink transmission to UE 115-*d* via downlink beam 510-*a*. UE 115-*d* may attempt to receive the scheduled downlink transmission (e.g., PDSCH, SPS PDSCH) on downlink beam 510-*a* and UE 115-*d* may fail to successfully decode the downlink transmission. UE 115-*d* may perform the beam blocking detection procedure and determine that UE 115-*d* could not successfully decode the downlink transmission due to partial beam blocking. Based on the determination that downlink beam 510-*a* is being partially blocked at time 520-*a*, UE 115-*d* may determine that reciprocal uplink beam 515-*a* may also be partially blocked. As such, at time 520-*b*, UE 115-*d* may transmit a beam blocking detection scheduling request or an indication of the reason of failure to base station 105-*d* over beam 515-*a* at a lower MCS, for example.

Figure 6:
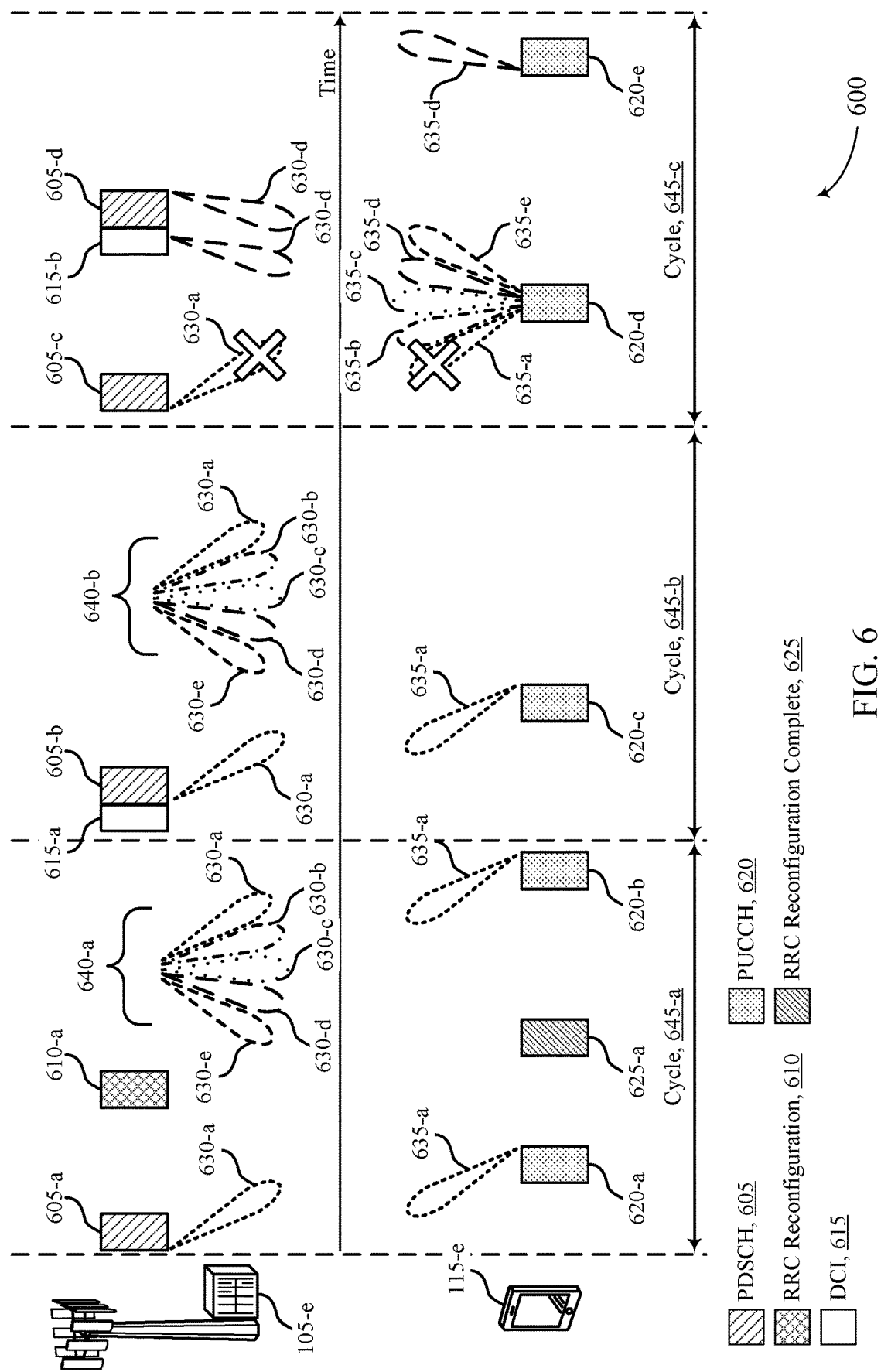
FIG. 6 illustrates an example of a communications procedure that supports error reason indication for reception failure in accordance with aspects of the present disclosure.

FIG. 6 illustrates an example of a communications procedure 600 that supports error reason indication for reception failure in accordance with aspects of the present disclosure. In some examples, communications procedure 600 may implement aspects of wireless communications systems 100, 200, 400, and 500. In some examples, communication procedure 600 may be performed in wireless communications systems 100, 200, 400, and/or 500. Communication procedure 600 may be performed between UE 115-*e* and base station 105-*e*, which may be respective examples of a UE 115 and a base station 105, as described with reference to FIGS. 1 through 5. In some cases, UE 115-*e* may implement an error detection procedure and trigger the transmission of error detection information by transmitting an error detection scheduling request to base station 105-*e*. Additionally or alternatively, other wireless devices, such as base station 105-*e*, may implement an error detection and/or reporting procedure.

A UE 115 (e.g., UE 115-*e*) and a base station (e.g., base station 105-*e*) may communicate in a wireless communication environment (e.g., 5G NR, industrial IoT, or another wireless communication environment). In such an environment, base station 105-*e* may transmit an SPS PDSCH 605 per cycle 645 on a preconfigured downlink beam 630 to indicate resource allocation, such a physical resource block (PRB) allocation. For example, base station 105-*e* may transmit SPS PDSCH 605-*a* on downlink beam 630-*a* in cycle 645-*a*, base station 105-*e* may transmit SPS PDSCH 605-*b* on downlink beam 630-*a*, and base station 105-*e* may transmit SPS PDSCH 605-*c* on downlink beam 630-*a* in cycle 645-*c*. Following each SPS PDSCH transmission 605, UE 115-*e* may transmit an ACK or NACK to base station 105-*e* to indicate whether UE 115-*e* was able to successfully decode the SPS PDSCH transmission 605. UE 115-*e* may transmit the ACK or NACK in a PUCCH transmission 620. In cycle 645-*a*, for example, UE 115-*e* successfully decodes SPS PDSCH transmission 605-*a* and may transmit an ACK to base station 105-*e* in PUCCH 620-*a*. UE 115-*e* may transmit PUCCH 620-*a* on uplink beam 635-*a* that has reciprocity with downlink beam 630-*a*.

In some cycles 645, base station 105-*e* may transmit an RRC reconfiguration message 610 to modify an RRC connection. For example, base station 105-*e* may transmit RRC reconfiguration message 610-*a* to UE 115-*e* to establish, modify, or release radio bearers, to perform handover, to setup, modify, or release measurements, or to indicate other communication information to UE 115-*e*, or a combination thereof. For example, RRC reconfiguration message 610-*a* may indicate CSI reporting configurations such as whether CSI reporting is configured periodically and at what periodicity, or semi-persistently, or aperiodically. In some cases, RRC reconfiguration message 610-*a* may indicate PUCCH formats to UE 115-*e* (e.g., whether UE 115-*e* should use format 0, 1, 2, 3, or 6 to transmit each PUCCH 620). In some cases, RRC reconfiguration message 610-*a* may configure communications for at least cycle 645-*a*, 645-*b*, and 645-*c*. Upon successful reception of an RRC reconfiguration message 610, such as in cycle 645-*a*, UE 115-*e* may transmit RRC reconfiguration complete message 625-*a* to indicate successful reconfiguration according to the information included in RRC reconfiguration message 610-*a*.

A PUCCH may contain uplink control information (UCI), where the UCI may include one or more indications of ACK/NACK, one or more scheduling requests (e.g., a beam blocking detection scheduling request, beam failure related scheduling request, or some other scheduling request), or CSI, or some combination thereof. The PUCCH may be transmitted according to one of five PUCCH formats, such as format 0, format 1, format 2, format 3, or format 6, where the format that is used may be determined and transmitted by the base station 105 to the UE 115. The PUCCH format indication may be included in a configuration message, such as RRC reconfiguration message 610-*a*. The base station 105 may determine which PUCCH format the UE 115 should use based on the information the UE 115 is configured to include in the PUCCH. For example, the base station 105 may select the PUCCH format based on the number of bits configured to be carried in the PUCCH or based on with how many symbols the PUCCH is configured, or a combination thereof.

In some implementations, formats 0 and 2 may be referred to as short PUCCH formats, as they may occupy at most two OFDM symbols. PUCCH format 0 may be capable of transmitting at most two bits and span one or two OFDM symbols. This format can, for example, be used to transmit a HARQ ACK/NACK of a downlink data transmission or to transmit a scheduling request. PUCCH format 2 may be capable of transmitting more than two bits and may span one or two OFDM symbols. PUCCH format 2 can, for example, be used to transmit CSI reports or for multi-bit HARQ ACK/NACKs in the case that the UE 115 receives multiple downlink transmissions. In some implementations, formats 1, 3 and 6 may be referred to as long PUCCH formats as each may occupy between 6 and fourteen OFDM symbols. PUCCH format 1 may be capable of transmitting at most 2 bits, and PUCCH formats 3 and 6 may be both capable of transmitting more than two bits but may differ in multiplexing capacity.

Per RRC configuration, UE 115-e may be configured to perform periodic CSI reporting. For example, in cycle 645-a, base station 105-e and UE 115-e may perform a CSI reporting procedure 640-a. Base station 105-e may transmit CSI-RSs (e.g., in some cases, on one or more downlinks beams 630, such as on downlink beams 630-a, 630-b, 630-c, 630-d, and 630-e). UE 115-e may perform one or more measurements (e.g., RSRP, RSSI, RSRQ) on the received CSI-RSs. UE 115-e may transmit a CSI report to base station 105-e to indicate the one or more measurements. In some cases, the CSI report may be included in a PUCCH 620, such as PUCCH 620-a. In some cases, UE 115-e may determine one or more preferred beams and may explicitly or implicitly indicate the one or more preferred beams to base station 105-e. For example, UE 115-e may transmit a CSI report in PUCCH 620-a on uplink beam 635-a which may be reciprocal with a preferred downlink beam 630 determined by UE 115-e.

At the start of cycle 645-b, base station 105-e may transmit DCI to UE 115-e via DCI message 615-a. In some cases, DCI message 615-a may include TCI preparation information. Following DCI information, base station 105-e may transmit SPS PDSCH message 605-b to UE 115-e using downlink beam 630-a. UE 115-e may successfully receive and decode SPS PDSCH message 605-b and transmit an ACK in PUCCH message 620-c using beam 635-a. In some cases, base station 105-e and UE 115-e may perform another CSI reporting procedure 640-b. In some cases, such as in cycle 645-b, the preferred beams may not change.

As such, in cycle 645-c, base station 105-e may transmit SPS PDSCH message 605-c to UE 115-e on downlink beam 630-a. UE 115-e may attempt to receive and decode SPS PDSCH message 605-c. As described herein, UE 115-e may be unable to successfully decode SPS PDSCH message 605-c. Based on failing to receive one or more scheduled downlink transmissions (e.g., SPS PDSCH message 605), UE 115-e may perform a downlink error detection procedure to determine the reason UE 115-e failed to decode the downlink transmissions. For example, UE 115-e may determine that the failure was a result of beam blocking. Additionally or alternatively, UE 115-e may determine one or more other error reasons for the reception failure.

Upon determining that the UE 115 could not decode one or more downlink transmissions (e.g., due to beam blocking), the UE 115 may be configured to indicate error detection information (e.g., beam blocking detection information) in a CSI report. In some implementations, UE 115-e may transmit CSI reports periodically, semi-persistently, or aperiodically, as configured in RRC reconfiguration message 610-a. For example, a base station 105 may configure a UE 115 to transmit CSI reports periodically at a certain periodicity, such that the UE 115 transmits a CSI report based on the periodicity. In another example, the base station 105 may configure the UE 115 to transmit the CSI report aperiodically, such that the UE 115 may transmit a CSI report upon being prompted by the base station 105. The base station 105 may transmit a trigger to the UE 115, and in response to receiving the trigger, the UE 115 may transmit the CSI report. In some cases, waiting to transmit the beam blocking detection information in a CSI report until a CSI trigger is received from the base station or based on a configured CSI periodicity may be inefficient because communications on the blocked beam may continue until the beam blocking detection information is received by the base station 105.

To improve network efficiency and performance, the UE 115 may be configured to transmit an error detection scheduling request (e.g., a beam blocking detection scheduling request, a coverage hole detection scheduling request, a frequency selective fading detection scheduling request) to the base station 105 in response to detecting the error. The error detection scheduling request may trigger a CSI reporting occasion such that the scheduling request may request a set of uplink resources the UE 115 may use to transmit a CSI report (e.g., a wideband CSI report) that includes the error detection information (e.g., an error indication that the failure was due to beam blocking, a coverage hole, interference, fading, collision). In some cases, the CSI report may additionally or alternatively include a suggested radio link adaptation action (e.g., a beam change recommendation, an RBG change recommendation, a back-off period). In some cases, UE 115-e may be configured to transmit the error detection scheduling request in a PUCCH 620, such as PUCCH 620-d. As an example, if the UE 115 determines that downlink beam 630-a is blocked, due to reciprocity (e.g., because downlink beam 630-a is blocked), uplink beam 635-a may also be blocked. As such, UE 115-e may transmit PUCCH 620-d in a beam sweeping manner, using multiple uplink beams 635, such as uplink beams 635-a, 635-b, 635-c, 635-d, or 635-e, or a combination thereof. In some cases, UE 115-e may determine a cyclic shift to apply to PUCCH message 620-d based on whether UE 115-e has a scheduling request to transmit and based on the PUCCH format with which UE 115-e was configured.

Base station 105-e may receive the error detection scheduling request on one or more of the uplink beams 635. For example, if downlink beam 630-a is blocked, base station 105-e may receive a beam blocking detection scheduling request and may determine a new downlink beam 630 for communications with UE 115-e. For example, base station 105-e may determine to communicate with UE 115-e via downlink beam 630-d. In some cases, new downlink beam 630-d may be determined based on a preferred beam indicated by UE 115-e in PUCCH 620-d, or based on the beam on which base station 105-e received PUCCH 620-d. Upon selecting new downlink beam 630-d, base station 105-e may transmit DCI message 615-b on downlink beam 630-d that may indicate a parameter change for PUCCH transmissions 620 (e.g., a beam change, an RBG change). Following DCI message 615-b, base station 105-e may transmit an SPS PDSCH message 605-d to UE 115-e on the downlink beam 630-d. In some cases, SPS PDSCH message 605-d may include a grant that may implicitly or explicitly indicate a set of uplink resources UE 115-e may use to transmit the CSI report including the beam blocking detection information. For example, the grant may indicate the resources for UE 115-e to transmit the CSI report in PUCCH message 620-e. Based on DCI 615-b, UE 115-e may transmit PUCCH 620-e on uplink beam 635-*d*. In some cases, uplink beam 635-*d* may have reciprocity with downlink beam 630-*d*.

In some cases, base station 105-*e* may configure UE 115-*e* with PUCCH format 2, format 3, or format 6. In such cases, to accommodate for the addition of the error detection scheduling request (e.g., the beam blocking detection scheduling request) to PUCCH 620-*d*, the PUCCH may be configured to include an additional bit where the total number of bits included in the PUCCH for formats 2 through 6 is equal to $O_{SR}+1$, where $O_{SR}=\lceil \log_2(K+1) \rceil$, and K is the number of scheduling requests included in the PUCCH. For PUCCH formats 2, 3, and 6, the beam blocking detection scheduling request may be multiplexed with HARQ ACK/NACK, CSI reporting, other scheduling requests, or other information, or a combination thereof.

In some cases, base station 105-*e* may configure UE 115-*e* with PUCCH format 0 or format 1. In some cases, to accommodate for the addition of the beam blocking detection scheduling request to PUCCH 620-*d*, the PUCCH 620 may be configured to include an additional bit. UE 115-*e* may be configured to select a cyclic shift to apply to the PUCCH 620 carrying the beam blocking detection scheduling request (or another error detection scheduling request).

FIGS. 7A, 7B, and 7C illustrate examples of phase rotation diagrams 700, 701, and 702, respectively that support error detection and reporting procedures in accordance with aspects of the present disclosure. In some examples, phase rotation diagrams 700, 701, and 702 may be implemented in a wireless communications system, as described with reference to FIGS. 1 through 6. Phase rotation diagrams 700, 701, and 702 may be utilized by a UE or base station, which may be respective examples of a UE and a base station, as described with reference to FIGS. 1 through 6. In some cases, a UE may implement an error detection procedure and transmit an error detection scheduling request to a base station by determining a cyclic shift according to the phase rotation diagrams 700, 701, and 702. Phase rotation diagrams 700, 701, and 702 may be referred to as constellation diagrams, or cyclic shift diagrams. Additionally or alternatively, other wireless devices, such as a base station, may implement an error detection and indication procedure using the phase rotation diagrams 700, 701, and 702.

Phase rotation diagrams 700, 701, and 702 may represent how a signal is modulated by a digital modulation scheme, such as quadrature amplitude modulation or phase-shift keying. The signal may be displayed as a two-dimensional diagram, where the angle of a point around the diagram represents the phase shift of the carrier wave from a reference phase. The distance of a point from the origin may represent a measure of the amplitude or power of the signal. Each symbol, representing a number of bits of information, may be encoded as a different combination of amplitude and phase of the carrier. As such, each symbol may be represented by a point on the phase rotation diagram. The phase rotation diagrams may illustrate the possible symbols that may be transmitted by a device as a collection of points. As such, a receiving device may receive a transmission and determine the information included in the transmission based on the phase shift at which the signal was transmitted.

As described herein, a UE may be configured with PUCCH format 0 or 1 and the UE may utilize PUCCH formats 0 or 1 to transmit an error detection scheduling request, such as a beam blocking detection scheduling request. In some cases, the UE may determine a cyclic shift (e.g., sequence shift, phase rotation shift) to apply to PUCCH formats 0 and 1. As such, the information bits (e.g., number of downlink transmissions, HARQ ACK value, type of scheduling request) that may be included in PUCCH transmissions of format 0 or 1 may be used by a UE to determine a cyclic shift to apply to the PUCCH transmission. In some cases, a cyclic shift may be applied to other PUCCH formats.

Based on the information the UE may include in the PUCCH, the UE may determine whether to apply a cyclic shift to the PUCCH transmission. If the UE determines to apply a cyclic shift to the PUCCH, the UE may determine which cyclic shift to apply. In some cases, the UE may be configured with cyclic shift mappings to determine the cyclic shifts. The mappings may be the same or different between PUCCH formats, such as PUCCH format 0 and format 1. The mappings may be stored as a lookup table in memory or using some other format. In some cases, the number of downlink transmissions the UE is scheduled to receive, decode, and transmit HARQ feedback for may determine which lookup table the UE uses. For example, a UE may be scheduled to receive multiple (e.g., two) downlink transmissions from a base station corresponding to a same HARQ feedback opportunity. As such the UE may attempt to receive and decode both downlink transmissions and transmit HARQ feedback to the base station indicating whether the UE was able to decode one or more of the downlink transmissions. Based on the two scheduled downlink transmissions, the UE may use the lookup tables and phase rotation diagrams as described with reference to FIGS. 7A, 7B, and 7C. The HARQ feedback may be included in a PUCCH that may also include one or more scheduling requests, such as a beam blocking detection scheduling request or some other scheduling request.

The type of scheduling request the UE determines to transmit may determine which lookup table, value in a lookup table, or phase rotation diagram the UE uses to generate the HARQ feedback signal. For example, if the UE does not have a scheduling request to transmit, the UE may refer to phase rotation diagram 700. If the UE determines to transmit a non-beam blocking detection scheduling request (e.g., a scheduling request without error detection), the UE may refer to phase rotation diagram 701. If the UE determines to transmit a beam blocking detection scheduling request, the UE may refer to phase rotation diagram 702. In some examples, the UE may support any number of other phase rotation diagrams for other types of error detection scheduling requests. In some cases, phase rotation diagram 702 may support any combination of HARQ feedback signaling—for example, the phase rotation diagram 702 may support transmitting an ACK or NACK for a first downlink message, an ACK or NACK for a second downlink message, a scheduling request or no scheduling request, a beam blocking detection scheduling request or no beam blocking detection scheduling request, or any combination thereof. If the UE is configured to receive one scheduled transmission, the UE may use the lookup table(s) and phase rotation diagram(s) as described with reference to FIGS. 8A, 8B, and 8C.

FIG. 7A illustrates the case where the UE is configured with PUCCH format 0, has two downlink transmissions to submit feedback for, and does not have a scheduling request message to transmit. For example, the UE may be configured to transmit a beam blocking detection scheduling request periodically. As such the UE may transmit a beam blocking detection scheduling request after a certain number of unsuccessful decoding of downlink transmission. Until the UE reaches that number of unsuccessful decodes, the UE may transmit HARQ ACK/NACKs to the base station without scheduling requests. Additionally or alternatively, the UE may fail to detect an error reason for a decoding failure. In such cases, the UE may not refer to a lookup table, and may not apply a cyclic shift to the PUCCH.

As such, if the UE does not successfully decode the first downlink transmission and successfully decodes the second downlink transmission, the UE may transmit (NACK, ACK) in the PUCCH according to position 11 of phase rotation diagram 700 such that no cyclic shift is applied. If the UE does not successfully decode either the first downlink transmission or the second downlink transmission, the UE may transmit (NACK, NACK) in the PUCCH according to position 2 of phase rotation diagram 700 such that a 90 degree phase shift is applied. If the UE successfully decoded the first downlink transmission and did not successfully decode the second downlink transmission, the UE may transmit (ACK, NACK) in the PUCCH according to position 5 of phase rotation diagram 700 such that a phase shift of 180 degrees is applied. If the UE successfully decoded both the first downlink transmission and the second downlink transmission, the UE may transmit (ACK, NACK) in the PUCCH according to position 8 of phase rotation diagram 700 such that a 270 degree phase shift is applied. PUCCH format 1 may be configured similarly.

If the UE is configured with PUCCH format 0, has two downlink transmissions to submit feedback for, and has one non-beam blocking detection scheduling request to transmit, the UE may refer to Table 1. A similar table may be configured for PUCCH format 1 or some other PUCCH format.

TABLE 1

| HARQ-ACK Value | {0, 0} | {1, 0} | {1, 1} | {0, 1} |
|---|---|---|---|---|
| Sequence Cyclic Shift | $m_{CS} = 1$ | $m_{CS} = 4$ | $m_{CS} = 7$ | $m_{CS} = 10$ |

FIG. 7B illustrates Table 1. A zero may refer to a NACK and a one may refer to an ACK. For example, an inability to successfully decode a first transmission and a second transmissions may result in a {0,0}, where the UE may determine to shift the PUCCH transmission according to a cyclic shift of 1 based on Table 1 and as illustrated in FIG. 7B. In another example, if the UE successfully decodes the first downlink transmission and does not successfully decode the second downlink transmission, the UE may apply a cyclic shift of 4 to the PUCCH. In another example, if the UE successfully decodes both the first downlink transmission and the second downlink transmission, the UE may apply a cyclic shift of 7 to the PUCCH. In another example, if the UE does not successfully decode the first downlink transmission and successfully decodes the second downlink transmission, the UE may apply a cyclic shift of 10 to the PUCCH. A positive indication in the phase rotation diagrams (e.g., +SR, +BDSR) may represent that the UE is transmitting the scheduling request, a negative indication in the phase rotation diagrams (e.g., −SR, −BDSR) may represent that the UE is not transmitting the scheduling request.

In the cases that the UE is configured with PUCCH format 0, has two downlink transmissions to submit feedback for, and has one beam blocking detection scheduling request (e.g., +BDSR) to transmit, UE may refer to Table 2. A similar table may be configured for PUCCH format 1.

TABLE 2

| HARQ-ACK Value | {0, 0} | {1, 0} | {1, 1} | {0, 1} |
|---|---|---|---|---|
| Sequence Cyclic Shift | $m_{CS} = 3$ | $m_{CS} = 6$ | $m_{CS} = 9$ | $m_{CS} = 0$ |

FIG. 7C illustrates a combination of Table 1 and Table 2. A zero may refer to a NACK and a one may refer to an ACK. For example, an inability to successfully decode a first transmission and a second transmissions may result in a {0,0}, where the UE may determine to shift the PUCCH transmission according to a cyclic shift of 3 based on Table 2 and as illustrated in FIG. 7C (e.g., to append a beam blocking detection scheduling request with the NACK information). In another example, if the UE does successfully decode the first downlink transmission and does not successfully decode the second downlink transmission, the UE may apply a cyclic shift of 6 to the PUCCH. In another example, if the UE successfully decodes both the first downlink transmission and the second downlink transmission, the UE may apply a cyclic shift of 9 to the PUCCH. In another example, if the UE does not successfully decode the first downlink transmission and successfully decodes the second downlink transmission, the UE may apply a cyclic shift of 0 to the PUCCH.

FIGS. 8A, 8B, and 8C illustrate examples of phase rotation diagrams 800, 801, and 802 that support error detection and reporting procedures in accordance with aspects of the present disclosure. In some examples, phase rotation diagrams 800, 801, and 802 may be implemented in wireless communications systems as described with reference to FIGS. 1 through 6. Phase rotation diagrams 800, 801, and 802 may be utilized by a UE or base station, which may be respective examples of a UE and a base station, as described with reference to FIGS. 1 through 6. In some cases, a UE may implement an error detection procedure and transmit an error detection scheduling request to a base station by determining a cyclic shift according to the phase rotation diagrams 800, 801, and 802. Phase rotation diagrams 800, 801, and 802 may be referred to as constellation diagrams, or cyclic shift diagrams. Additionally or alternatively, other wireless devices, such as a base station, may implement an error detection and indication procedure using the phase rotation diagrams 800, 801, and 802.

As described herein, a UE may be configured with PUCCH format 0 or 1, and the UE may utilize PUCCH formats 0 or 1 to transmit an error detection scheduling request, such as a beam blocking detection scheduling request. In some cases, the UE may determine a cyclic shift (e.g., sequence shift, phase rotation shift) to apply to PUCCH formats 0 and 1, or some other PUCCH format. As such, the information bits (e.g., number of downlink transmissions, HARQ ACK value, type of scheduling request) that may be included in PUCCH transmissions of format 0 or 1 may be used by a UE to determine which cyclic shift to apply to the PUCCH transmission.

Based on the information the UE may include in the PUCCH, the UE may determine whether to apply a cyclic shift to the PUCCH transmission. If the UE determines to apply a cyclic shift to the PUCCH, the UE may determine which cyclic shift to apply. In some cases, the UE may be configured with cyclic shift mappings to determine the cyclic shifts. The mappings may be the same or different between PUCCH formats, such as PUCCH formats 0 and format 1. The mappings may be referred to as a lookup table. In some cases, the number of downlink transmissions the UE is scheduled to receive, decode, and transmit HARQ feedback for may determine which lookup table the UE uses. For example, a UE may be scheduled to receive one downlink transmission from a base station. As such the UE may attempt to receive and decode the downlink transmission and transmit HARQ feedback to the base station indicating whether the UE was able to successfully decode the downlink transmission. Based on the single scheduled downlink transmission, the UE may use the lookup tables and phase rotation diagrams as described with reference to FIGS. 8A, 8B, and 8C. The HARQ feedback may be included in a PUCCH that may also include an indication of one scheduling request or an indication of two scheduling requests such as a beam blocking detection scheduling request or some other scheduling request.

The type of scheduling request the UE determines to transmit may determine which lookup table or phase rotation diagram the UE uses. In the case that the UE is configured to indicate one scheduling request in a 2-bit PUCCH, if the UE determines to transmit a non-beam blocking detection scheduling request, the UE may refer to phase rotation diagram 800. Similarly, if the UE determines to transmit a beam blocking detection scheduling request, the UE may refer to phase rotation diagram 801. In the case that the UE is configured to transmit an indication of two scheduling requests in a 3-bit PUCCH, the UE may refer to phase rotation diagram 802. In some cases, the UE may determine not to transmit a scheduling request. In such cases, the UE may not apply a cyclic shift to the PUCCH transmission the includes the HARQ feedback.

If the UE is configured with PUCCH format 0, has one downlink transmission to submit feedback for, and has one non-beam blocking detection scheduling request to transmit, the UE may refer to Table 3. A similar table may be configured for PUCCH format 1 or some other PUCCH format.

TABLE 3

| HARQ-ACK Value | 0 | 1 |
|---|---|---|
| Sequence Cyclic Shift | $m_{CS} = 3$ | $m_{CS} = 9$ |

FIG. 8A illustrates Table 3. A zero may refer to a NACK and a one may refer to an ACK. For example, an inability to successfully decode the scheduled transmission may result in the UE applying a cyclic shift of 3 to the PUCCH based on Table 3 and as illustrated in FIG. 8A (e.g., to append a scheduling request with the NACK). In another example, if the UE does successfully decode the scheduled downlink transmission, the UE may apply a cyclic shift of 9 to the PUCCH to include a scheduling request with the ACK.

In the case that the UE is configured with PUCCH format 0, has a single downlink transmission to submit feedback for, and has one beam blocking detection scheduling request to transmit, UE may refer to Table 4. A similar table may be configured for PUCCH format 1 or some other PUCCH format.

TABLE 4

| HARQ-ACK Value | 0 | 1 |
|---|---|---|
| Sequence Cyclic Shift | $m_{CS} = 4$ | $m_{CS} = 10$ |

FIG. 8B illustrates Table 4. A zero may refer to a NACK and a one may refer to an ACK. For example, an inability to successfully decode the scheduled transmission may result in the UE applying a cyclic shift of 4 to the PUCCH based on Table 4 and as illustrated in FIG. 8B. In another example, if the UE does successfully decode the scheduled downlink transmission, the UE may apply a cyclic shift of 10 to the PUCCH to append a beam blocking detection scheduling request to the ACK.

FIG. 8C illustrates the example where the UE is configured to transmit a 3-bit PUCCH to the base station, where 1 bit is allocated for HARQ feedback, one bit is allocated for a non-beam blocking detection scheduling request, and another bit is allocated for a beam blocking detection scheduling request. In such implementations, the UE may be configured to refer to both Table 3 and Table 4.

Figure 9:
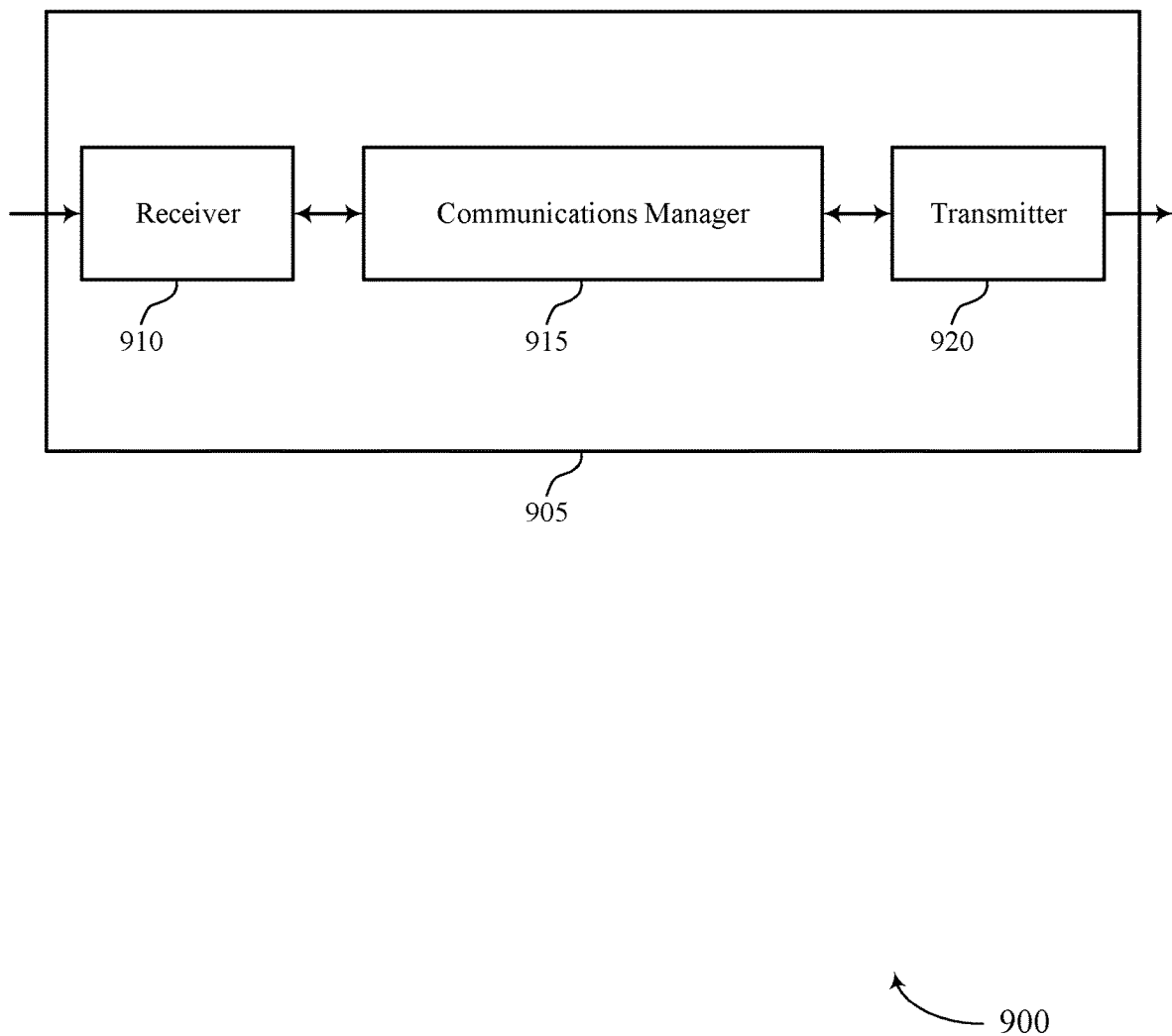
FIGS. 9 and 10 show block diagrams of devices that support error reason indication for reception failure in accordance with aspects of the present disclosure.

FIG. 9 shows a block diagram 900 of a device 905 that supports error reason indication for reception failure in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to error reason indication for reception failure). Information may be passed on to other components of the device 905. The receiver 910 may be an example of aspects of the transceiver 1220 described with reference to FIG. 12. The receiver 910 may utilize a single antenna or a set of antennas.

The communications manager 915 may be implemented by a UE. The communications manager 915 may receive, from a base station, a configuration message that includes information to be used by the UE in determining a cause of a failure by the UE to decode scheduled downlink transmissions, identify that the UE failed to decode one or more scheduled downlink transmissions directed to the UE on at least a first downlink beam of a set of downlink beams, determine the cause of the failure to decode the one or more scheduled downlink transmissions based on the information included in the configuration message, and transmit, to the base station and based on the determining, an indication that the UE failed to decode the one or more scheduled downlink transmissions. The communications manager 915 may identify that the UE failed to decode one or more scheduled downlink transmissions directed to the UE on a first downlink beam and may determine an error reason associated with the UE failing to decode the one or more scheduled downlink transmissions. The communications manager 915 may transmit, to a base station and based on the determining, an indication that the UE failed to decode the one or more scheduled downlink transmissions, receive, based on the UE failing to decode the one or more scheduled downlink transmissions, a grant for transmission of a CSI report (e.g., where the grant includes resources for an indication of the error reason), and transmit the CSI report including at least the indication of the error reason based on the grant. The communications manager 915 may be an example of aspects of the communications manager 1210 described herein.

The communications manager 915, or its sub-components, may be implemented in hardware, software (e.g., executed by a processor), or any combination thereof. If implemented in software executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

The communications manager 915 as described herein may be implemented to realize one or more potential advantages. One implementation may allow the device 905 to more efficiently indicate feedback information. For example, a device 905 may determine a reason for an error that caused a decoding failure of one or more downlink transmissions directed to the device 905, and the device 905 may indicate this to the transmitting device through a scheduling request that includes the error reason. This feedback, along with other feedback transmitted by the device 905 such as a radio link failure suggested action, may facilitate the transmitting device to reschedule the failed downlink transmissions in an efficient manner, which may reduce latency, processing resources, or power consumption at the device 905.

Figure 10:
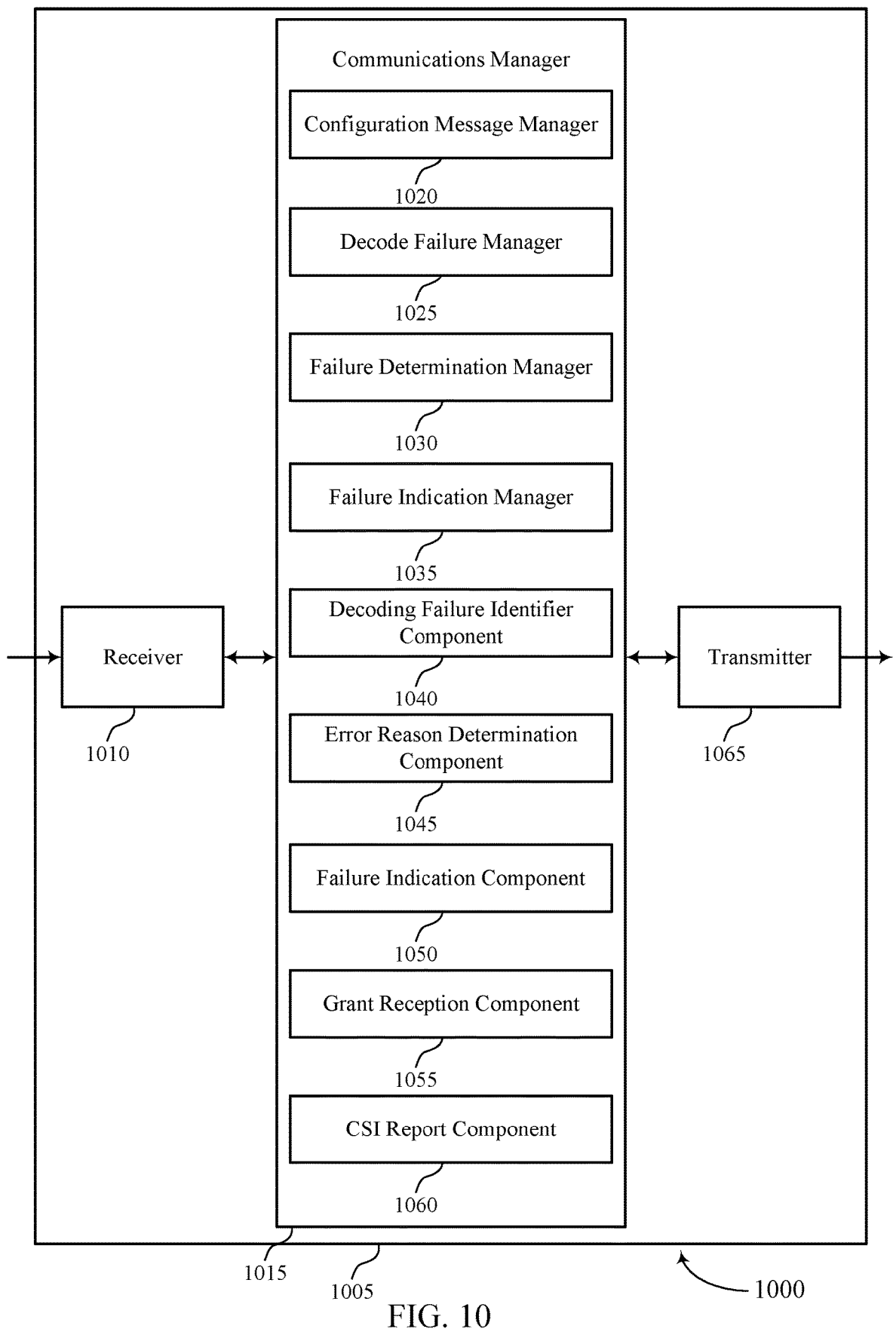

FIG. 10 shows a block diagram 1000 of a device 1005 that supports error reason indication for reception failure in accordance with aspects of the present disclosure. The device 1005 may be an example of aspects of a device 905 or a UE 115 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to error reason indication for reception failure). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration message manager 1020, a decode failure manager 1025, a failure determination manager 1030, a failure indication manager 1035, a decoding failure identifier component 1040, an error reason determination component 1045, a failure indication component 1050, a grant reception component 1055, and a CSI report component 1060. The communications manager 1015 may be an example of aspects of the communications manager 1210 described herein.

The configuration message manager 1020 may receive, from a base station, a configuration message that includes information to be used by the UE in determining a cause of a failure by the UE to decode scheduled downlink transmissions. The decode failure manager 1025 may identify that the UE failed to decode one or more scheduled downlink transmissions directed to the UE on at least a first downlink beam of a set of downlink beams. The failure determination manager 1030 may determine the cause of the failure to decode the one or more scheduled downlink transmissions based on the information included in the configuration message. The failure indication manager 1035 may transmit, to the base station and based on the determining, an indication that the UE failed to decode the one or more scheduled downlink transmissions.

The decoding failure identifier component 1040 may identify that the UE failed to decode one or more scheduled downlink transmissions directed to the UE on a first downlink beam. The error reason determination component 1045 may determine an error reason associated with the UE failing to decode the one or more scheduled downlink transmissions. The failure indication component 1050 may transmit, to a base station and based on the determining, an indication that the UE failed to decode the one or more scheduled downlink transmissions. The grant reception component 1055 may receive, based on the UE failing to decode the one or more scheduled downlink transmissions, a grant for transmission of a CSI report, where the grant includes resources for an indication of the error reason. The CSI report component 1060 may transmit the CSI report including at least the indication of the error reason based on the grant.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
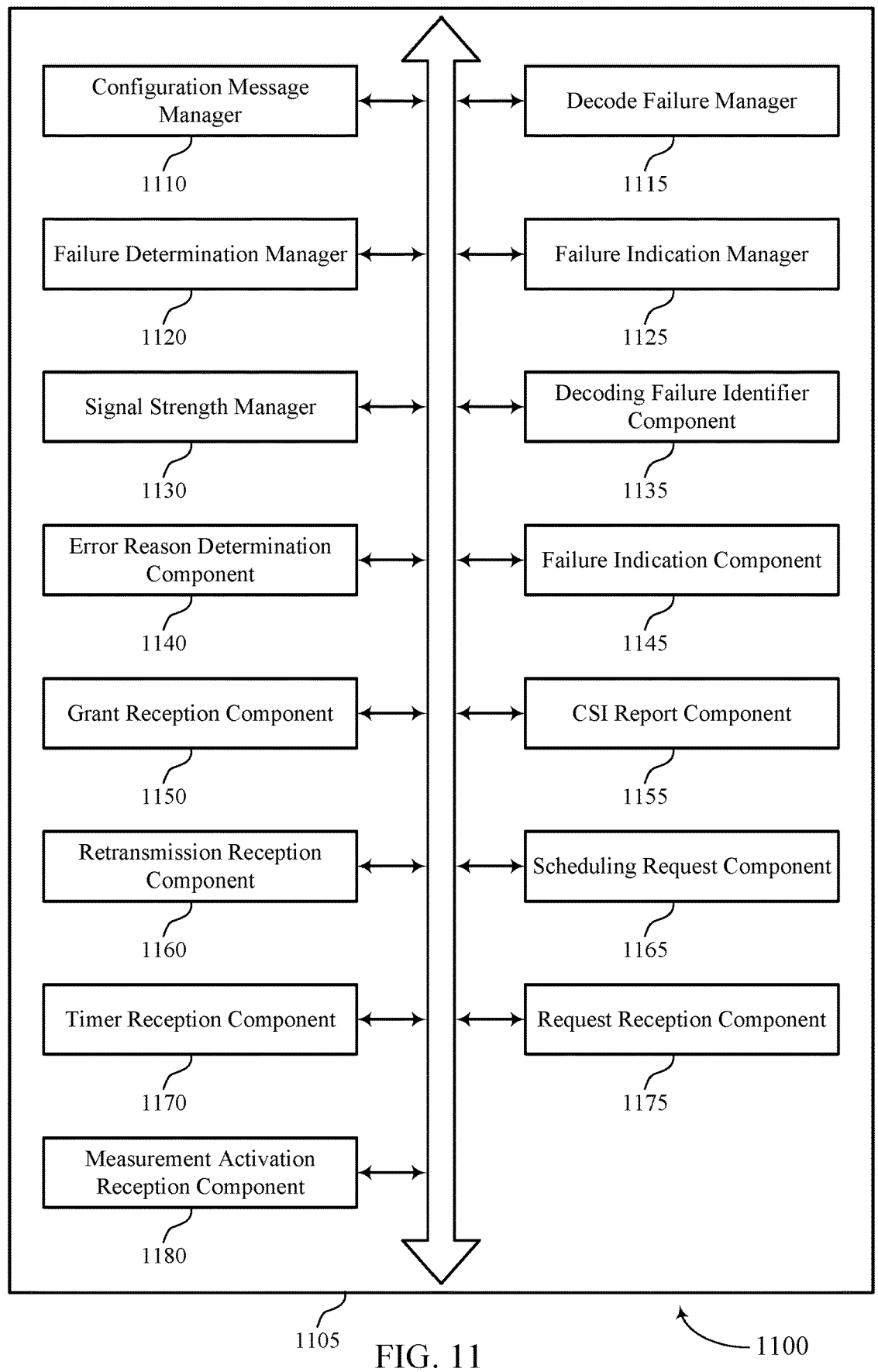
FIG. 11 shows a block diagram of a communications manager that supports error reason indication for reception failure in accordance with aspects of the present disclosure.

FIG. 11 shows a block diagram 1100 of a communications manager 1105 that supports error reason indication for reception failure in accordance with aspects of the present disclosure. The communications manager 1105 may be an example of aspects of a communications manager 915, a communications manager 1015, or a communications manager 1210 described herein. The communications manager 1105 may include a configuration message manager 1110, a decode failure manager 1115, a failure determination manager 1120, a failure indication manager 1125, a signal strength manager 1130, a decoding failure identifier component 1135, an error reason determination component 1140, a failure indication component 1145, a grant reception component 1150, a CSI report component 1155, a retransmission reception component 1160, a scheduling request component 1165, a timer reception component 1170, a request reception component 1175, and a measurement activation reception component 1180. Each of these modules may communicate, directly or indirectly, with one another (e.g., via one or more buses).

The configuration message manager 1110 may receive, from a base station, a configuration message that includes information to be used by the UE in determining a cause of a failure by the UE to decode scheduled downlink transmissions. The decode failure manager 1115 may identify that the UE failed to decode one or more scheduled downlink transmissions directed to the UE on at least a first downlink beam of a set of downlink beams. In some examples, the failure determination manager 1120 may determine that the failure is due to the first downlink beam being fully beam blocked. The failure indication manager 1125 may transmit, to the base station and based on the determining, an indication that the UE failed to decode the one or more scheduled downlink transmissions.

In some examples, the configuration message manager 1110 may receive an activation message for the UE determine the cause of the failure by the UE to decode scheduled downlink transmissions based on preconfigured thresholds. In some examples, the configuration message manager 1110 may receive a set of thresholds for the UE to use to determine the cause of the failure by the UE to decode scheduled downlink transmissions.

The failure determination manager 1120 may determine the cause of the failure to decode the one or more scheduled downlink transmissions based on the information included in the configuration message. In some examples, the failure determination manager 1120 may determine that the failure is due to the first downlink beam being partially beam blocked.

In some examples, the failure indication manager 1125 may transmit the indication that the UE failed to decode the one or more scheduled downlink transmissions via a downlink beam that is different than the first downlink beam. In some examples, the failure indication manager 1125 may transmit the indication that the UE failed to decode the one or more scheduled downlink transmissions via the first downlink beam.

The signal strength manager 1130 may measure a signal strength parameter for each of the one or more scheduled downlink transmissions received over each downlink beam of the set of downlink beams. In some examples, the signal strength manager 1130 may perform one or more comparisons of the measured signal strengths to a set of thresholds, the set of thresholds including one or more layer 3 (L3) thresholds and one or more layer 1 (L1) thresholds.

In some examples, the signal strength manager 1130 may measure the signal strength parameter averaged over a beam blocking duration for each of the one or more scheduled downlink transmissions received over each downlink beam of the set of downlink beams. In some examples, the signal strength manager 1130 may determine that the measured signal strength averaged over a system bandwidth for the first downlink beam is less than a first L3 threshold of the one or more L3 thresholds. In some examples, the signal strength manager 1130 may determine a maximum signal strength of the measured signal strengths of each resource block for the first downlink beam. In some examples, the signal strength manager 1130 may determine that the maximum measured signal strength is less than a first L3 threshold of the one or more L3 thresholds. In some examples, the signal strength manager 1130 may determine that the measured signal strength of at least a preconfigured number of physical resource blocks for the first downlink beam, averaged over the beam blocking duration, is less than a first L3 threshold of the one or more L3 thresholds.

In some examples, the signal strength manager 1130 may measure an instantaneous signal strength parameter for each of the one or more scheduled downlink transmissions received over each downlink beam of the set of downlink beams. In some examples, the signal strength manager 1130 may determine that the measured instantaneous received signal strength averaged over a system bandwidth for the first downlink beam is less than a first L1 threshold of the one or more L1 thresholds. In some examples, the signal strength manager 1130 may determine a maximum instantaneous measured signal strength of the measured instantaneous signal strengths for the first downlink beam. In some examples, the signal strength manager 1130 may determine that the maximum instantaneous measured signal strength is less than a first L1 threshold of the one or more L1 thresholds. In some examples, the signal strength manager 1130 may determine that a difference between the instantaneous measured signal strength for the first downlink beam averaged over a system bandwidth from a first time to a second time is less than a first L1 threshold of the one or more L1 thresholds. In some cases, the measured signal strength parameter is a reference signal received power.

In some examples, the signal strength manager 1130 may perform one or more comparisons of a measured signal strength parameter to a set of thresholds, the set of thresholds including one or more (L1) thresholds and one or more layer 3 (L3) thresholds.

In some examples, the signal strength manager 1130 may measure an instantaneous signal strength parameter for each of the one or more scheduled downlink transmissions received over each downlink beam of the set of downlink beams, where the measured instantaneous signal strength parameter is a reference signal received power. In some examples, the signal strength manager 1130 may determine that the measured instantaneous signal strength parameter averaged over a system bandwidth for the first downlink beam is greater than a first L1 threshold of the one or more L1 thresholds and less than a second L1 threshold of the one or more L1 thresholds.

In some examples, the signal strength manager 1130 may measure an instantaneous signal strength parameter for each of the one or more scheduled downlink transmissions received over each downlink beam of the set of downlink beams, where the measured instantaneous signal strength parameter is a reference signal received power. In some examples, the signal strength manager 1130 may determine a maximum instantaneous measured signal strength of the measured instantaneous signal strengths for the first downlink beam. In some examples, the signal strength manager 1130 may determine that the maximum instantaneous measured signal strength is greater than a first L1 threshold of the one or more L1 thresholds and less than a second L1 threshold of the one or more L1 thresholds.

In some examples, the signal strength manager 1130 may measure a signal strength parameter averaged over a beam blocking duration for each of the one or more scheduled downlink transmissions received over each downlink beam of the set of downlink beams, where the measured instantaneous signal strength parameter is a reference signal received power. In some examples, the signal strength manager 1130 may determine that the measured signal strength parameter averaged over a system bandwidth for the first downlink beam is greater than a first L3 threshold of the one or more L3 thresholds and less than a second L3 threshold of the one or more L3 thresholds.

In some examples, the signal strength manager 1130 may measure a signal strength parameter averaged over a beam blocking duration for each of the one or more scheduled downlink transmissions received over each downlink beam of the set of downlink beams, where the measured instantaneous signal strength parameter is a reference signal received power. In some examples, the signal strength manager 1130 may determine that the maximum measured signal strength is greater than a first L3 threshold of the one or more L3 thresholds and less than a second L3 threshold of the one or more L3 thresholds.

In some examples, the signal strength manager 1130 may measure an instantaneous signal strength parameter for each of the one or more scheduled downlink transmissions received over each downlink beam of the set of downlink beams, where the measured instantaneous signal strength parameter is a reference signal received power. In some examples, the signal strength manager 1130 may determine that a difference between the instantaneous measured signal strength averaged over a system bandwidth for the first downlink beam from a first time to a second time is greater than a first L1 threshold of the one or more L1 thresholds and less than a second L1 threshold of the one or more L1 thresholds.

The decoding failure identifier component 1135 may identify that the UE failed to decode one or more scheduled downlink transmissions directed to the UE on a first downlink beam. The error reason determination component 1140 may determine an error reason associated with the UE failing to decode the one or more scheduled downlink transmissions. The failure indication component 1145 may transmit, to a base station and based on the determining, an indication that the UE failed to decode the one or more scheduled downlink transmissions. The grant reception component 1150 may receive, based on the UE failing to decode the one or more scheduled downlink transmissions, a grant for transmission of a CSI report, where the grant includes resources for an indication of the error reason. The CSI report component 1155 may transmit the CSI report including at least the indication of the error reason based on the grant.

In some examples, the error reason determination component 1140 may determine that the failure is due to a first downlink beam being blocked.

In some cases, the resources for the indication of the suggested radio link adaptation action include resources for indicating a lowering of a modulation and coding scheme, a beam change, a RBG change, a multi slot transmission, a back off period for delaying a retransmission, or a combination thereof. In some cases, the resources for the indication of the error reason include resources for indicating a coverage hole, a beam blocking, a partial beam blocking, an interference, a frequency selective fading, a collision, or a combination thereof.

In some examples, the CSI report component 1155 may transmit the indication of the suggested radio link adaptation action in the CSI report.

The retransmission reception component 1160 may receive, from the base station, a retransmission of the one or more scheduled downlink transmissions on a second downlink beam based on the CSI report including at least the indication of the error reason.

The scheduling request component 1165 may transmit a scheduling request that indicates that the UE has determined the error reason. In some examples, the scheduling request component 1165 may transmit a request for uplink resources for transmitting the CSI report including at least the indication of the error reason, where receiving the grant is based on transmitting the request for uplink resources. In some examples, the scheduling request component 1165 may transmit the scheduling request that indicates that the UE has determined the error reason on a set of uplink beams.

The timer reception component 1170 may receive an indication of a timer that prohibits transmission of the scheduling request that indicates that the UE has determined the error reason until expiration of the timer.

The request reception component 1175 may receive a request to transmit the indication of the error reason. In some examples, the request reception component 1175 may receive a request to transmit an indication of a suggested radio link adaptation action.

The measurement activation reception component 1180 may receive an activation of a set of measurements for determining the error reason.

Figure 12:
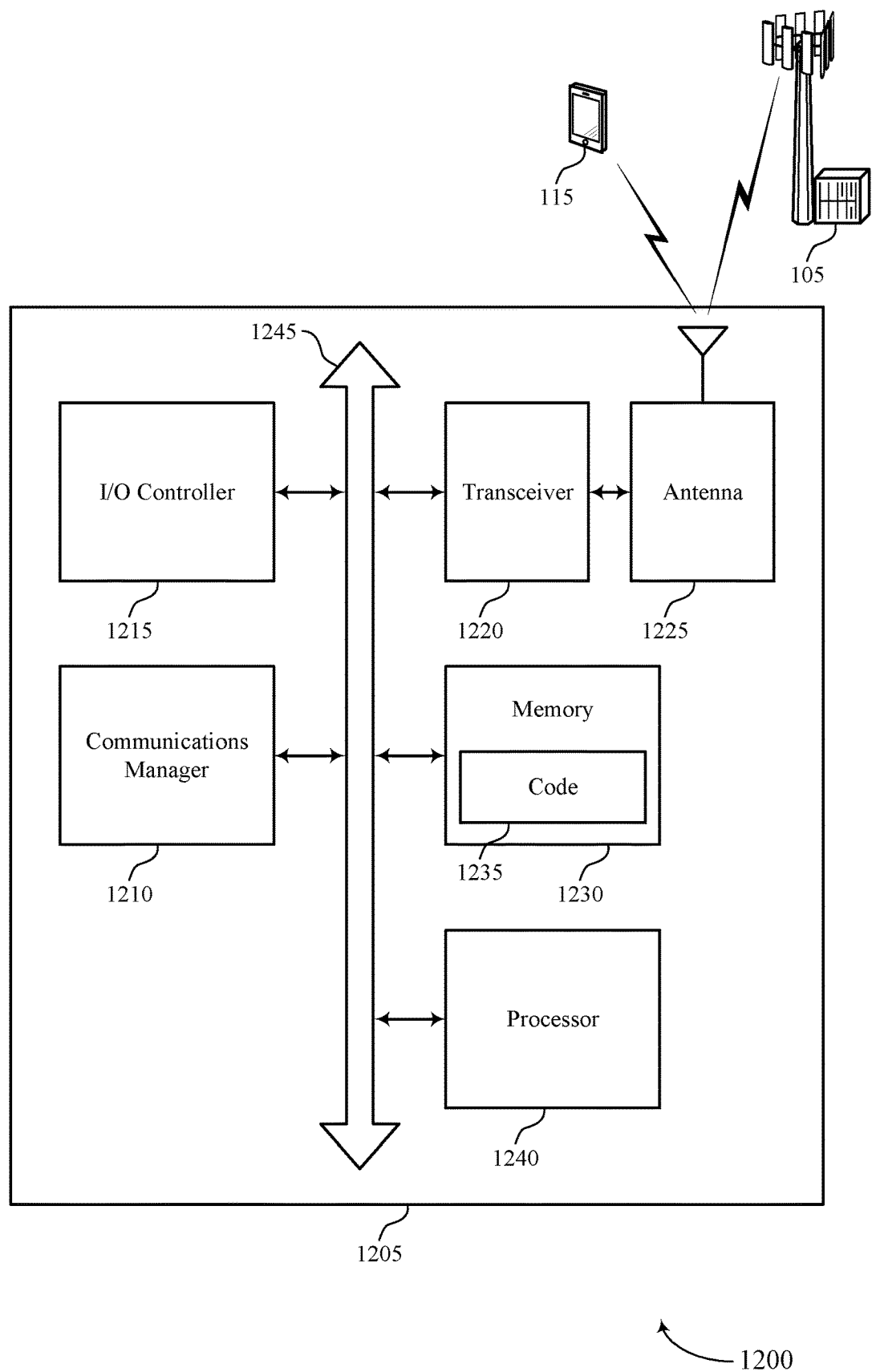
FIG. 12 shows a diagram of a system including a device that supports error reason indication for reception failure in accordance with aspects of the present disclosure.

FIG. 12 shows a diagram of a system 1200 including a device 1205 that supports error reason indication for reception failure in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 (e.g., implemented at a UE) may receive, from a base station, a configuration message that includes information to be used by the UE in determining a cause of a failure by the UE to decode scheduled downlink transmissions, identify that the UE failed to decode one or more scheduled downlink transmissions directed to the UE on at least a first downlink beam of a set of downlink beams, determine the cause of the failure to decode the one or more scheduled downlink transmissions based on the information included in the configuration message, and transmit, to the base station and based on the determining, an indication that the UE failed to decode the one or more scheduled downlink transmissions. The communications manager 1210 may also identify that the UE failed to decode one or more scheduled downlink transmissions directed to the UE on a first downlink beam, determine an error reason associated with the UE failing to decode the one or more scheduled downlink transmissions, transmit, to a base station and based on the determining, an indication that the UE failed to decode the one or more scheduled downlink transmissions, receive, based on the UE failing to decode the one or more scheduled downlink transmissions, a grant for transmission of a CSI report, where the grant includes resources for an indication of the error reason, and transmit the CSI report including at least the indication of the error reason based on the grant.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting error reason indication for reception failure).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
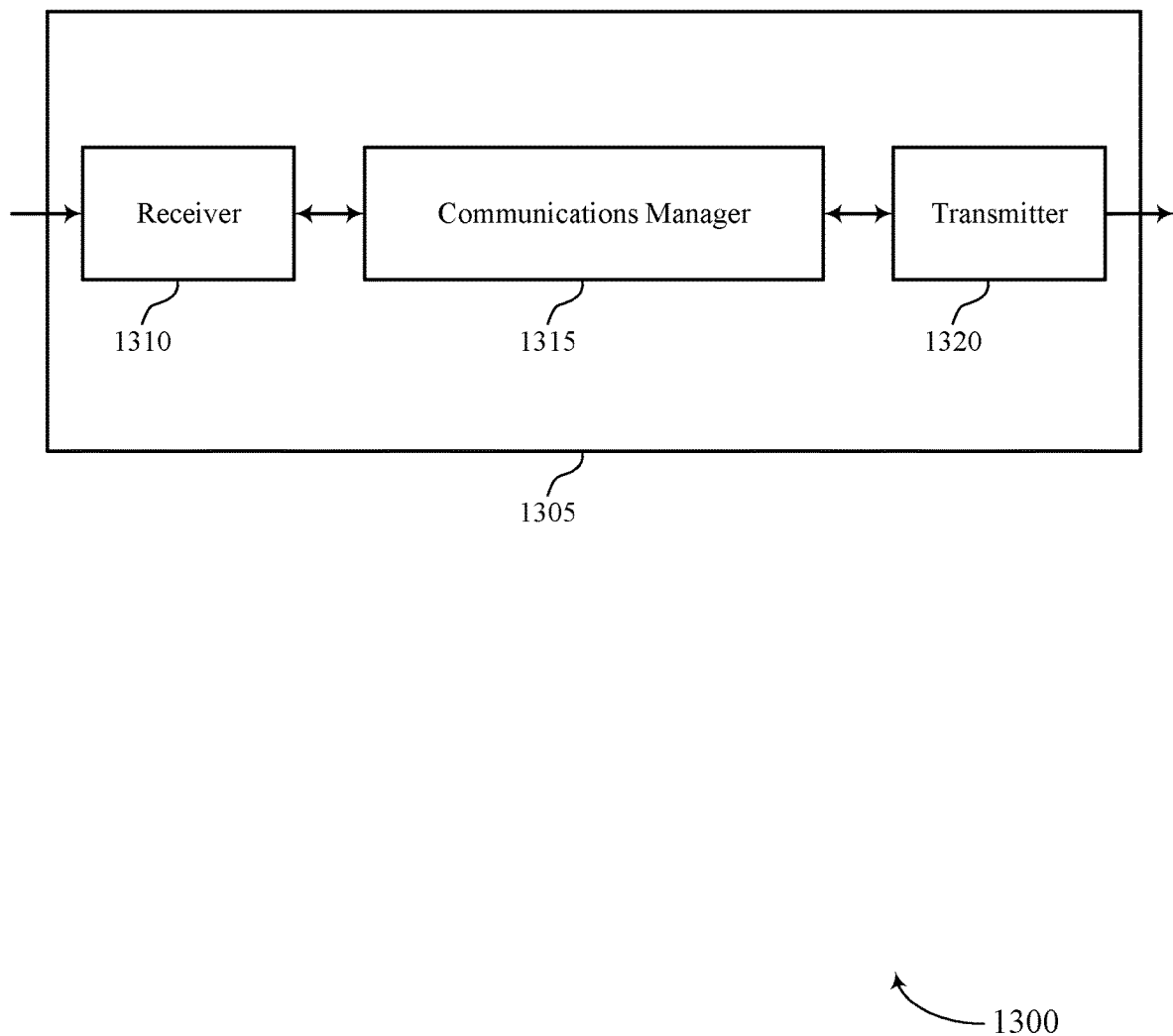
FIGS. 13 and 14 show block diagrams of devices that support error reason indication for reception failure in accordance with aspects of the present disclosure.

FIG. 13 shows a block diagram 1300 of a device 1305 that supports error reason indication for reception failure in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to error reason indication for reception failure). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit, to a UE, a configuration message that includes information to be used by the UE in determining a cause of a failure by the UE to decode scheduled downlink transmissions, the information including a set of thresholds for the UE to use to determine the cause of the failure, transmit, to the UE, one or more scheduled downlink transmissions on at least a first downlink beam of a set of downlink beams, and receive, from the UE, an indication that the UE failed to decode the one or more scheduled downlink transmissions. The communications manager 1315 may also transmit, to a UE, one or more scheduled downlink transmissions on a first downlink beam, determine that the UE failed to decode the one or more scheduled downlink transmissions, transmit, based on the determining that the UE failed to decode the one or more scheduled downlink transmissions, a grant for transmission of a CSI report, where the grant includes resources for an indication of an error reason associated with the UE failing to decode the one or more scheduled downlink transmissions, and receive the CSI report including at least the indication of the error reason based on the grant. The communications manager 1315 may be an example of aspects of the communications manager 1610 described herein.

The communications manager 1315, or its sub-components, may be implemented in hardware, software (e.g., executed by a processor), or any combination thereof. If implemented in software executed by a processor, the functions of the communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

By including or configuring the communications manager 1315 in accordance with examples as described herein, the device 1305 may support techniques for improved communication reliability, reduced latency, more efficient utilization of communication resources, and improved coordination between devices.

Figure 14:
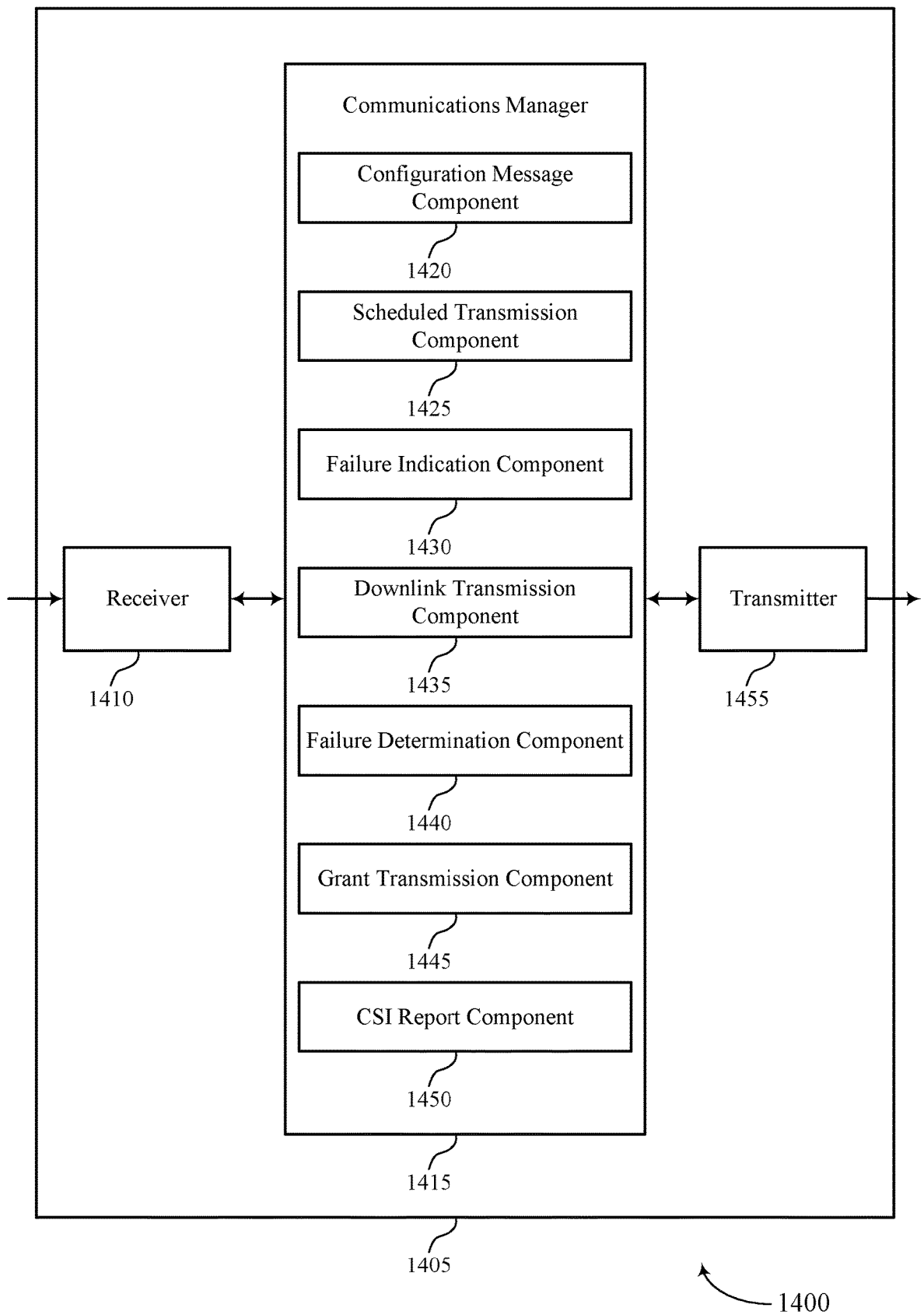

FIG. 14 shows a block diagram 1400 of a device 1405 that supports error reason indication for reception failure in accordance with aspects of the present disclosure. The device 1405 may be an example of aspects of a device 1305 or a base station 105 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to error reason indication for reception failure). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a configuration message component 1420, a scheduled transmission component 1425, a failure indication component 1430, a downlink transmission component 1435, a failure determination component 1440, a grant transmission component 1445, and a CSI report component 1450. The communications manager 1415 may be an example of aspects of the communications manager 1610 described herein.

The configuration message component 1420 may transmit, to a UE, a configuration message that includes information to be used by the UE in determining a cause of a failure by the UE to decode scheduled downlink transmissions, the information including a set of thresholds for the UE to use to determine the cause of the failure. The scheduled transmission component 1425 may transmit, to the UE, one or more scheduled downlink transmissions on at least a first downlink beam of a set of downlink beams. The failure indication component 1430 may receive, from the UE, an indication that the UE failed to decode the one or more scheduled downlink transmissions.

The downlink transmission component 1435 may transmit, to a UE, one or more scheduled downlink transmissions on a first downlink beam. The failure determination component 1440 may determine that the UE failed to decode the one or more scheduled downlink transmissions. The grant transmission component 1445 may transmit, based on the determining that the UE failed to decode the one or more scheduled downlink transmissions, a grant for transmission of a CSI report, where the grant includes resources for an indication of an error reason associated with the UE failing to decode the one or more scheduled downlink transmissions. The CSI report component 1450 may receive the CSI report including at least the indication of the error reason based on the grant.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
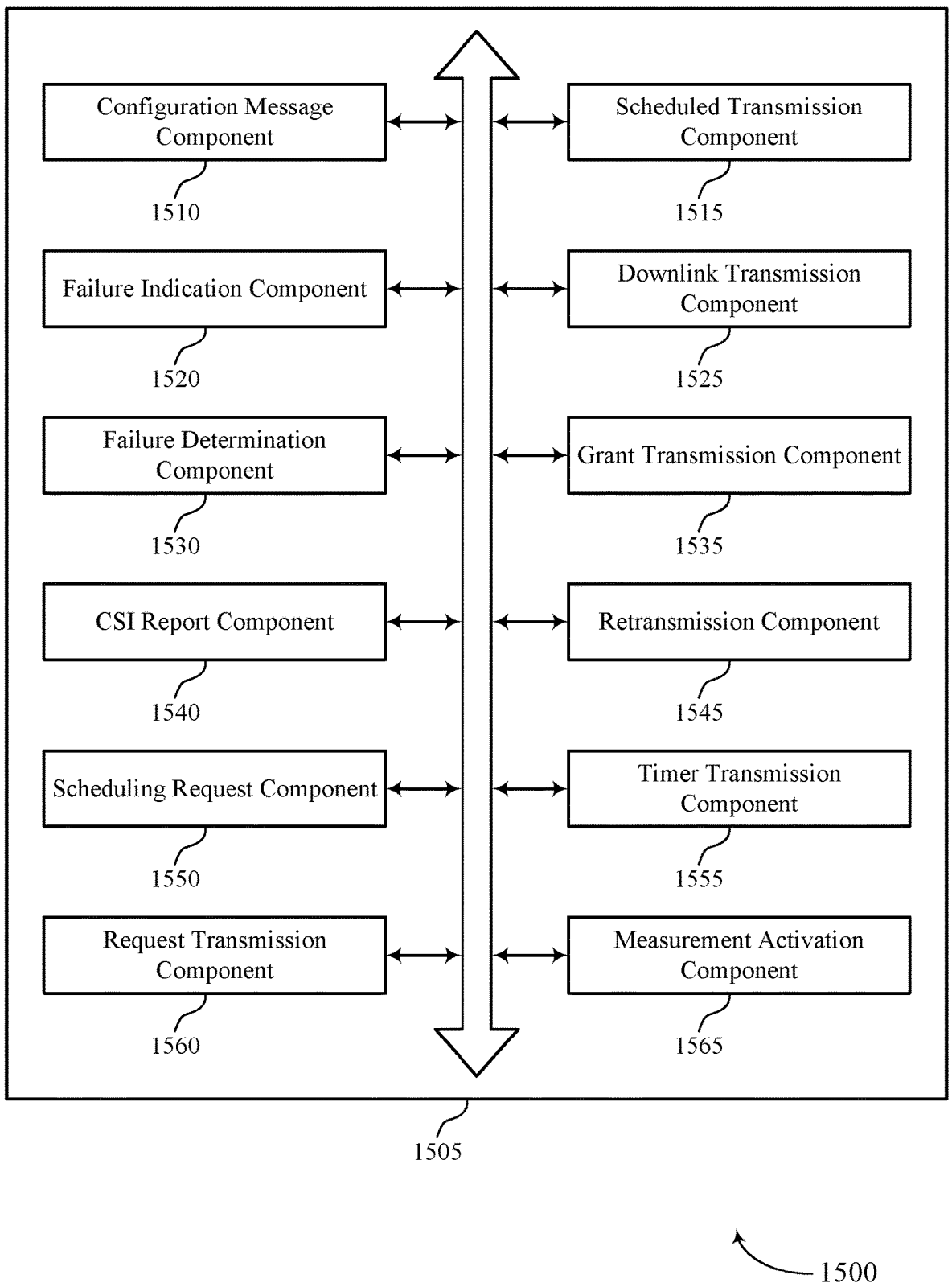
FIG. 15 shows a block diagram of a communications manager that supports error reason indication for reception failure in accordance with aspects of the present disclosure.

FIG. 15 shows a block diagram 1500 of a communications manager 1505 that supports error reason indication for reception failure in accordance with aspects of the present disclosure. The communications manager 1505 may be an example of aspects of a communications manager 1315, a communications manager 1415, or a communications manager 1610 described herein.

The communications manager 1505 may include a configuration message component 1510, a scheduled transmission component 1515, a failure indication component 1520, a downlink transmission component 1525, a failure determination component 1530, a grant transmission component 1535, a CSI report component 1540, a retransmission component 1545, a scheduling request component 1550, a timer transmission component 1555, a request transmission component 1560, and a measurement activation component 1565. Each of these modules may communicate, directly or indirectly, with one another (e.g., via one or more buses).

The configuration message component 1510 may transmit, to a UE, a configuration message that includes information to be used by the UE in determining a cause of a failure by the UE to decode scheduled downlink transmissions, the information including a set of thresholds for the UE to use to determine the cause of the failure. The scheduled transmission component 1515 may transmit, to the UE, one or more scheduled downlink transmissions on at least a first downlink beam of a set of downlink beams. The failure indication component 1520 may receive, from the UE, an indication that the UE failed to decode the one or more scheduled downlink transmissions.

In some examples, the configuration message component 1510 may transmit an L3 threshold of the one or more L3 thresholds to be compared to a signal strength parameter of the first downlink beam averaged over a system bandwidth. In some examples, the configuration message component 1510 may transmit an L3 threshold of the one or more L3 thresholds to be compared to a maximum signal strength parameter of the first downlink beam averaged over a system bandwidth.

In some examples, the configuration message component 1510 may transmit an L3 threshold of the one or more L3 thresholds to be compared to a signal strength parameter of the first downlink beam on one or more physical resource blocks. In some examples, the configuration message component 1510 may transmit an L1 threshold of the one or more L1 thresholds to be compared to an instantaneous signal strength parameter of the first downlink beam averaged over a system bandwidth.

In some examples, the configuration message component 1510 may transmit an L1 threshold of the one or more L1 thresholds to be compared to a maximum instantaneous signal strength parameter of the first downlink beam averaged over a system bandwidth. In some examples, the configuration message component 1510 may transmit an L1 threshold of the one or more L1 thresholds to be compared to a difference between an instantaneous signal strength parameter of the first downlink beam averaged over a system bandwidth from a first time to a second time.

In some examples, the configuration message component 1510 may transmit a first L1 threshold of the one or more L1 thresholds and a second L1 threshold of the one or more L1 thresholds to be compared to an instantaneous signal strength parameter of the first downlink beam averaged over a system bandwidth. In some examples, the configuration message component 1510 may transmit a first L1 threshold of the one or more L1 thresholds and a second L1 threshold of the one or more L1 thresholds to be compared to a maximum instantaneous signal strength parameter of the first downlink beam averaged over a system bandwidth.

In some examples, the configuration message component 1510 may transmit a first L3 threshold of the one or more L3 thresholds and a second L3 threshold of the one or more L3 thresholds to be compared to a signal strength parameter of the first downlink beam averaged over a system bandwidth. In some examples, the configuration message component 1510 may transmit a first L3 threshold of the one or more L3 thresholds and a second L3 threshold of the one or more L3 thresholds to be compared to a maximum signal strength parameter of the first downlink beam averaged over a system bandwidth.

In some examples, the configuration message component 1510 may transmit a first L1 threshold of the one or more L1 thresholds and a second L1 threshold of the one or more L1 thresholds to be compared to a difference between an instantaneous signal strength parameter of the first downlink beam averaged over a system bandwidth from a first time to a second time. In some examples, the configuration message component 1510 may transmit an activation message for the UE determine the cause of the failure by the UE to decode scheduled downlink transmissions based on preconfigured thresholds. In some cases, the set of thresholds includes one or more layer 3 (L3) thresholds and one or more layer 1 (L1) thresholds.

In some examples, the failure indication component 1520 may receive the indication that the UE failed to decode the one or more scheduled downlink transmissions via a downlink beam that is different than the first downlink beam. In some examples, the failure indication component 1520 may receive the indication that the UE failed to decode the one or more scheduled downlink transmissions via the first downlink beam.

The downlink transmission component 1525 may transmit, to a UE, one or more scheduled downlink transmissions on a first downlink beam. The failure determination component 1530 may determine that the UE failed to decode the one or more scheduled downlink transmissions. The grant transmission component 1535 may transmit, based on the determining that the UE failed to decode the one or more scheduled downlink transmissions, a grant for transmission of a CSI report, where the grant includes resources for an indication of an error reason associated with the UE failing to decode the one or more scheduled downlink transmissions. The CSI report component 1540 may receive the CSI report including at least the indication of the error reason based on the grant.

In some cases, the resources for the indication of the suggested radio link adaptation action include resources for indicating a lowering of a modulation and coding scheme, a beam change, a RBG change, a multi slot transmission, a back off period for delaying a retransmission, or a combination thereof. In some cases, the resources for the indication of the error reason include resources for indicating a coverage hole, a beam blocking, a partial beam blocking, an interference, a frequency selective fading, a collision, or a combination thereof.

In some examples, the CSI report component 1540 may receive the indication of the suggested radio link adaptation action in the CSI report.

The retransmission component 1545 may transmit a retransmission of the one or more scheduled downlink transmissions on a second downlink beam based on the CSI report including at least the indication of the error reason.

The scheduling request component 1550 may receive a scheduling request that indicates that the UE has determined the error reason. In some examples, the scheduling request component 1550 may receive a request for uplink resources for transmitting the CSI report including at least the indication of the error reason, where transmitting the grant is based on receiving the request for uplink resources. In some examples, the scheduling request component 1550 may receive the scheduling request that indicates that the UE has determined the error reason on a set of uplink beams.

The timer transmission component 1555 may transmit an indication of a timer that prohibits transmission of the scheduling request that indicates that the UE has determined the error reason until expiration of the timer.

The request transmission component 1560 may transmit a request to transmit the indication of the error reason. In some examples, the request transmission component 1560 may transmit a request to transmit an indication of a suggested radio link adaptation action.

The measurement activation component 1565 may activate a set of measurements for the UE to determine the error reason.

Figure 16:
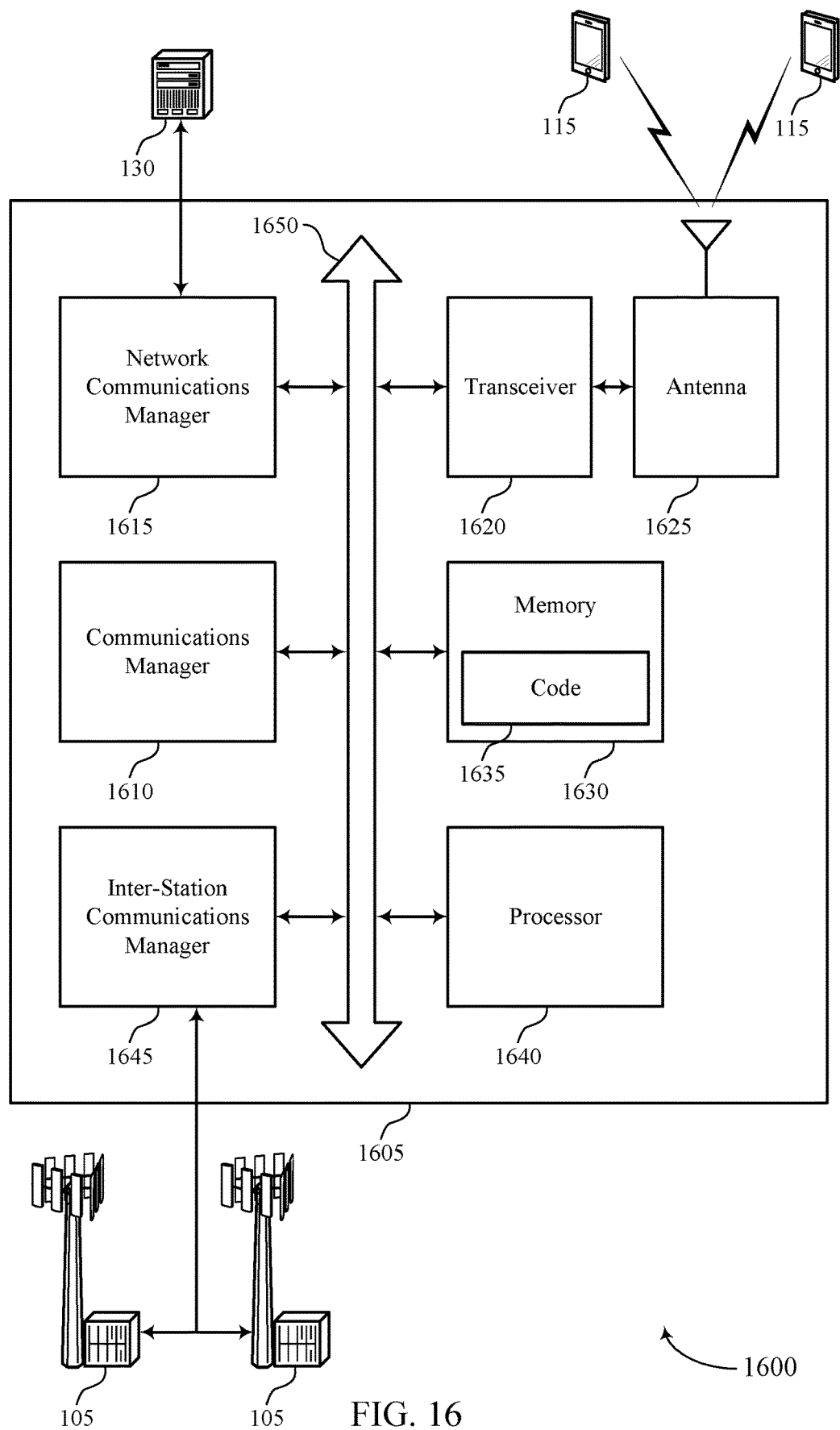
FIG. 16 shows a diagram of a system including a device that supports error reason indication for reception failure in accordance with aspects of the present disclosure.

FIG. 16 shows a diagram of a system 1600 including a device 1605 that supports error reason indication for reception failure in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit, to a UE, a configuration message that includes information to be used by the UE in determining a cause of a failure by the UE to decode scheduled downlink transmissions, the information including a set of thresholds for the UE to use to determine the cause of the failure, transmit, to the UE, one or more scheduled downlink transmissions on at least a first downlink beam of a set of downlink beams, and receive, from the UE, an indication that the UE failed to decode the one or more scheduled downlink transmissions. The communications manager 1610 may also transmit, to a UE, one or more scheduled downlink transmissions on a first downlink beam, determine that the UE failed to decode the one or more scheduled downlink transmissions, transmit, based on the determining that the UE failed to decode the one or more scheduled downlink transmissions, a grant for transmission of a CSI report, where the grant includes resources for an indication of an error reason associated with the UE failing to decode the one or more scheduled downlink transmissions, and receive the CSI report including at least the indication of the error reason based on the grant.

The network communications manager 1615 may manage communications with the core network 130 (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting error reason indication for reception failure).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
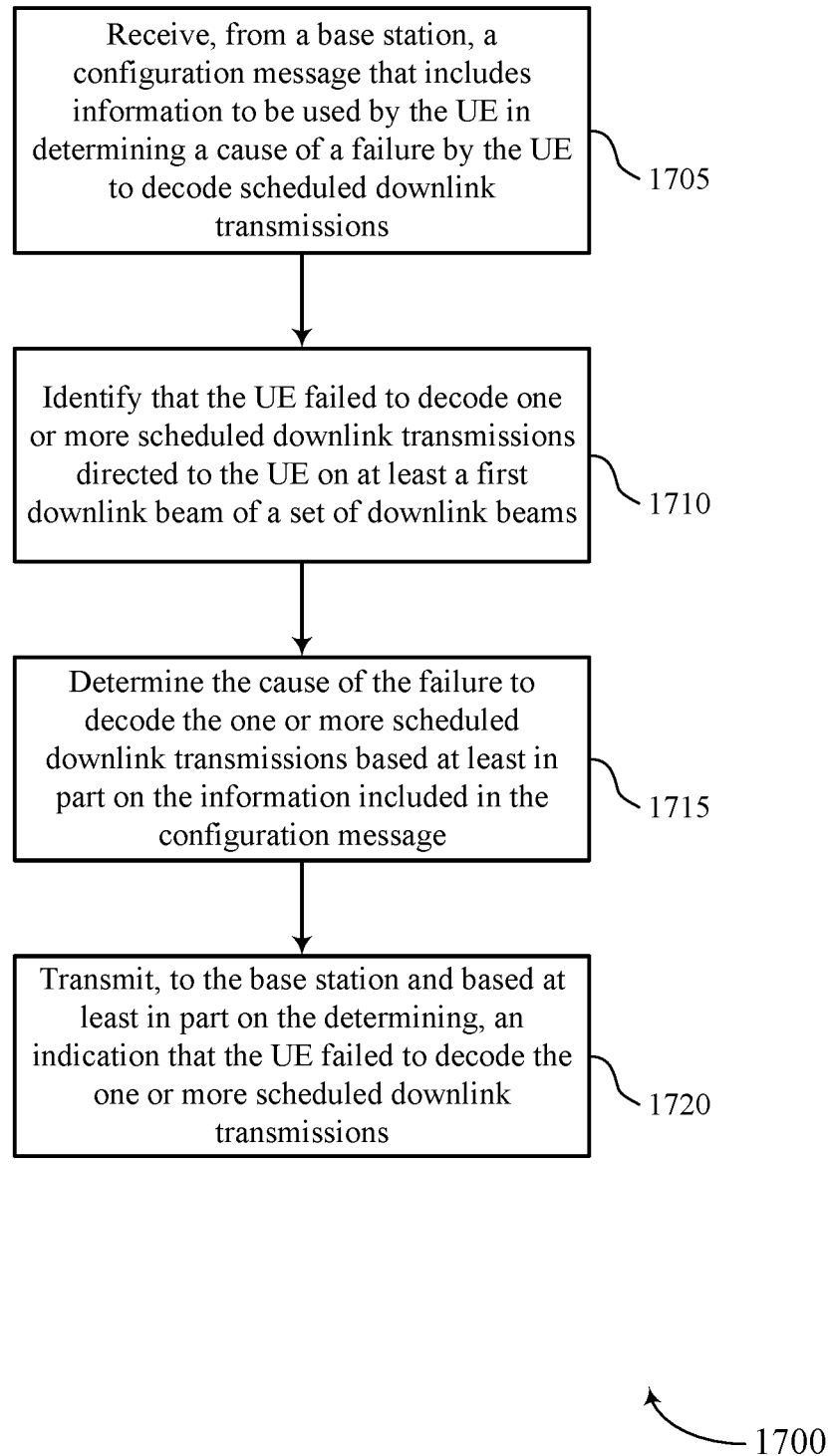
FIGS. 17 through 22 show flowcharts illustrating methods that support techniques for determining a cause of reception failure in accordance with aspects of the present disclosure.

FIG. 17 shows a flowchart illustrating a method 1700 that supports techniques for determining a cause of reception failure in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a configuration message that includes information to be used by the UE in determining a cause of a failure by the UE to decode scheduled downlink transmissions. The operations of 1705 may be performed according to the methods described herein. In some examples, aspects of the operations of 1705 may be performed by a configuration message manager as described with reference to FIGS. 9 through 12.

At 1710, the UE may identify that the UE failed to decode one or more scheduled downlink transmissions directed to the UE on at least a first downlink beam of a set of downlink beams. The operations of 1710 may be performed according to the methods described herein. In some examples, aspects of the operations of 1710 may be performed by a decode failure manager as described with reference to FIGS. 9 through 12.

At 1715, the UE may determine the cause of the failure to decode the one or more scheduled downlink transmissions based at least in part on the information included in the configuration message. The operations of 1715 may be performed according to the methods described herein. In some examples, aspects of the operations of 1715 may be performed by a failure determination manager as described with reference to FIGS. 9 through 12.

At 1720, the UE may transmit, to the base station and based at least in part on the determining, an indication that the UE failed to decode the one or more scheduled downlink transmissions. The operations of 1720 may be performed according to the methods described herein. In some examples, aspects of the operations of 1720 may be performed by a failure indication manager as described with reference to FIGS. 9 through 12.

Figure 18:
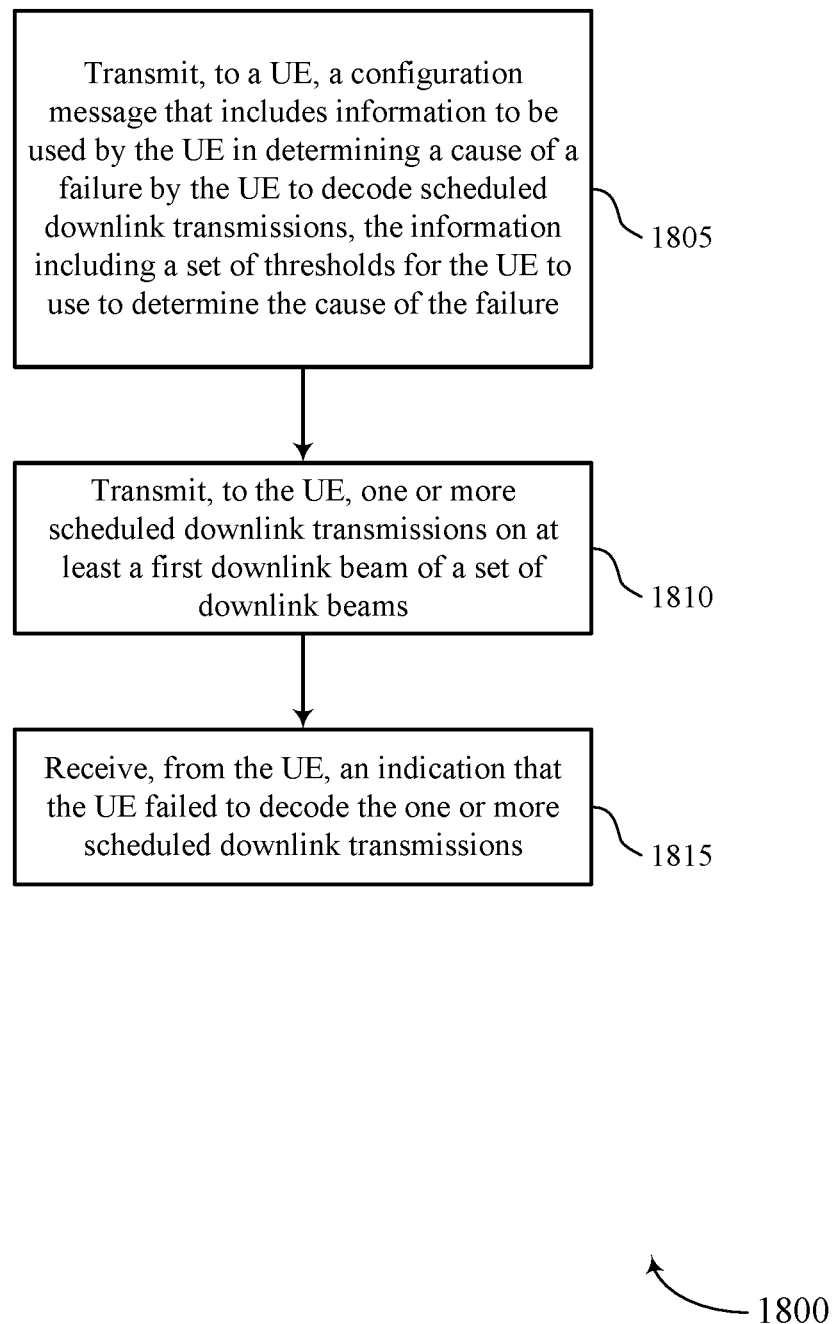

FIG. 18 shows a flowchart illustrating a method 1800 that supports techniques for determining a cause of reception failure in accordance with aspects of the present disclosure. The operations of method 1800 may be implemented by a base station 105 or its components as described herein. For example, the operations of method 1800 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a configuration message that includes information to be used by the UE in determining a cause of a failure by the UE to decode scheduled downlink transmissions, the information including a set of thresholds for the UE to use to determine the cause of the failure. The operations of 1805 may be performed according to the methods described herein. In some examples, aspects of the operations of 1805 may be performed by a configuration message component as described with reference to FIGS. 13 through 16.

At 1810, the base station may transmit, to the UE, one or more scheduled downlink transmissions on at least a first downlink beam of a set of downlink beams. The operations of 1810 may be performed according to the methods described herein. In some examples, aspects of the operations of 1810 may be performed by a scheduled transmission component as described with reference to FIGS. 13 through 16.

At 1815, the base station may receive, from the UE, an indication that the UE failed to decode the one or more scheduled downlink transmissions. The operations of 1815 may be performed according to the methods described herein. In some examples, aspects of the operations of 1815 may be performed by a failure indication component as described with reference to FIGS. 13 through 16.

Figure 19:
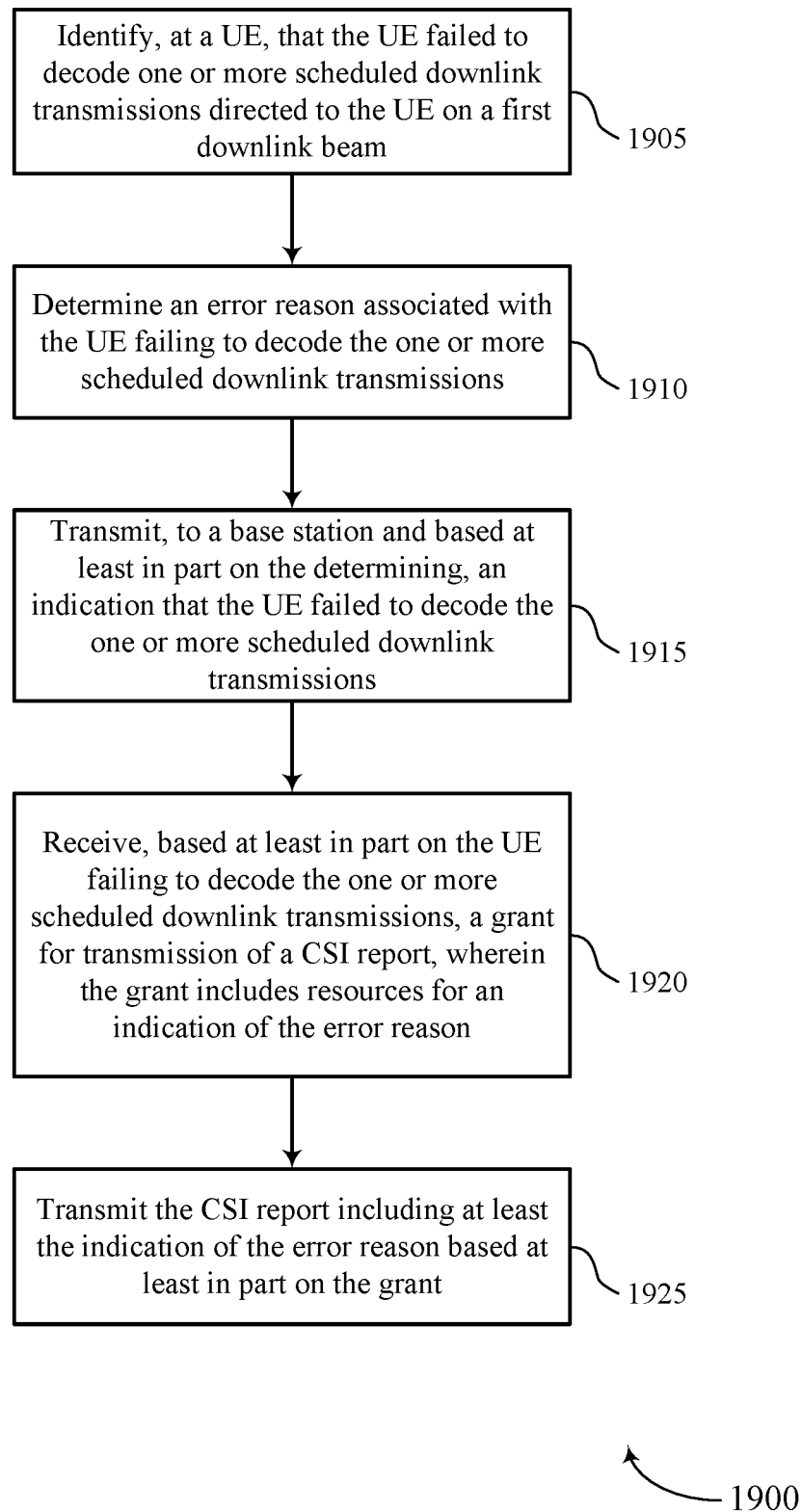

FIG. 19 shows a flowchart illustrating a method 1900 that supports techniques for determining a cause of reception failure in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may identify that the UE failed to decode one or more scheduled downlink transmissions directed to the UE on a first downlink beam. The operations of 1905 may be performed according to the methods described herein. In some examples, aspects of the operations of 1905 may be performed by a decoding failure identifier component as described with reference to FIGS. 9 through 12.

At 1910, the UE may determine an error reason associated with the UE failing to decode the one or more scheduled downlink transmissions. The operations of 1910 may be performed according to the methods described herein. In some examples, aspects of the operations of 1910 may be performed by an error reason determination component as described with reference to FIGS. 9 through 12.

At 1915, the UE may transmit, to a base station and based at least in part on the determining, an indication that the UE failed to decode the one or more scheduled downlink transmissions. The operations of 1915 may be performed according to the methods described herein. In some examples, aspects of the operations of 1915 may be performed by a failure indication component as described with reference to FIGS. 9 through 12.

At 1920, the UE may receive, based at least in part on the UE failing to decode the one or more scheduled downlink transmissions, a grant for transmission of a CSI report, wherein the grant includes resources for an indication of the error reason. The operations of 1920 may be performed according to the methods described herein. In some examples, aspects of the operations of 1920 may be performed by a grant reception component as described with reference to FIGS. 9 through 12.

At 1925, the UE may transmit the CSI report including at least the indication of the error reason based on the grant. The operations of 1925 may be performed according to the methods described herein. In some examples, aspects of the operations of 1925 may be performed by a CSI report component as described with reference to FIGS. 9 through 12.

Figure 20:
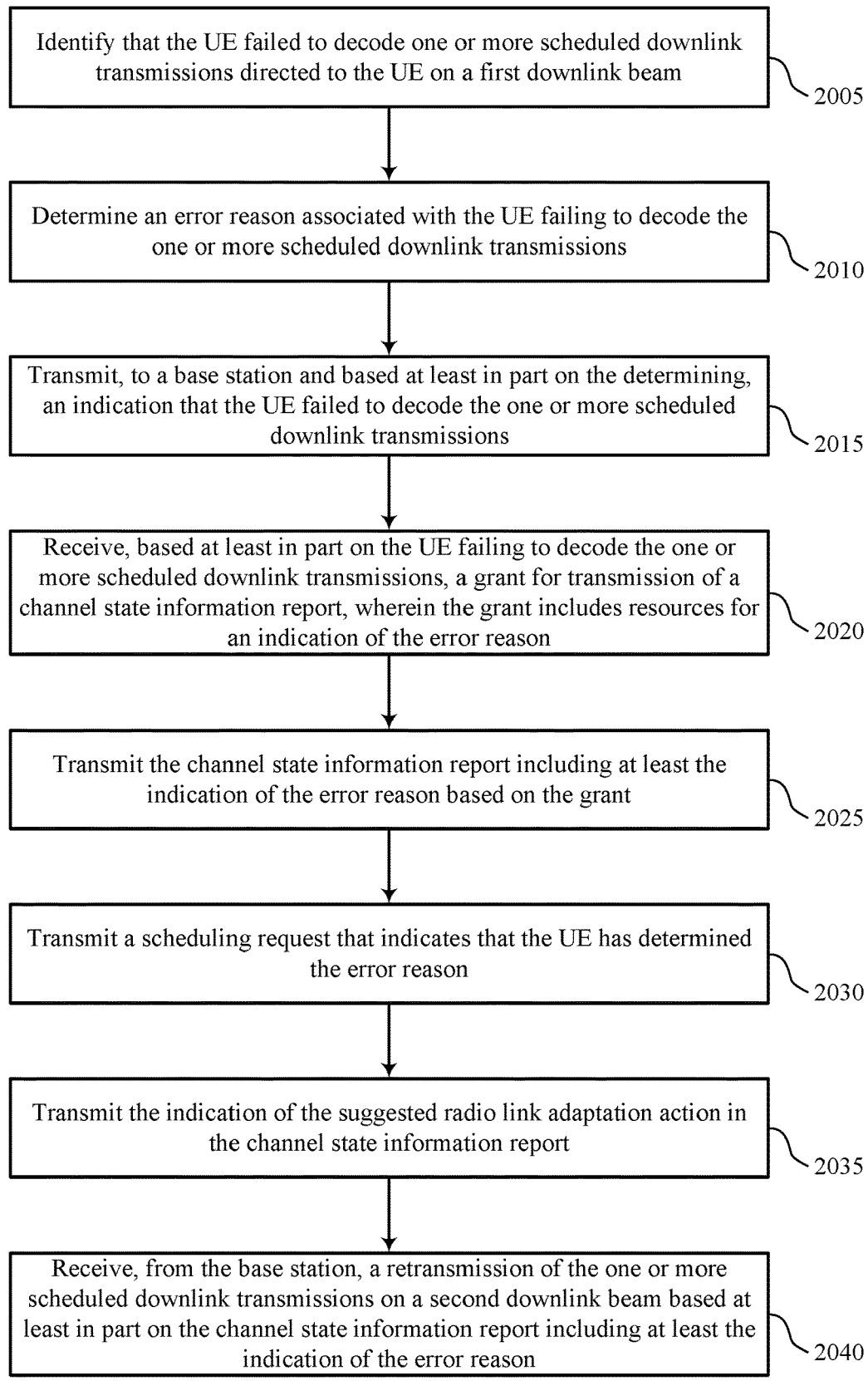

FIG. 20 shows a flowchart illustrating a method 2000 that supports techniques for determining a cause of reception failure in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may identify that the UE failed to decode one or more scheduled downlink transmissions directed to the UE on a first downlink beam. The operations of 2005 may be performed according to the methods described herein. In some examples, aspects of the operations of 2005 may be performed by a decoding failure identifier component as described with reference to FIGS. 9 through 12.

At 2010, the UE may determine an error reason associated with the UE failing to decode the one or more scheduled downlink transmissions. The operations of 2010 may be performed according to the methods described herein. In some examples, aspects of the operations of 2010 may be performed by an error reason determination component as described with reference to FIGS. 9 through 12.

At 2015, the UE may transmit, to a base station and based at least in part on the determining, an indication that the UE failed to decode the one or more scheduled downlink transmissions. The operations of 2015 may be performed according to the methods described herein. In some examples, aspects of the operations of 2015 may be performed by a failure indication component as described with reference to FIGS. 9 through 12.

At 2020, the UE may receive, based at least in part on the UE failing to decode the one or more scheduled downlink transmissions, a grant for transmission of a CSI report, wherein the grant includes resources for an indication of the error reason. The operations of 2020 may be performed according to the methods described herein. In some examples, aspects of the operations of 2020 may be performed by a grant reception component as described with reference to FIGS. 9 through 12.

At 2025, the UE may transmit the CSI report including at least the indication of the error reason based at least in part on the grant. The operations of 2025 may be performed according to the methods described herein. In some examples, aspects of the operations of 2025 may be performed by a CSI report component as described with reference to FIGS. 9 through 12.

At 2030, the UE may transmit a scheduling request that indicates that the UE has determined the error reason. The operations of 2030 may be performed according to the methods described herein. In some examples, aspects of the operations of 2030 may be performed by a scheduling request component as described with reference to FIGS. 9 through 12.

At 2035, the UE may transmit the indication of the suggested radio link adaptation action in the CSI report. The operations of 2035 may be performed according to the methods described herein. In some examples, aspects of the operations of 2035 may be performed by a CSI report component as described with reference to FIGS. 9 through 12.

At 2040, the UE may receive, from the base station, a retransmission of the one or more scheduled downlink transmissions on a second downlink beam based at least in part on the CSI report including at least the indication of the error reason. The operations of 2040 may be performed according to the methods described herein. In some examples, aspects of the operations of 2040 may be performed by a retransmission reception component as described with reference to FIGS. 9 through 12.

Figure 21:
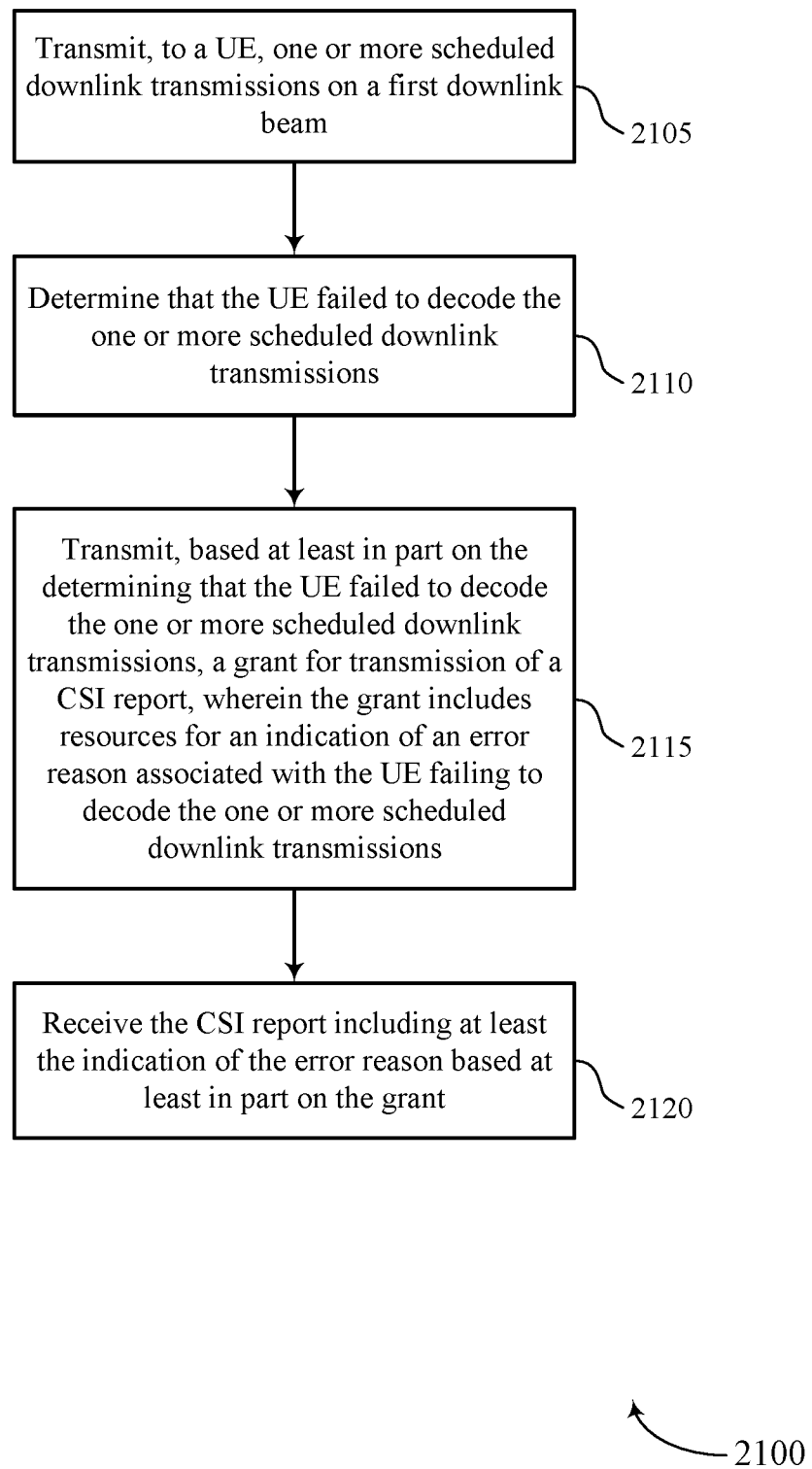

FIG. 21 shows a flowchart illustrating a method 2100 that supports techniques for determining a cause of reception failure in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, one or more scheduled downlink transmissions on a first downlink beam. The operations of 2105 may be performed according to the methods described herein. In some examples, aspects of the operations of 2105 may be performed by a downlink transmission component as described with reference to FIGS. 13 through 16.

At 2110, the base station may determine that the UE failed to decode the one or more scheduled downlink transmissions. The operations of 2110 may be performed according to the methods described herein. In some examples, aspects of the operations of 2110 may be performed by a failure determination component as described with reference to FIGS. 13 through 16.

At 2115, the base station may transmit, based at least in part on the determining that the UE failed to decode the one or more scheduled downlink transmissions, a grant for transmission of a CSI report, wherein the grant includes resources for an indication of an error reason associated with the UE failing to decode the one or more scheduled downlink transmissions. The operations of 2115 may be performed according to the methods described herein. In some examples, aspects of the operations of 2115 may be performed by a grant transmission component as described with reference to FIGS. 13 through 16.

At 2120, the base station may receive the CSI report including at least the indication of the error reason based at least in part on the grant. The operations of 2120 may be performed according to the methods described herein. In some examples, aspects of the operations of 2120 may be performed by a CSI report component as described with reference to FIGS. 13 through 16.

Figure 22:
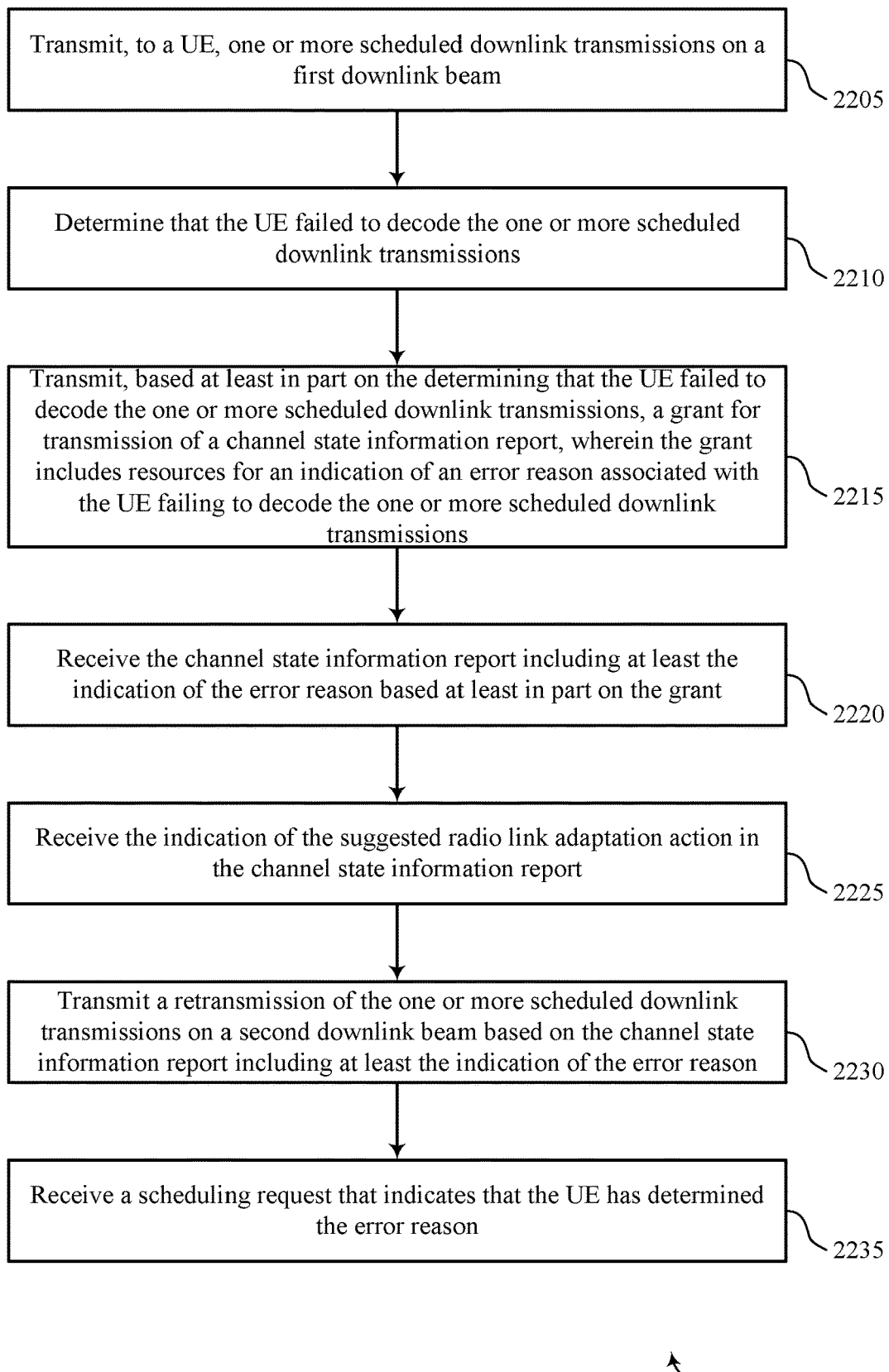

FIG. 22 shows a flowchart illustrating a method 2200 that supports techniques for determining a cause of reception failure in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, one or more scheduled downlink transmissions on a first downlink beam. The operations of 2205 may be performed according to the methods described herein. In some examples, aspects of the operations of 2205 may be performed by a downlink transmission component as described with reference to FIGS. 13 through 16.

At 2210, the base station may determine that the UE failed to decode the one or more scheduled downlink transmissions. The operations of 2210 may be performed according to the methods described herein. In some examples, aspects of the operations of 2210 may be performed by a failure determination component as described with reference to FIGS. 13 through 16.

At 2215, the base station may transmit, based at least in part on the determining that the UE failed to decode the one or more scheduled downlink transmissions, a grant for transmission of a CSI report, wherein the grant includes resources for an indication of an error reason associated with the UE failing to decode the one or more scheduled downlink transmissions. The operations of 2215 may be performed according to the methods described herein. In some examples, aspects of the operations of 2215 may be performed by a grant transmission component as described with reference to FIGS. 13 through 16.

At 2220, the base station may receive the CSI report including at least the indication of the error reason based at least in part on the grant. The operations of 2220 may be performed according to the methods described herein. In some examples, aspects of the operations of 2220 may be performed by a CSI report component as described with reference to FIGS. 13 through 16.

At 2225, the base station may receive the indication of the suggested radio link adaptation action in the CSI report. The operations of 2225 may be performed according to the methods described herein. In some examples, aspects of the operations of 2225 may be performed by a CSI report component as described with reference to FIGS. 13 through 16.

At 2230, the base station may transmit a retransmission of the one or more scheduled downlink transmissions on a second downlink beam based at least in part on the CSI report including at least the indication of the error reason. The operations of 2230 may be performed according to the methods described herein. In some examples, aspects of the operations of 2230 may be performed by a retransmission component as described with reference to FIGS. 13 through 16.

At 2235, the base station may receive a scheduling request that indicates that the UE has determined the error reason. The operations of 2235 may be performed according to the methods described herein. In some examples, aspects of the operations of 2235 may be performed by a scheduling request component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, a configuration message that includes information to be used by the UE in determining a cause of a failure by the UE to decode scheduled downlink transmissions; identifying that the UE failed to decode one or more scheduled downlink transmissions directed to the UE on at least a first downlink beam of a plurality of downlink beams; determining a cause of the failure to decode the one or more scheduled downlink transmissions based at least in part on the information included in the configuration message; and transmitting, to the base station and based at least in part on the determining, an indication that the UE failed to decode the one or more scheduled downlink transmissions.

Aspect 2: The method of aspect 1, wherein determining the cause of the failure further comprises: determining that the failure is due to the first downlink beam being fully beam blocked.

Aspect 3: The method of aspect 2, further comprising: measuring a signal strength parameter for each of the one or more scheduled downlink transmissions received over each downlink beam of the plurality of downlink beams; and performing one or more comparisons of the measured signal strengths to a plurality of thresholds, the plurality of thresholds comprising one or more layer 3 (L3) thresholds and one or more layer 1 (L1) thresholds.

Aspect 4: The method of aspect 3, wherein measuring the signal strength parameter further comprises: measuring the signal strength parameter averaged over a beam blocking duration for each of the one or more scheduled downlink transmissions received over each downlink beam of the plurality of downlink beams.

Aspect 5: The method of aspect 4, wherein performing the one or more comparisons further comprises: determining that the measured signal strength averaged over a system bandwidth for the first downlink beam is less than a first L3 threshold of the one or more L3 thresholds.

Aspect 6: The method of any of aspects 4 through 5, wherein performing the one or more comparisons further comprises: determining a maximum signal strength of the measured signal strengths of each resource block for the first downlink beam; and determining that the maximum measured signal strength is less than a first L3 threshold of the one or more L3 thresholds.

Aspect 7: The method of any of aspects 4 through 6, wherein performing the one or more comparisons further comprises: determining that the measured signal strength of at least a preconfigured number of physical resource blocks for the first downlink beam, averaged over the beam blocking duration, is less than a first L3 threshold of the one or more L3 thresholds.

Aspect 8: The method of any of aspects 3 through 7, wherein measuring the signal strength parameter further comprises: measuring an instantaneous signal strength parameter for each of the one or more scheduled downlink transmissions received over each downlink beam of the plurality of downlink beams.

Aspect 9: The method of aspect 8, wherein performing the one or more comparisons further comprises: determining that the measured instantaneous received signal strength averaged over a system bandwidth for the first downlink beam is less than a first L1 threshold of the one or more L1 thresholds.

Aspect 10: The method of any of aspects 8 through 9, wherein performing the one or more comparisons further comprises: determining a maximum instantaneous measured signal strength of the measured instantaneous signal strengths for the first downlink beam; and determining that the maximum instantaneous measured signal strength is less than a first L1 threshold of the one or more L1 thresholds.

Aspect 11: The method of any of aspects 8 through 10, wherein determining that the measured instantaneous signal strength parameter is less than an L1 threshold further comprises: determining that a difference between the instantaneous measured signal strength for the first downlink beam averaged over a system bandwidth from a first time to a second time is less than a first L1 threshold of the one or more L1 thresholds.

Aspect 12: The method of any of aspects 3 through 11, wherein the measured signal strength parameter is a reference signal received power.

Aspect 13: The method of any of aspects 2 through 12, wherein transmitting the indication further comprises: transmitting the indication that the UE failed to decode the one or more scheduled downlink transmissions via a downlink beam that is different than the first downlink beam.

Aspect 14: The method of any of aspects 1 through 13, wherein determining the cause of the failure further comprises: determining that the failure is due to the first downlink beam being partially beam blocked.

Aspect 15: The method of aspect 14, further comprising: performing one or more comparisons of a measured signal strength parameter to a plurality of thresholds, the plurality of thresholds comprising one or more (L1) thresholds and one or more layer 3 (L3) thresholds.

Aspect 16: The method of aspect 15, wherein performing the one or more comparisons further comprises: measuring an instantaneous signal strength parameter for each of the one or more scheduled downlink transmissions received over each downlink beam of the plurality of downlink beams, wherein the measured instantaneous signal strength parameter is a reference signal received power; and determining that the measured instantaneous signal strength parameter averaged over a system bandwidth for the first downlink beam is greater than a first L1 threshold of the one or more L1 thresholds and less than a second L1 threshold of the one or more L1 thresholds.

Aspect 17: The method of any of aspects 15 through 16, wherein performing the one or more comparisons further comprises: measuring an instantaneous signal strength parameter for each of the one or more scheduled downlink transmissions received over each downlink beam of the plurality of downlink beams, wherein the measured instantaneous signal strength parameter is a reference signal received power; determining a maximum instantaneous measured signal strength of the measured instantaneous signal strengths for the first downlink beam; and determining that the maximum instantaneous measured signal strength is greater than a first L1 threshold of the one or more L1 thresholds and less than a second L1 threshold of the one or more L1 thresholds.

Aspect 18: The method of any of aspects 15 through 17, wherein performing the one or more comparisons further comprises: measuring a signal strength parameter averaged over a beam blocking duration for each of the one or more scheduled downlink transmissions received over each downlink beam of the plurality of downlink beams, wherein the measured instantaneous signal strength parameter is a reference signal received power; and determining that the measured signal strength parameter averaged over a system bandwidth for the first downlink beam is greater than a first L3 threshold of the one or more L3 thresholds and less than a second L3 threshold of the one or more L3 thresholds.

Aspect 19: The method of any of aspects 15 through 18, wherein performing the one or more comparisons further comprises: measuring a signal strength parameter averaged over a beam blocking duration for each of the one or more scheduled downlink transmissions received over each downlink beam of the plurality of downlink beams, wherein the measured instantaneous signal strength parameter is a reference signal received power; determining a maximum signal strength of the measured signal strengths of each resource block for the first downlink beam; and determining that the maximum measured signal strength is greater than a first L3 threshold of the one or more L3 thresholds and less than a second L3 threshold of the one or more L3 thresholds.

Aspect 20: The method of any of aspects 15 through 19, wherein performing the one or more comparisons further comprises: measuring an instantaneous signal strength parameter for each of the one or more scheduled downlink transmissions received over each downlink beam of the plurality of downlink beams, wherein the measured instantaneous signal strength parameter is a reference signal received power; and determining that a difference between the instantaneous measured signal strength averaged over a system bandwidth for the first downlink beam from a first time to a second time is greater than a first L1 threshold of the one or more L1 thresholds and less than a second L1 threshold of the one or more L1 thresholds.

Aspect 21: The method of any of aspects 14 through 20, wherein transmitting the indication further comprises: transmitting the indication that the UE failed to decode the one or more scheduled downlink transmissions via the first downlink beam.

Aspect 22: The method of any of aspects 1 through 21, wherein receiving the configuration message further comprises: receiving an activation message for the UE determine the cause of the failure by the UE to decode scheduled downlink transmissions based on preconfigured thresholds.

Aspect 23: The method of any of aspects 1 through 22, wherein receiving the configuration message further comprises: receiving a plurality of thresholds for the UE to use to determine the cause of the failure by the UE to decode scheduled downlink transmissions.

Aspect 24: A method for wireless communications at a base station, comprising: transmitting, to a UE, a configuration message that includes information to be used by the UE in determining a cause of a failure by the UE to decode scheduled downlink transmissions, the information comprising a plurality of thresholds for the UE to use to determine the cause of the failure; transmitting, to the UE, one or more scheduled downlink transmissions on at least a first downlink beam of a plurality of downlink beams; and receiving, from the UE, an indication that the UE failed to decode the one or more scheduled downlink transmissions.

Aspect 25: The method of aspect 24, wherein the plurality of thresholds comprises one or more layer 3 (L3) thresholds and one or more layer 1 (L1) thresholds.

Aspect 26: The method of aspect 25, wherein transmitting the configuration message further comprises: transmitting an L3 threshold of the one or more L3 thresholds to be compared to a signal strength parameter of the first downlink beam averaged over a system bandwidth.

Aspect 27: The method of any of aspects 25 through 26, wherein transmitting the configuration message further comprises: transmitting an L3 threshold of the one or more L3 thresholds to be compared to a maximum signal strength parameter of the first downlink beam averaged over a system bandwidth.

Aspect 28: The method of any of aspects 25 through 27, wherein transmitting the configuration message further comprises: transmitting an L3 threshold of the one or more L3 thresholds to be compared to a signal strength parameter of the first downlink beam on one or more physical resource blocks.

Aspect 29: The method of any of aspects 25 through 28, wherein transmitting the configuration message further comprises: transmitting an L1 threshold of the one or more L1 thresholds to be compared to an instantaneous signal strength parameter of the first downlink beam averaged over a system bandwidth.

Aspect 30: The method of any of aspects 25 through 29, wherein transmitting the configuration message further comprises: transmitting an L1 threshold of the one or more L1 thresholds to be compared to a maximum instantaneous signal strength parameter of the first downlink beam averaged over a system bandwidth.

Aspect 31: The method of any of aspects 25 through 30, wherein transmitting the configuration message further comprises: transmitting an L1 threshold of the one or more L1 thresholds to be compared to a difference between an instantaneous signal strength parameter of the first downlink beam averaged over a system bandwidth from a first time to a second time.

Aspect 32: The method of any of aspects 25 through 31, wherein transmitting the configuration message further comprises: transmitting a first L1 threshold of the one or more L1 thresholds and a second L1 threshold of the one or more L1 thresholds to be compared to an instantaneous signal strength parameter of the first downlink beam averaged over a system bandwidth.

Aspect 33: The method of any of aspects 25 through 32, wherein transmitting the configuration message further comprises: transmitting a first L1 threshold of the one or more L1 thresholds and a second L1 threshold of the one or more L1 thresholds to be compared to a maximum instantaneous signal strength parameter of the first downlink beam averaged over a system bandwidth.

Aspect 34: The method of any of aspects 25 through 33, wherein transmitting the configuration message further comprises: transmitting a first L3 threshold of the one or more L3 thresholds and a second L3 threshold of the one or more L3 thresholds to be compared to a signal strength parameter of the first downlink beam averaged over a system bandwidth.

Aspect 35: The method of any of aspects 25 through 34, wherein transmitting the configuration message further comprises: transmitting a first L3 threshold of the one or more L3 thresholds and a second L3 threshold of the one or more L3 thresholds to be compared to a maximum signal strength parameter of the first downlink beam averaged over a system bandwidth.

Aspect 36: The method of any of aspects 25 through 35, wherein transmitting the configuration message further comprises: transmitting a first L1 threshold of the one or more L1 thresholds and a second L1 threshold of the one or more L1 thresholds to be compared to a difference between an instantaneous signal strength parameter of the first downlink beam averaged over a system bandwidth from a first time to a second time.

Aspect 37: The method of any of aspects 25 through 36, wherein receiving the indication further comprises: receiving the indication that the UE failed to decode the one or more scheduled downlink transmissions via a downlink beam that is different than the first downlink beam.

Aspect 38: The method of any of aspects 25 through 37, wherein receiving the indication further comprises: receiving the indication that the UE failed to decode the one or more scheduled downlink transmissions via the first downlink beam.

Aspect 39: The method of any of aspects 25 through 38, wherein transmitting the configuration message further comprises: transmitting an activation message for the UE determine the cause of the failure by the UE to decode scheduled downlink transmissions based on preconfigured thresholds.

Aspect 40: A method for wireless communications at a UE, comprising: identifying that the UE failed to decode one or more scheduled downlink transmissions directed to the UE on a first downlink beam; determining an error reason associated with the UE failing to decode the one or more scheduled downlink transmissions; transmitting, to a base station and based at least in part on the determining, an indication that the UE failed to decode the one or more scheduled downlink transmissions; receiving, based at least in part on the UE failing to decode the one or more scheduled downlink transmissions, a grant for transmission of a channel state information report, wherein the grant comprises resources for an indication of the error reason; and transmitting the channel state information report comprising at least the indication of the error reason based at least in part on the grant.

Aspect 41: The method of aspect 40, wherein the grant further comprises resources for an indication of a suggested radio link adaptation action, the method further comprising: transmitting the indication of the suggested radio link adaptation action in the channel state information report.

Aspect 42: The method of aspect 41, wherein the resources for the indication of the suggested radio link adaptation action comprise resources for indicating a lowering of a modulation and coding scheme, a beam change, a resource block group change, a multi slot transmission, a back off period for delaying a retransmission, or a combination thereof.

Aspect 43: The method of any of aspects 40 through 42, wherein the resources for the indication of the error reason comprise resources for indicating a coverage hole, a beam blocking, a partial beam blocking, an interference, a frequency selective fading, a collision, or a combination thereof.

Aspect 44: The method of any of aspects 40 through 43, further comprising: receiving, from the base station, a retransmission of the one or more scheduled downlink transmissions on a second downlink beam based at least in part on the channel state information report comprising at least the indication of the error reason.

Aspect 45: The method of any of aspects 40 through 44, wherein transmitting the indication that the UE failed to decode the one or more scheduled downlink transmissions comprises: transmitting a scheduling request that indicates that the UE has determined the error reason.

Aspect 46: The method of aspect 45, further comprising: transmitting a request for uplink resources for transmitting the channel state information report comprising at least the indication of the error reason, wherein receiving the grant is based at least in part on transmitting the request for uplink resources.

Aspect 47: The method of any of aspects 45 through 46, further comprising: receiving an indication of a timer that prohibits transmission of the scheduling request that indicates that the UE has determined the error reason until expiration of the timer.

Aspect 48: The method of any of aspects 45 through 47, wherein transmitting the scheduling request that indicates that the UE has determined the error reason further comprises: transmitting the scheduling request that indicates that the UE has determined the error reason on a plurality of uplink beams.

Aspect 49: The method of any of aspects 40 through 48, further comprising: receiving a request to transmit the indication of the error reason.

Aspect 50: The method of aspect 49, further comprising: receiving a request to transmit an indication of a suggested radio link adaptation action.

Aspect 51: The method of any of aspects 40 through 50, further comprising: receiving an activation of a set of measurements for determining the error reason.

Aspect 52: The method of any of aspects 40 through 51, wherein determining the error reason associated with the UE failing to decode the one or more scheduled downlink transmissions comprises: determining that the failure is due to a first downlink beam being blocked.

Aspect 53: A method for wireless communications at a base station, comprising: transmitting, to a UE, one or more scheduled downlink transmissions on a first downlink beam; determining that the UE failed to decode the one or more scheduled downlink transmissions; transmitting, based at least in part on the determining that the UE failed to decode the one or more scheduled downlink transmissions, a grant for transmission of a channel state information report, wherein the grant comprises resources for an indication of an error reason associated with the UE failing to decode the one or more scheduled downlink transmissions; and receiving the channel state information report comprising at least the indication of the error reason based at least in part on the grant.

Aspect 54: The method of aspect 53, wherein the grant further comprises resources for an indication of a suggested radio link adaptation action, the method further comprising: receiving the indication of the suggested radio link adaptation action in the channel state information report.

Aspect 55: The method of aspect 54, wherein the resources for the indication of the suggested radio link adaptation action comprise resources for indicating a lowering of a modulation and coding scheme, a beam change, a resource block group change, a multi slot transmission, a back off period for delaying a retransmission, or a combination thereof.

Aspect 56: The method of any of aspects 53 through 55, wherein the resources for the indication of the error reason comprise resources for indicating a coverage hole, a beam blocking, a partial beam blocking, an interference, a frequency selective fading, a collision, or a combination thereof.

Aspect 57: The method of any of aspects 53 through 56, further comprising: transmitting a retransmission of the one or more scheduled downlink transmissions on a second downlink beam based at least in part on the channel state information report comprising at least the indication of the error reason.

Aspect 58: The method of any of aspects 53 through 57, wherein determining that the UE failed to decode the one or more scheduled downlink transmissions comprises: receiving a scheduling request that indicates that the UE has determined the error reason.

Aspect 59: The method of aspect 58, further comprising: receiving a request for uplink resources for transmitting the channel state information report comprising at least the indication of the error reason, wherein transmitting the grant is based at least in part on receiving the request for uplink resources.

Aspect 60: The method of any of aspects 58 through 59, further comprising: transmitting an indication of a timer that prohibits transmission of the scheduling request that indicates that the UE has determined the error reason until expiration of the timer.

Aspect 61: The method of any of aspects 58 through 60, wherein receiving the scheduling request that indicates that the UE has determined the error reason further comprises: receiving the scheduling request that indicates that the UE has determined the error reason on a plurality of uplink beams.

Aspect 62: The method of aspect 61, further comprising: transmitting a request to transmit the indication of the error reason.

Aspect 63: The method of aspect 62, further comprising: transmitting a request to transmit an indication of a suggested radio link adaptation action.

Aspect 64: The method of any of aspects 53 through 63, further comprising: activating a set of measurements for the UE to determine the error reason.

Aspect 65: An apparatus for wireless communications at a UE, comprising at least one processor; memory coupled with the at least one processor; and instructions stored in the memory and executable by the at least one processor to cause the apparatus to perform a method of any of aspects 1 through 23.

Aspect 66: An apparatus for wireless communications at a UE, comprising at least one means for performing a method of any of aspects 1 through 23.

Aspect 67: A non-transitory computer-readable medium storing code for wireless communications at a UE, the code comprising instructions executable by at least one processor to perform a method of any of aspects 1 through 23.

Aspect 68: An apparatus for wireless communications at a base station, comprising at least one processor; memory coupled with the at least one processor; and instructions stored in the memory and executable by the at least one processor to cause the apparatus to perform a method of any of aspects 24 through 39.

Aspect 69: An apparatus for wireless communications at a base station, comprising at least one means for performing a method of any of aspects 24 through 39.

Aspect 70: A non-transitory computer-readable medium storing code for wireless communications at a base station, the code comprising instructions executable by at least one processor to perform a method of any of aspects 24 through 39.

Aspect 71: An apparatus for wireless communications at a UE, comprising at least one processor; memory coupled with the at least one processor; and instructions stored in the memory and executable by the at least one processor to cause the apparatus to perform a method of any of aspects 40 through 52.

Aspect 72: An apparatus for wireless communications at a UE, comprising at least one means for performing a method of any of aspects 40 through 52.

Aspect 73: A non-transitory computer-readable medium storing code for wireless communications at a UE, the code comprising instructions executable by at least one processor to perform a method of any of aspects 40 through 52.

Aspect 74: An apparatus for wireless communications at a base station, comprising at least one processor; memory coupled with the at least one processor; and instructions stored in the memory and executable by the at least one processor to cause the apparatus to perform a method of any of aspects 53 through 64.

Aspect 75: An apparatus for wireless communications at a base station, comprising at least one means for performing a method of any of aspects 53 through 64.

Aspect 76: A non-transitory computer-readable medium storing code for wireless communications at a base station, the code comprising instructions executable by at least one processor to perform a method of any of aspects 53 through 64.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a network node, a configuration message that includes information to be used by the UE in determining, from a plurality of failure causes, a cause of a failure by the UE to decode scheduled downlink transmissions;
   identifying that the UE failed to decode one or more scheduled downlink transmissions directed to the UE on at least a first downlink beam of a plurality of downlink beams;
   determining, from the plurality of failure causes, the cause of the failure to decode the one or more scheduled downlink transmissions based at least in part on the information included in the configuration message;
   transmitting, to the network node and based at least in part on the determining, an indication that the UE failed to decode the one or more scheduled downlink transmissions; and
   transmitting, to the network node, an indication of the determined cause of the failure.

2. The method of claim 1, wherein determining the cause of the failure further comprises:
   determining that the failure is due to the first downlink beam being fully beam blocked.

3. The method of claim 2, further comprising:
   measuring a signal strength parameter for each of the one or more scheduled downlink transmissions received over each downlink beam of the plurality of downlink beams; and
   performing one or more comparisons of the measured signal strengths to a plurality of thresholds, the plurality of thresholds comprising one or more layer 3 (L3) thresholds and one or more layer 1 (L1) thresholds.

4. The method of claim 3, wherein measuring the signal strength parameter further comprises:
   measuring the signal strength parameter averaged over a beam blocking duration for each of the one or more scheduled downlink transmissions received over each downlink beam of the plurality of downlink beams.

5. The method of claim 4, wherein performing the one or more comparisons further comprises:
   determining that the measured signal strength averaged over a system bandwidth for the first downlink beam is less than a first L3 threshold of the one or more L3 thresholds.

6. The method of claim 4, wherein performing the one or more comparisons further comprises:
   determining a maximum signal strength of the measured signal strengths of each resource block for the first downlink beam; and
   determining that the maximum signal strength is less than a first L3 threshold of the one or more L3 thresholds.

7. The method of claim 4, wherein performing the one or more comparisons further comprises:
   determining that the measured signal strength of at least a preconfigured number of physical resource blocks for the first downlink beam, averaged over the beam blocking duration, is less than a first L3 threshold of the one or more L3 thresholds.

8. The method of claim 3, wherein measuring the signal strength parameter further comprises:
   measuring an instantaneous signal strength parameter for each of the one or more scheduled downlink transmissions received over each downlink beam of the plurality of downlink beams.

9. The method of claim 8, wherein performing the one or more comparisons further comprises:
   determining that the measured instantaneous signal strength parameter averaged over a system bandwidth for the first downlink beam is less than a first L1 threshold of the one or more L1 thresholds.

10. The method of claim 8, wherein performing the one or more comparisons further comprises:
    determining a maximum instantaneous measured signal strength of the measured instantaneous signal strengths for the first downlink beam; and
    determining that the maximum instantaneous measured signal strength is less than a first L1 threshold of the one or more L1 thresholds.

11. The method of claim 8, wherein determining that the measured instantaneous signal strength parameter is less than an L1 threshold further comprises:
    determining that a difference between the instantaneous measured signal strength for the first downlink beam averaged over a system bandwidth from a first time to a second time is less than a first L1 threshold of the one or more L1 thresholds.

12. The method of claim 3, wherein the measured signal strength parameter is a reference signal received power.

13. The method of claim 2, wherein transmitting the indication that the UE failed to decode the one or more scheduled downlink transmissions further comprises:
    transmitting the indication that the UE failed to decode the one or more scheduled downlink transmissions via a downlink beam that is different than the first downlink beam.

14. The method of claim 1, wherein determining the cause of the failure further comprises:
  determining that the failure is due to the first downlink beam being partially beam blocked.

15. The method of claim 14, further comprising:
  performing one or more comparisons of a measured signal strength parameter to a plurality of thresholds, the plurality of thresholds comprising one or more (L1) thresholds and one or more layer 3 (L3) thresholds.

16. An apparatus for wireless communications at a user equipment (UE), comprising:
  at least one processor,
  memory coupled with the at least one processor; and
  instructions stored in the memory and executable by the at least one processor to cause the apparatus to:
    receive, from a network node, a configuration message that includes information to be used by the UE in determining, from a plurality of failure causes, a cause of a failure by the UE to decode scheduled downlink transmissions;
    identify that the UE failed to decode one or more scheduled downlink transmissions directed to the UE on at least a first downlink beam of a plurality of downlink beams;
    determine, from the plurality of failure causes, the cause of the failure to decode the one or more scheduled downlink transmissions based at least in part on the information included in the configuration message;
    transmit, to the network node and based at least in part on the determining, an indication that the UE failed to decode the one or more scheduled downlink transmissions; and
    transmit, to the network node, an indication of the determined cause of the failure.

17. The apparatus of claim 16, wherein the instructions to determine the cause of the failure are further executable by the at least one processor to cause the apparatus to:
  determine that the failure is due to the first downlink beam being fully beam blocked.

18. The apparatus of claim 17, wherein the instructions are further executable by the at least one processor to cause the apparatus to:
  measure a signal strength parameter for each of the one or more scheduled downlink transmissions received over each downlink beam of the plurality of downlink beams, wherein the measured signal strength parameter is a reference signal received power; and
  perform one or more comparisons of the measured signal strengths to a plurality of thresholds, the plurality of thresholds comprising one or more layer 3 (L3) thresholds and one or more layer 1 (L1) thresholds.

19. The apparatus of claim 18, wherein the instructions to measure the signal strength parameter are further executable by the at least one processor to cause the apparatus to:
  measure the signal strength parameter averaged over a beam blocking duration for each of the one or more scheduled downlink transmissions received over each downlink beam of the plurality of downlink beams.

20. The apparatus of claim 19, wherein the instructions to perform the one or more comparisons are further executable by the at least one processor to cause the apparatus to:
  determine that the measured signal strength averaged over a system bandwidth for the first downlink beam is less than a first L3 threshold of the one or more L3 thresholds.

21. The apparatus of claim 19, wherein the instructions to perform the one or more comparisons are further executable by the at least one processor to cause the apparatus to:
  determine a maximum signal strength of the measured signal strengths of each resource block for the first downlink beam; and
  determine that the maximum signal strength is less than a first L3 threshold of the one or more L3 thresholds.

22. The apparatus of claim 19, wherein the instructions to perform the one or more comparisons are further executable by the at least one processor to cause the apparatus to:
  determine that the measured signal strength of at least a preconfigured number of physical resource blocks for the first downlink beam, averaged over the beam blocking duration, is less than a first L3 threshold of the one or more L3 thresholds.

23. The apparatus of claim 18, wherein the instructions to measure the signal strength parameter are further executable by the at least one processor to cause the apparatus to:
  measure an instantaneous signal strength parameter for each of the one or more scheduled downlink transmissions received over each downlink beam of the plurality of downlink beams.

24. The apparatus of claim 23, wherein the instructions to perform the one or more comparisons are further executable by the at least one processor to cause the apparatus to:
  determine that the measured instantaneous signal strength parameter averaged over a system bandwidth for the first downlink beam is less than a first L1 threshold of the one or more L1 thresholds.

25. The apparatus of claim 23, wherein the instructions to perform the one or more comparisons are further executable by the at least one processor to cause the apparatus to:
  determine a maximum instantaneous measured signal strength of the measured instantaneous signal strengths for the first downlink beam; and
  determine that the maximum instantaneous measured signal strength is less than a first L1 threshold of the one or more L1 thresholds.

26. The apparatus of claim 23, wherein the instructions to determine that the measured instantaneous signal strength parameter is less than an L1 threshold are further executable by the at least one processor to cause the apparatus to:
  determine that a difference between the instantaneous measured signal strength for the first downlink beam averaged over a system bandwidth from a first time to a second time is less than a first L1 threshold of the one or more L1 thresholds.

27. The apparatus of claim 17, wherein the instructions to transmit the indication that the UE failed to decode the one or more scheduled downlink transmissions are further executable by the at least one processor to cause the apparatus to:
  transmit the indication that the UE failed to decode the one or more scheduled downlink transmissions via a downlink beam that is different than the first downlink beam.

28. The apparatus of claim 16, wherein the instructions to determine the cause of the failure are further executable by the at least one processor to cause the apparatus to:
  determine that the failure is due to the first downlink beam being fully beam blocked; and
  perform one or more comparisons of a measured signal strength parameter to a plurality of thresholds, the plurality of thresholds comprising one or more (L1) thresholds and one or more layer 3 (L3) thresholds.

29. An apparatus for wireless communications at a user equipment (UE), comprising:
- means for receiving, from a network node, a configuration message that includes information to be used by the UE in determining, from a plurality of failure causes, a cause of a failure by the UE to decode scheduled downlink transmissions;
- means for identifying that the UE failed to decode one or more scheduled downlink transmissions directed to the UE on at least a first downlink beam of a plurality of downlink beams;
- means for determining, from the plurality of failure causes, the cause of the failure to decode the one or more scheduled downlink transmissions based at least in part on the information included in the configuration message; means for transmitting, to the network node and based at least in part on the determining, an indication that the UE failed to decode the one or more scheduled downlink transmissions; and
- means for transmitting, to the network node, an indication of the determined cause of the failure.

30. A non-transitory computer-readable medium storing code for wireless communications at a user equipment (UE), the code comprising instructions executable by at least one processor to:

- receive, from a network node, a configuration message that includes information to be used by the UE in determining, from a plurality of failure causes, a cause of a failure by the UE to decode scheduled downlink transmissions;
- identify that the UE failed to decode one or more scheduled downlink transmissions directed to the UE on at least a first downlink beam of a plurality of downlink beams;
- determine, from the plurality of failure causes, the cause of the failure to decode the one or more scheduled downlink transmissions based at least in part on the information included in the configuration message;
- transmit, to the network node and based at least in part on the determining, an indication that the UE failed to decode the one or more scheduled downlink transmissions; and
- transmit, to the network node, an indication of the determined cause of the failure.

\* \* \* \* \*